the page.

US 7,671,131 B2

(12) United States Patent
Hughes et al.

(10) Patent No.: US 7,671,131 B2
(45) Date of Patent: *Mar. 2, 2010

(54) INTERPOLYMERS OF ETHYLENE/α-OLEFINS BLENDS AND PROFILES AND GASKETS MADE THEREFROM

(75) Inventors: Morgan M. Hughes, Angleton, TX (US); Yunwa W. Cheung, Lake Jackson, TX (US); Pankaj Gupta, Lake Jackson, TX (US); John J. Gathers, Pearland, TX (US)

(73) Assignee: Dow Global Technologies Inc., Midland, MI (US)

( * ) Notice: Subject to any disclaimer, the term of this patent is extended or adjusted under 35 U.S.C. 154(b) by 822 days.

This patent is subject to a terminal disclaimer.

(21) Appl. No.: 11/376,857

(22) Filed: Mar. 15, 2006

(65) Prior Publication Data
US 2006/0199905 A1 Sep. 7, 2006

Related U.S. Application Data

(63) Continuation-in-part of application No. PCT/US2005/008917, filed on Mar. 17, 2005.

(60) Provisional application No. 60/718,165, filed on Sep. 16, 2005, provisional application No. 60/553,906, filed on Mar. 17, 2004.

(51) Int. Cl.
| C08L 23/00 | (2006.01) |
| C08L 23/04 | (2006.01) |
| C08G 18/42 | (2006.01) |
| C08K 5/00 | (2006.01) |

(52) U.S. Cl. .................. 525/191; 525/240; 524/500; 524/515

(58) Field of Classification Search ................. 525/191, 525/240; 524/500, 515
See application file for complete search history.

(56) References Cited

U.S. PATENT DOCUMENTS

| 2,973,344 | A | | 2/1961 | Fasce |
| 2,997,432 | A | | 8/1961 | Koble et al. |
| 3,873,642 | A | | 3/1975 | Jezl |
| 4,146,492 | A | | 3/1979 | Cusano et al. |
| 4,299,931 | A | | 11/1981 | Coran et al. |
| 4,429,079 | A | * | 1/1984 | Shibata et al. ............... 525/240 |
| 4,510,031 | A | | 4/1985 | Matsumura et al. |
| 4,780,228 | A | | 10/1988 | Gardiner et al. |
| 4,798,081 | A | | 1/1989 | Hazlitt et al. |
| 5,068,047 | A | | 11/1991 | Chung et al. |
| 5,266,626 | A | * | 11/1993 | Hert et al. .................... 524/518 |
| 5,322,728 | A | | 6/1994 | Davey et al. |
| 5,391,629 | A | | 2/1995 | Turner et al. |
| 5,468,810 | A | | 11/1995 | Hayakawa et al. |
| 5,594,080 | A | | 1/1997 | Waymouth et al. |
| 5,597,881 | A | | 1/1997 | Winter et al. |
| 5,610,253 | A | | 3/1997 | Hatke et al. |
| 5,624,991 | A | | 4/1997 | Harada et al. |
| 5,733,980 | A | | 3/1998 | Cozewith et al. |
| 5,773,155 | A | | 6/1998 | Kale et al. |
| 5,783,531 | A | | 7/1998 | Andrew et al. |
| 5,798,420 | A | | 8/1998 | Cozewith et al. |
| 5,868,984 | A | | 2/1999 | Winter et al. |
| 5,892,076 | A | | 4/1999 | Nickias |
| 5,916,953 | A | | 6/1999 | Jacoby et al. |
| 5,969,070 | A | | 10/1999 | Waymouth et al. |
| 5,994,255 | A | | 11/1999 | Nickias et al. |
| 6,008,262 | A | | 12/1999 | McKay et al. |
| 6,025,448 | A | | 2/2000 | Swindoll et al. |
| 6,087,431 | A | | 7/2000 | Uchida et al. |
| 6,096,668 | A | | 8/2000 | Abuto et al. |
| 6,114,457 | A | | 9/2000 | Markel et al. |
| 6,121,402 | A | * | 9/2000 | Machida et al. ............. 526/352 |
| 6,124,400 | A | | 9/2000 | Chien et al. |
| 6,136,937 | A | | 10/2000 | Lai et al. |
| 6,143,828 | A | | 11/2000 | Chee et al. |
| 6,147,180 | A | | 11/2000 | Markel et al. |
| 6,160,029 | A | | 12/2000 | Chaudhary et al. |
| 6,177,377 | B1 | | 1/2001 | Chien |
| 6,187,424 | B1 | | 2/2001 | Kjellqvist et al. |
| 6,197,404 | B1 | | 3/2001 | Varona |
| 6,262,203 | B1 | | 7/2001 | Chien et al. |
| 6,287,705 | B1 | | 9/2001 | Seta et al. |
| 6,362,252 | B1 | | 3/2002 | Prutkin |
| 6,433,090 | B1 | | 8/2002 | Ellul et al. |
| 6,455,638 | B2 | | 9/2002 | Laughner et al. |
| 6,537,472 | B2 | | 3/2003 | Masubichi |

(Continued)

FOREIGN PATENT DOCUMENTS

EP 0 274 906 A2 7/1988

(Continued)

OTHER PUBLICATIONS

Tanem B. S. et al., "Blends of single-site linear and branched polyethylene. I Thermal characterisation", Jun. 2001, pp. 5389-5399, vol. 42, No. 12, Polymer, Elsevier Science Publishers B.V., GB (XP004231005).

(Continued)

*Primary Examiner*—Nathan M Nutter
(74) *Attorney, Agent, or Firm*—Whyte Hirschboeck Dudek SC

(57) ABSTRACT

Polymer blends comprise at least an ethylene/α-olefin interpolymers and at least one polyolefin. The polyolefins can be homopolymers or interpolymers and have a melt strength of at least about 6 cN. The ethylene/α-olefin interpolymer is a block copolymer having at least a hard block and at least a soft block. The soft block comprises a higher amount of comonomers than the hard block. The block interpolymer has a number of unique characteristics disclosed here. The polymer blends can be profiled extruded to make profiles, gaskets, and other products.

26 Claims, 10 Drawing Sheets

U.S. PATENT DOCUMENTS

| | | |
|---|---|---|
| 6,566,446 B1 | 5/2003 | Parikh et al. |
| 6,566,544 B1 | 5/2003 | Waymouth et al. |
| 6,815,023 B1 * | 11/2004 | Tatarka et al. ............... 428/34.9 |
| 7,005,395 B2 | 2/2006 | Zafiroglu et al. |
| 7,338,994 B2 * | 3/2008 | Walton et al. ................ 524/114 |
| 2001/0039314 A1 | 11/2001 | Mehta et al. |
| 2003/0027954 A1 | 2/2003 | Becke et al. |
| 2003/0194575 A1 | 10/2003 | Tau et al. |
| 2003/0195128 A1 | 10/2003 | Deckman et al. |
| 2003/0216518 A1 * | 11/2003 | Tau et al. ..................... 525/191 |
| 2004/0082750 A1 | 4/2004 | Tau et al. |
| 2004/0092662 A1 | 5/2004 | Goto |
| 2004/0121922 A1 | 6/2004 | Okada et al. |
| 2004/0158011 A1 | 8/2004 | Jain et al. |
| 2004/0192147 A1 * | 9/2004 | Smith et al. .................. 442/415 |
| 2005/0009993 A1 | 1/2005 | Morioka et al. |
| 2005/0176892 A1 | 8/2005 | Weaver et al. |
| 2006/0030667 A1 | 2/2006 | Yalvac et al. |
| 2006/0199906 A1 * | 9/2006 | Walton et al. ................ 525/191 |
| 2006/0199908 A1 * | 9/2006 | Cheung et al. ............... 525/191 |
| 2006/0205833 A1 * | 9/2006 | Martinez et al. ............. 521/142 |
| 2006/0211819 A1 * | 9/2006 | Hoenig et al. .................. 525/88 |
| 2007/0066756 A1 * | 3/2007 | Poon et al. ................... 525/191 |
| 2008/0299857 A1 | 12/2008 | Harding et al. |

FOREIGN PATENT DOCUMENTS

| | | |
|---|---|---|
| EP | 0 287 282 | 10/1988 |
| EP | 0 741 164 | 11/1996 |
| EP | 0 877 050 | 11/1998 |
| EP | 0982328 A1 | 3/2000 |
| EP | 1002814 A1 | 5/2000 |
| EP | 1 026 184 | 8/2000 |
| EP | 1097976 A2 | 5/2001 |
| EP | 1162213 A1 | 12/2001 |
| EP | 0 958 313 B1 | 9/2002 |
| EP | 1 262 498 A2 | 12/2002 |
| EP | 1 288 256 | 3/2003 |
| EP | 1375585 A1 | 1/2004 |
| EP | 1588843 A1 | 10/2005 |
| JP | 2002-206007 A | 7/2002 |
| JP | 2004-204058 A | 7/2004 |
| WO | WO 95/27745 A1 | 10/1995 |
| WO | WO 95/27746 A1 | 10/1995 |
| WO | 9612762 A1 | 5/1996 |
| WO | WO 97/12919 | 4/1997 |
| WO | WO 98/05731 A1 | 2/1998 |
| WO | WO 98/34970 A1 | 8/1998 |
| WO | WO 99/35171 A1 | 7/1999 |
| WO | WO 00/37514 A1 | 6/2000 |
| WO | WO 02/066540 A2 | 8/2002 |
| WO | WO 02/079322 | 10/2002 |
| WO | WO 03/002625 | 1/2003 |
| WO | WO 03/014046 A1 | 2/2003 |
| WO | WO 03/040095 | 5/2003 |
| WO | WO 03/040201 A1 | 5/2003 |
| WO | WO 03/082971 A2 | 10/2003 |
| WO | WO 2004/031292 | 4/2004 |
| WO | WO 2005/090425 A1 | 9/2005 |
| WO | WO 2005/090426 A1 | 9/2005 |
| WO | WO 2005/090427 A1 | 9/2005 |

OTHER PUBLICATIONS

Nitta K, et al.; "Polypropylene-block-poly(ethylene-co-propylene) addition to polypropylene/poly(ethylene-co-propylene) blends: morphology and mechanical properties"; Aug. 2000; Polymer, Elsevier Science Publishers B.V., GB.

* cited by examiner

INTERPOLYMERS OF ETHYLENE/α-OLEFINS BLENDS AND PROFILES AND GASKETS MADE THEREFROM

CROSS-REFERENCE TO RELATED APPLICATIONS

This application claims priority to U.S. Provisional Application No. 60/718,165, filed Sep. 16, 2005, which further claims priority to PCT Application No. PCT/US2005/008917, filed on Mar. 17, 2005, which in turn claims priority to U.S. Provisional Application No. 60/553,906, filed Mar. 17, 2004. For purposes of United States patent practice, the contents of the provisional applications and the PCT application are herein incorporated by reference in their entirety.

FIELD OF THE INVENTION

This invention relates to polymer blends comprising an ethylene/α-olefin interpolymer and one or more polyolefins, methods of making the blends, and profiles and gaskets made from the blends.

BACKGROUND OF THE INVENTION

Profiles made of thermoplastics are manufactured by the profile extrusion process. The thermoplastic material is prepared into a melt in an extruder and initially shaped in a die. The profile is given its final contours in the downstream sizing section, where it is cooled at the same time. A typical extrusion plant includes an extruder, a sizing table, a take-off unit and an automatic saw. Other stations can also be added, such as a delivery table, a punching or printing facility and other special processing units.

When using a profile extrusion process, a manufacturer usually desires an elastomer that "shear thins" or decreases in viscosity with applied shear forces. Because pressure drop across an extruder die and amperage required to turn an extruder screw are directly related to elastomer viscosity, a reduction in elastomer viscosity due to shear thinning necessarily leads to a lower pressure drop and a lower amperage requirement. The manufacturer can then increase extruder screw speed until reaching a limit imposed by amperage or pressure drop. The increased screw speed translates to an increase in extruder output. An increase in shear thinning also delays onset of surface melt fracture, a phenomenon that otherwise limits extruder output. Surface melt fracture is usually considered a quality defect and manufacturers typically limit extruder output and suffer a productivity loss to reach a rate of production that substantially eliminates surface melt fracture.

When producing profile extrusions with thin walls and a complex geometry, a manufacturer looks for an elastomer with high melt strength ("MS") and rapid solidification upon cooling in addition to good shear thinning behavior. A combination of a high MS and rapid solidification upon cooling allows a part to be extruded hot and cooled below the elastomer's solidification temperature before gravity and extrusion forces lead to shape distortion. Ultimately, for broad market acceptance, a finished part should also retain its shape despite short term exposure to an elevated temperature during processing, shipping or eventual use.

Gaskets are used in a variety of applications, for example in appliances such as refrigerators and freezers requiring a flexible gasket for sealing the area between the door and appliance body. One of the most commonly used materials for the production of gaskets is polyvinyl chloride ("PVC"). However, PVC requires compounding and formulating in order to incorporate the various additives necessary for imparting desirable properties to the gaskets. Besides the additional time and money required for the additional mixing steps, additives such as plasticisers can absorb spills and become discolored. Plasticiser additives are also susceptible to attack by microbes which can also lead to discoloration of the gasket, e.g., black stains. Furthermore, PVC gaskets become brittle at low temperatures and cracking becomes a problem. Thus at low temperatures, PVC gaskets are difficult to install. PVC gaskets are also perceived as having a negative impact on the environment.

Therefore, there is a need for a material for profiles and gaskets that would provide increase extrusion line speeds (i.e., lower torque and lower die pressure) and improved performance in terms of reduced melt fracture, collapse resistance, etc.

SUMMARY OF INVENTION

The aforementioned needs are met by various aspects of the inventions. Provided herein is a polymer blend comprising: (i) an ethylene/α-olefin interpolymer and (ii) a polyolefin with a melt strength of at least about 6 centiNewton (cN).

The ethylene/α-olefin interpolymer used in the polymer blend is characterized in that it (a) has a Mw/Mn from about 1.7 to about 3.5, at least one melting point, Tm, in degrees Celsius, and a density, d, in grams/cubic centimeter, wherein the numerical values of Tm and d correspond to the relationship:

$$T_m > -2002.9 + 4538.5(d) - 2422.2(d)^2 \text{ or}$$

(b) has a Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; or (c) is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when the ethylene/α-olefin interpolymer is substantially free of a cross-linked phase:

$$Re > 1481 - 1629(d); \text{ or}$$

(d) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or (e) is characterized by a storage modulus at 25° C., G'(25° C.), and a storage modulus at 100° C., G'(100° C.), wherein the ratio of G'(25° C.) to G'(100° C.) is from about 1:1 to about 10:1.

In some embodiments, the ethylene/α-olefin interpolymer has a Mw/Mn from about 1.7 to about 3.5, at least one melting point, Tm, in degrees Celsius, and a density, d, in grams/cubic centimeter, wherein the numerical values of Tm and d correspond to the relationship:

$$Tm \geq 858.91 - 1825.3(d) + 1112.8(d)^2.$$

In some embodiments, the ethylene/α-olefin interpolymer has a Mw/Mn from about 1.7 to about 3.5 and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to } 130 \text{ J/g},$$

$$\Delta T \geq 48° \text{ C. for } \Delta H \text{ greater than } 130 \text{ J/g},$$

wherein the CRYSTAF peak is determined using at least 5 percent of the cumulative polymer, and if less than 5 percent of the polymer has an identifiable CRYSTAF peak, then the CRYSTAF temperature is 30° C.

In other embodiments, the ethylene/α-olefin interpolymer is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when the ethylene/α-olefin interpolymer is substantially free of a cross-linked phase: Re>1481-1629(d), Re>1491-1629(d), Re>1501-1629(d), or Re>1511-1629(d).

In one embodiment, the ethylene/α-olefin interpolymer has:

(a) at least one molecular fraction which elutes between 40° C. and 130° C. when fractionated using TREF, characterized in that the fraction has a block index of at least 0.5 and up to about 1 and a molecular weight distribution, Mw/Mn, greater than about 1.3 or (b) an average block index greater than zero and up to about 1.0 and a molecular weight distribution, Mw/Mn, greater than about 1.3.

In another embodiment, the ethylene/α-olefin interpolymer has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer.

In one embodiment, the ethylene/α-olefin interpolymer is characterized by a storage modulus at 25° C., G'(25° C.), and a storage modulus at 100° C., G'(100° C.), wherein the ratio of G'(25° C.) to G'(100° C.) is from about 1:1 to about 10:1.

In some embodiments, the α-olefin in the ethylene/α-olefin interpolymer is styrene, propylene, 1-butene, 1-hexene, 1-octene, 4-methyl-1-pentene, norbornene, 1-decene, 1,5-hexadiene, or a combination thereof.

In other embodiment's the ethylene/α-olefin interpolymer has a melt index in the range of about 0.1 to about 2000 g/10 minutes, about 1 to about 1500 g/10 minutes, about 2 to about 1000 g/10 minutes or about 5 to about 500 g/10 minutes minutes measured according to ASTM D-1238, Condition 190° C./2.16 kg.

In some embodiments, the ethylene/α-olefin interpolymer is present in the range from about 5% to about 95%, about 50% to about 90% or about 70% to about 90% by weight of the total composition.

In some embodiments, the polyolefin in the polymer blend provided herein is a homopolymer. The polyolefin can be a polypropylene or a polyethylene. In one embodiment, the polyethylene is a high density polyethylene. In some embodiments, the polyethylene is present in the range from about 5% to about 95%, about 10% to about 50% or about 10% to about 30% by weight of the total composition.

In other embodiments, the polyolefin is selected from low density polyethylene (LDPE), heterogeneously branched ethylene/α-olefin interpolymer, ultra low density polyethylene (ULDPE)), substantially linear ethylene polymers (SLEP), and homogeneously branched ethylene polymer. In one embodiment, the polyolefin is selected from low density polypropylene and high density polypropylene.

In another embodiment, the polyethylene is a substantially linear homogeneous ethylene/α-olefin interpolymer or a linear homogeneous ethylene/α-olefin interpolymer.

In some embodiments, the polymer blend comprises at least an additive, such as a slip agent, an anti-blocking agent, a plasticizer, an antioxidant, a UV stabilizer, a colorant or pigment, a filler, a lubricant, an antifogging agent, a flow aid, a coupling agent, a cross-linking agent, a nucleating agent, a surfactant, a solvent, a flame retardant, an antistatic agent, or a combination thereof.

Also provided are profiles or a gaskets made from the polymer blend disclosed herein. The profiles and gaskets can be prepared by profile extrusion or by injection molding.

Further provided are methods of making an article, comprising blending an ethylene/α-olefin interpolymer with a polyolefin, wherein the ethylene/α-olefin interpolymer is as described above and elsewhere herein.

Additional aspects of the invention and characteristics and properties of various embodiments of the invention become apparent with the following description.

Figure 5:
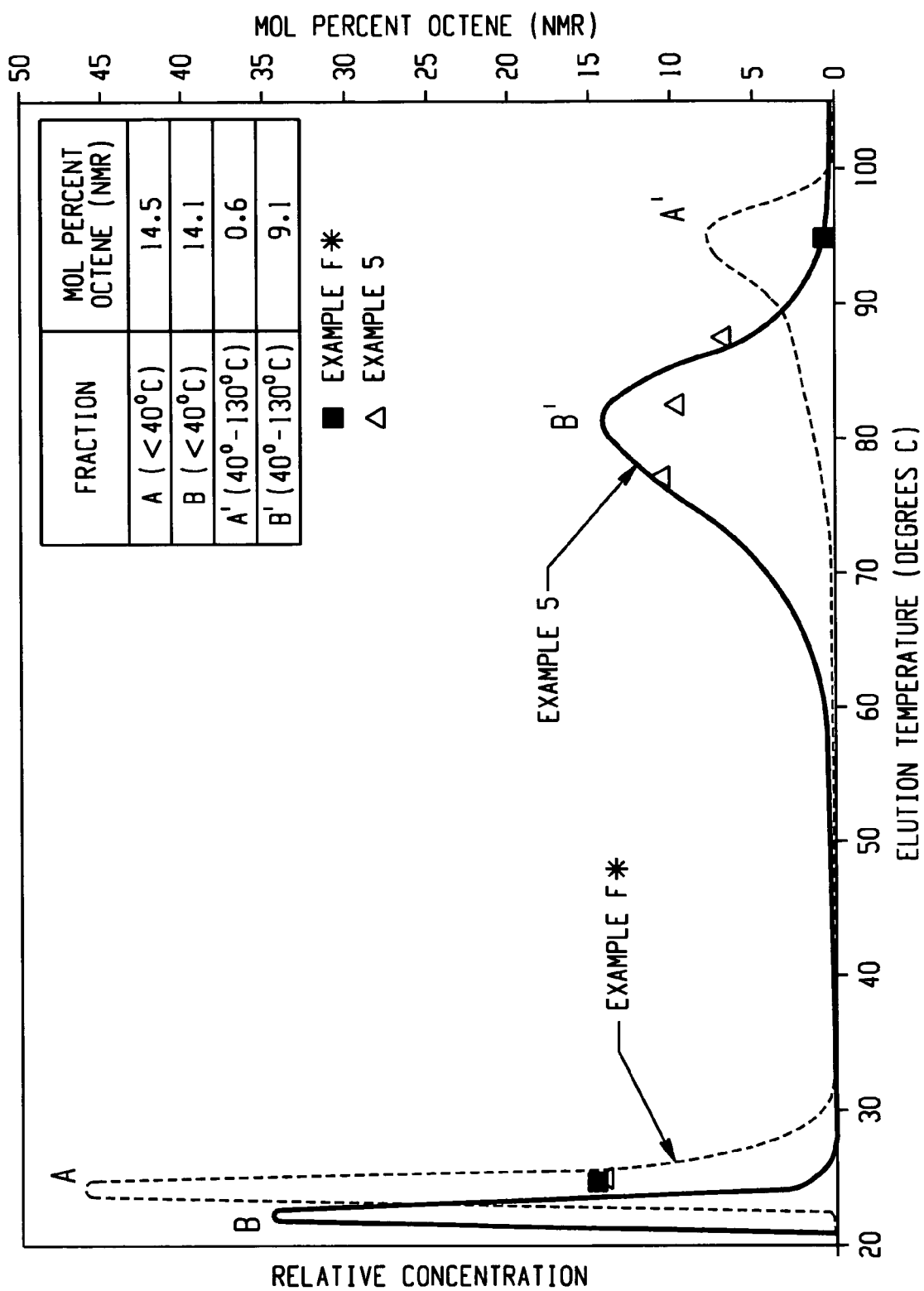

FIG. 5 is a plot of octene content of TREF fractionated ethylene/1-octene copolymer fractions versus TREF elution temperature of the fraction for the polymer of Example 5 (curve 1) and for Comparative Example F* (curve 2). The squares represent Comparative Example F*; and the triangles represent Example 5.

Figure 6:
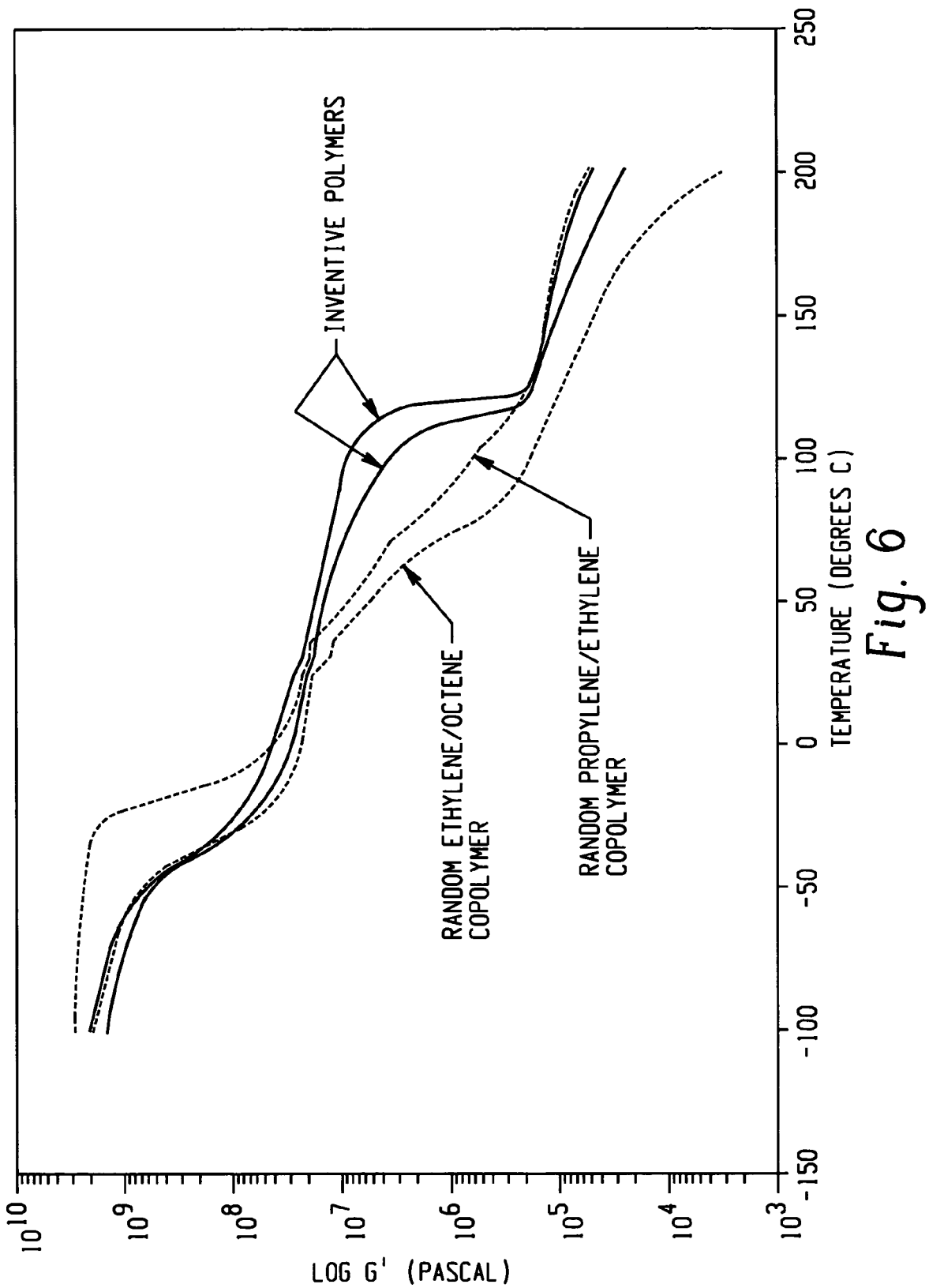

FIG. 6 is a graph of the log of storage modulus as a function of temperature for comparative ethylene/1-octene copolymer (curve 2) and propylene/ethylene-copolymer (curve 3) and for two ethylene/1-octene block copolymers of the invention made with differing quantities of chain shuttling agent (curves 1).

Figure 7:
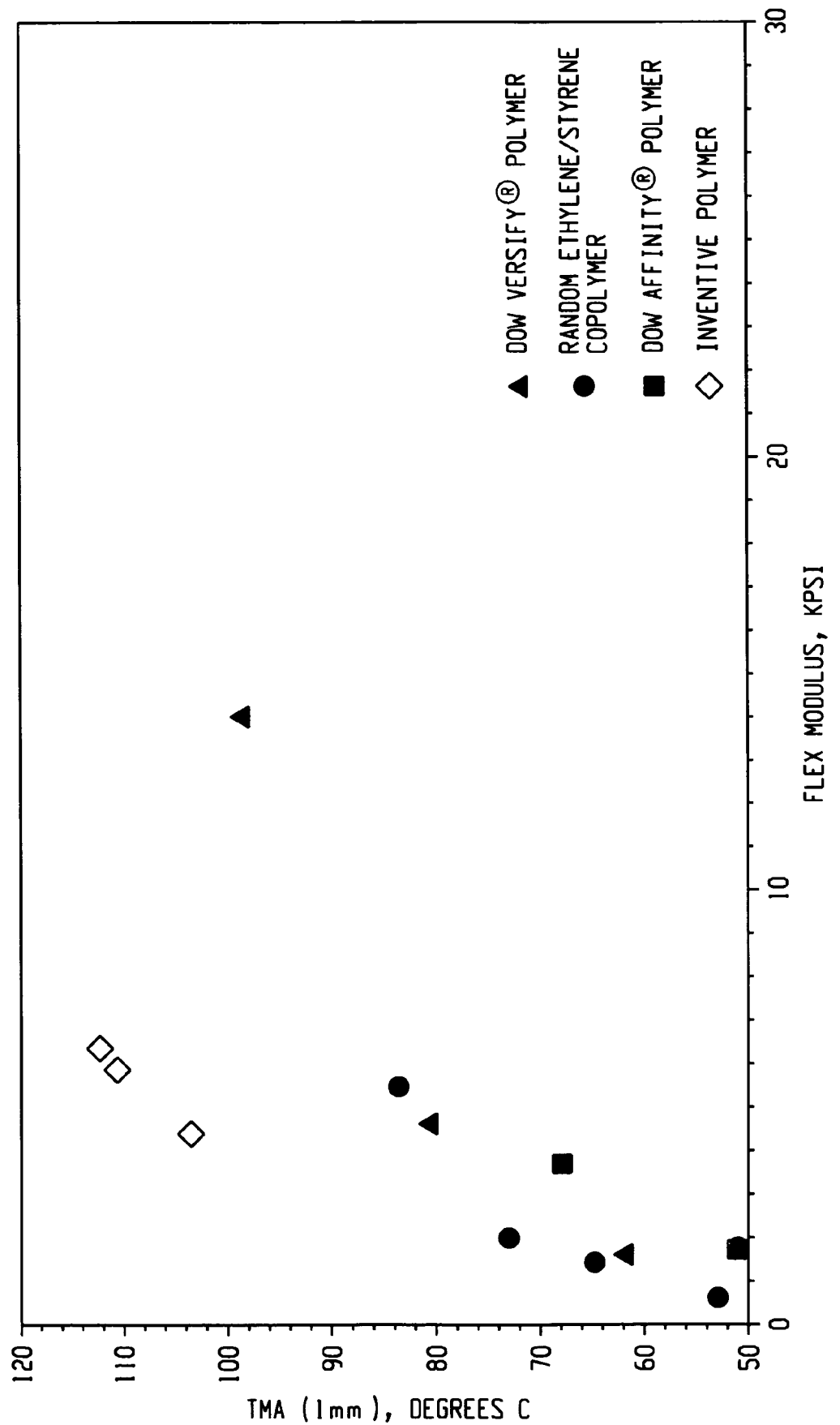

FIG. 7 shows a plot of TMA (1 mm) versus flex modulus for some inventive polymers (represented by the diamonds), as compared to some known polymers. The triangles represent various Dow VERSIFY® polymers; the circles represent various random ethylene/styrene copolymers; and the squares represent various Dow AFFINITY® polymers.

Figure 8:
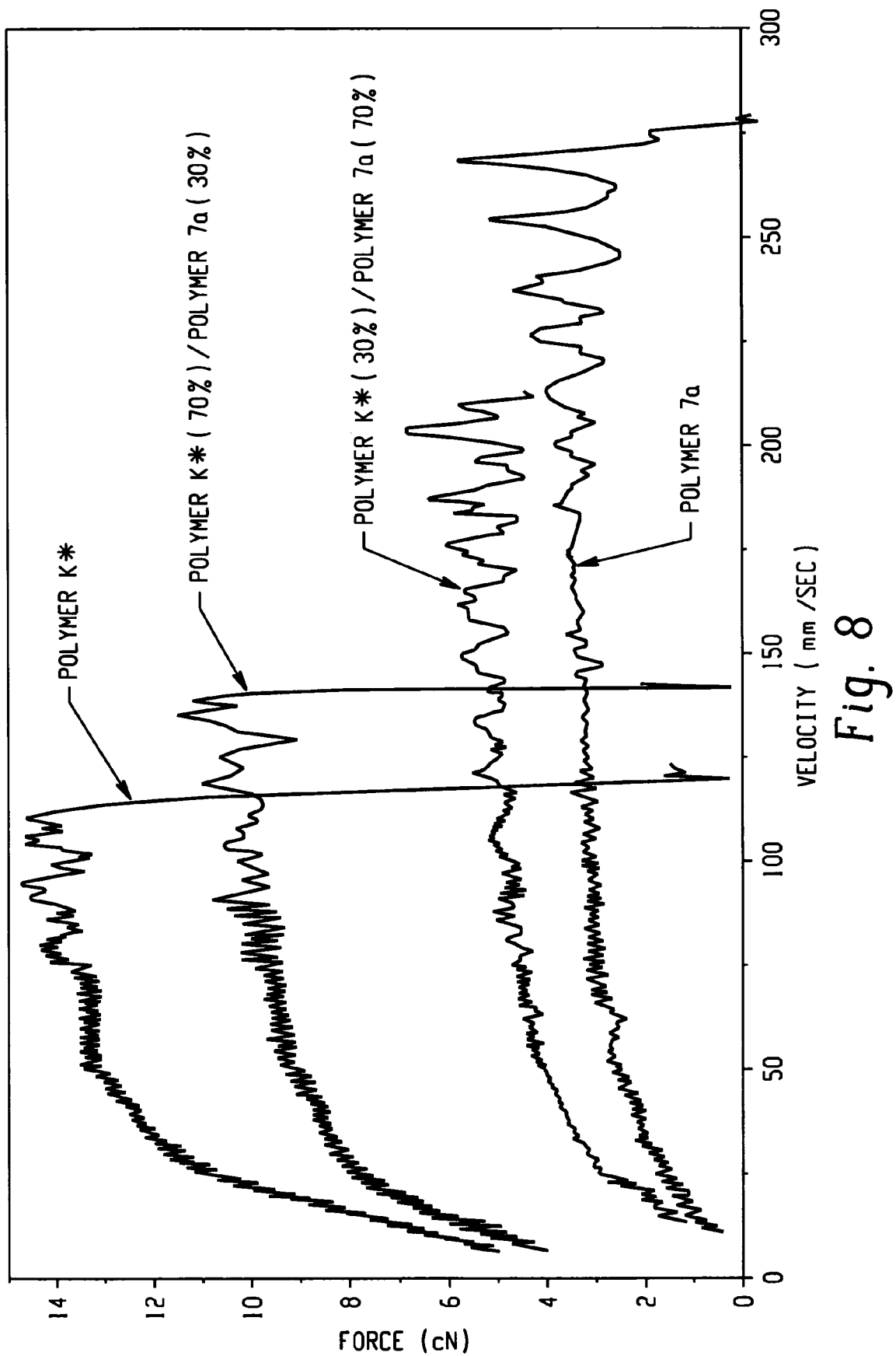

FIG. 8 shows plots obtained from melt strength measurements for various polymers and blends thereof.

Figure 9:
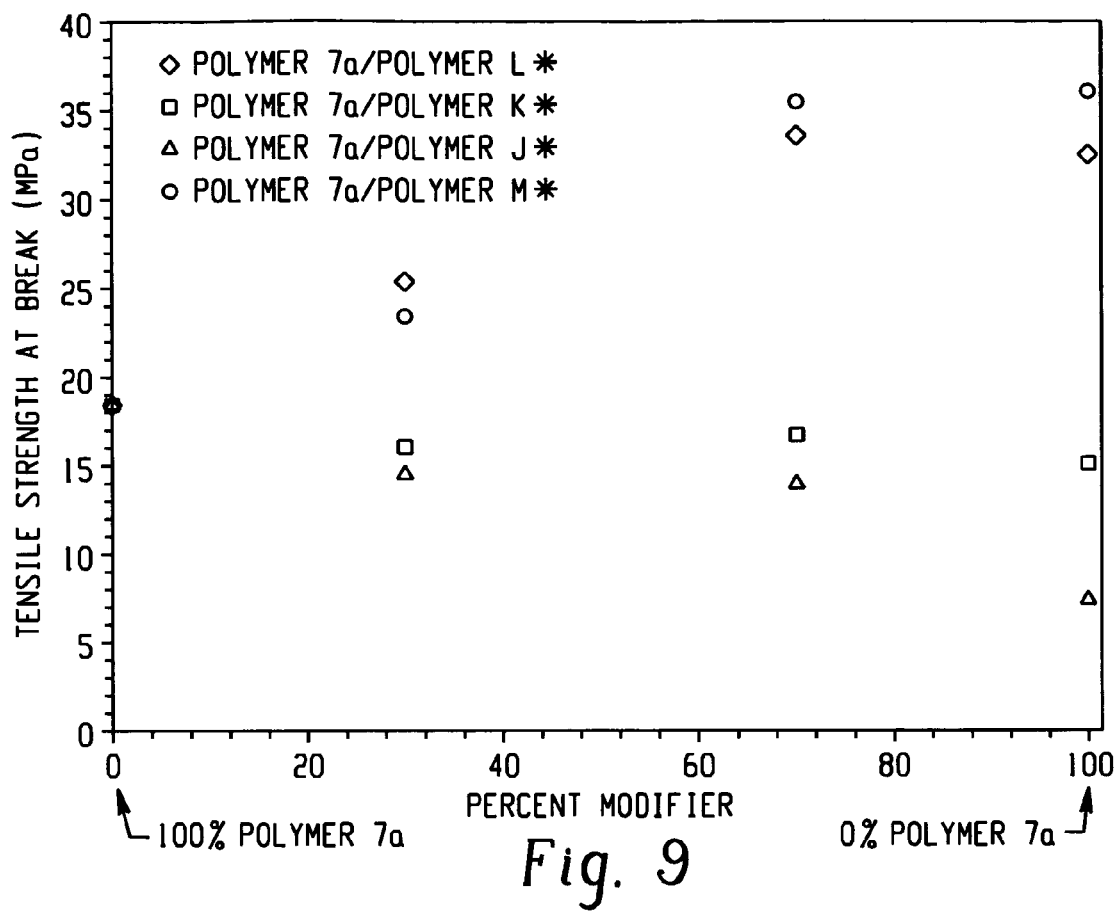

FIG. 9 shows plots of tensile strength as a function of the weight percent of a polyolefin added (labeled as "Percent Modifier").

Figure 10:
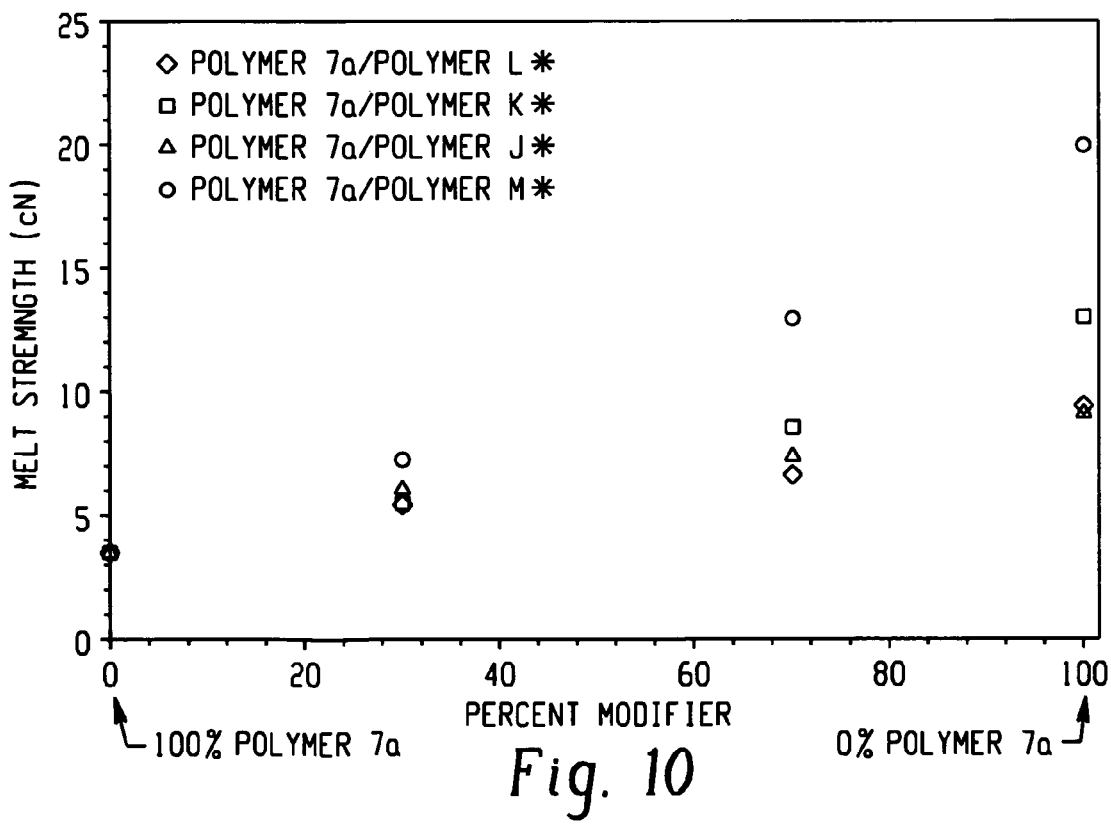

FIG. 10 shows plots of melt strength as a function of the weight percent of a polyolefin added (labeled as "Percent Modifier").

Figure 11:
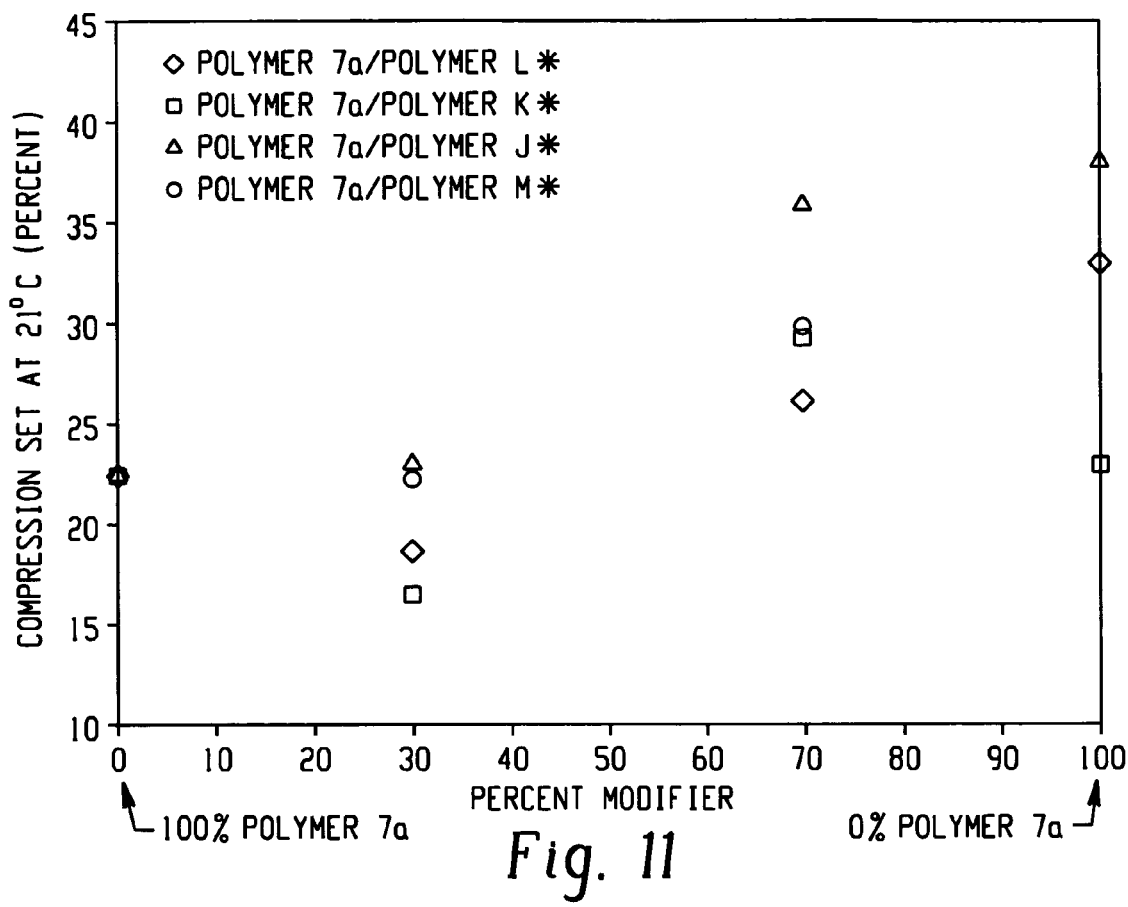

FIG. 11 shows plots of compression set at 21° C. as a function of the weight percent of a polyolefin added (labeled as "Percent Modifier").

Figure 12:
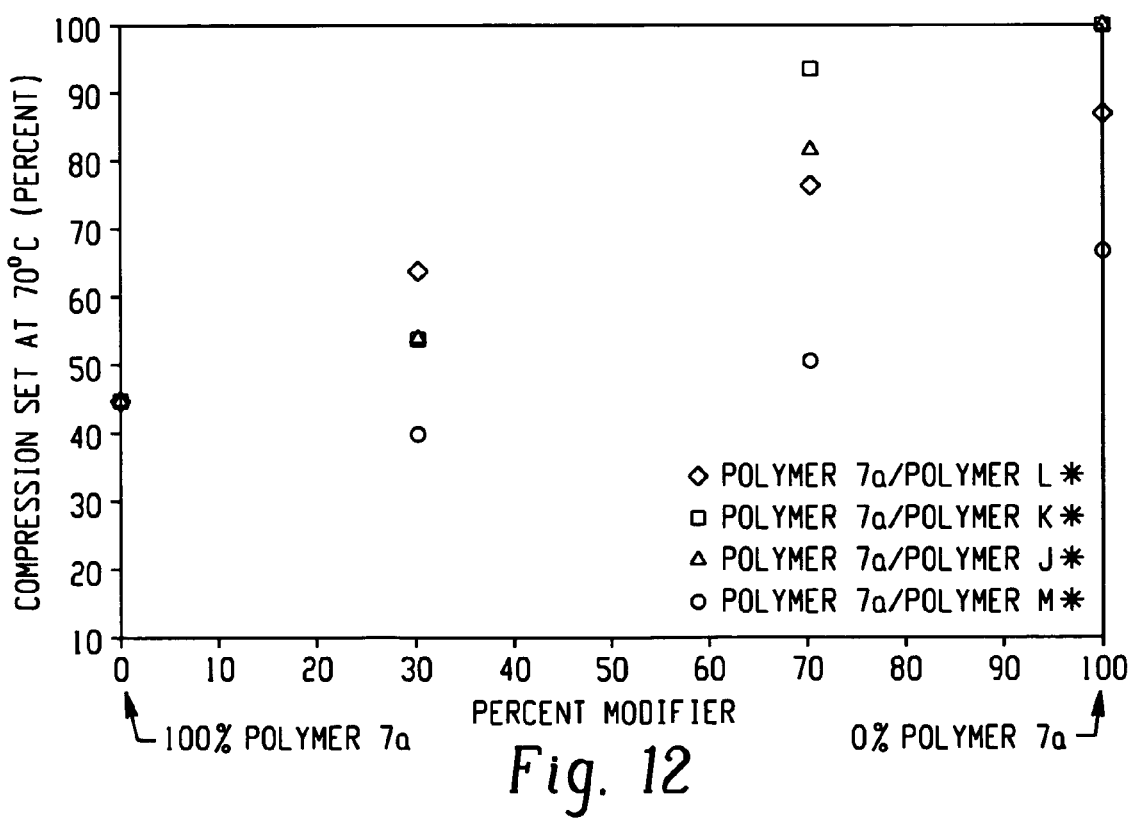

FIG. 12 shows plots of compression set at 70° C. as a function of the weight percent of a polyolefin added (labeled as "Percent Modifier").

In the FIGS. 9-12, the circles represent blends of polymer 7a with polymer M*, the triangles represent blends of polymer 7a with polymer J*, the squares represent blends polymer 7a with polymer K* and the diamonds represent blends of polymer 7a with polymer L*.

DETAILED DESCRIPTION OF THE INVENTION

General Definitions

"Polymer" means a polymeric compound prepared by polymerizing monomers, whether of the same or a different type. The generic term "polymer" embraces the terms "homopolymer," "copolymer," "terpolymer" as well as "interpolymer."

"Interpolymer" means a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

The term "ethylene/α-olefin interpolymer" generally refers to polymers comprising ethylene and an α-olefin having 3 or more carbon atoms. Preferably, ethylene comprises the majority mole fraction of the whole polymer, i.e., ethylene comprises at least about 50 mole percent of the whole polymer. More preferably ethylene comprises at least about 60 mole percent, at least about 70 mole percent, or at least about 80 mole percent, with the substantial remainder of the whole polymer comprising at least one other comonomer that is preferably an α-olefin having 3 or more carbon atoms. For many ethylene/octene copolymers, the preferred composition comprises an ethylene content greater than about 80 mole percent of the whole polymer and an octene content of from about 10 to about 15, preferably from about 15 to about 20 mole percent of the whole polymer. In some embodiments, the ethylene/α-olefin interpolymers do not include those produced in low yields or in a minor amount or as a by-product of a chemical process. While the ethylene/α-olefin interpolymers can be blended with one or more polymers, the as-produced ethylene/α-olefin interpolymers are substantially pure and often comprise a major component of the reaction product of a polymerization process.

The ethylene/α-olefin interpolymers comprise ethylene and one or more copolymerizable α-olefin comonomers in polymerized form, characterized by multiple blocks or segments of two or more polymerized monomer units differing in chemical or physical properties. That is, the ethylene/α-olefin interpolymers are block interpolymers, preferably multi-block interpolymers or copolymers. The terms "interpolymer" and copolymer" are used interchangeably herein. In some embodiments, the multi-block copolymer can be represented by the following formula:

$(AB)_n$ where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a substantially linear fashion, as opposed to a substantially branched or substantially star-shaped fashion. In other embodiments, A blocks and B blocks are randomly distributed along the polymer chain. In other words, the block copolymers usually do not have a structure as follows.

AAA-AA-BBB-BB

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

The multi-block polymers typically comprise various amounts of "hard" and "soft" segments. "Hard" segments refer to blocks of polymerized units in which ethylene is present in an amount greater than about 95 weight percent, and preferably greater than about 98 weight percent based on the weight of the polymer. In other words, the comonomer content (content of monomers other than ethylene) in the hard segments is less than about 5 weight percent, and preferably less than about 2 weight percent based on the weight of the polymer. In some embodiments, the hard segments comprises all or substantially all ethylene. "Soft" segments, on the other hand, refer to blocks of polymerized units in which the comonomer content (content of monomers other than ethylene) is greater than about 5 weight percent, preferably greater than about 8 weight percent, greater than about 10 weight percent, or greater than about 15 weight percent based on the weight of the polymer. In some embodiments, the comonomer content in the soft segments can be greater than about 20 weight percent, greater than about 25 weight percent, greater than about 30 weight percent, greater than about 35 weight percent, greater than about 40 weight percent, greater than about 45 weight percent, greater than about 50 weight percent, or greater than about 60 weight percent.

The soft segments can often be present in a block interpolymer from about 1 weight percent to about 99 weight percent of the total weight of the block interpolymer, preferably from about 5 weight percent to about 95 weight percent, from about 10 weight percent to about 90 weight percent, from about 15 weight percent to about 85 weight percent, from about 20 weight percent to about 80 weight percent, from about 25 weight percent to about 75 weight percent, from about 30 weight percent to about 70 weight percent, from about 35 weight percent to about 65 weight percent, from about 40 weight percent to about 60 weight percent, or from about 45 weight percent to about 55 weight percent of the total weight of the block interpolymer. Conversely, the hard segments can be present in similar ranges. The soft segment weight percentage and the hard segment weight percentage can be calculated based on data obtained from DSC or NMR. Such methods and calculations are disclosed in a concurrently filed U.S. patent application Ser. No. 12/558,234, entitled "Ethylene/α-Olefin Block Interpolymers", filed on Mar. 15, 2006, in the name of Colin L. P. Shan, Lonnie Hazlitt, et. al. and assigned to Dow Global Technologies Inc., the disclose of which is incorporated by reference herein in its entirety.

The term "crystalline" if employed, refers to a polymer that possesses a first order transition or crystalline melting point (Tm) as determined by differential scanning calorimetry (DSC) or equivalent technique. The term may be used interchangeably with the term "semicrystalline". The term "amorphous" refers to a polymer lacking a crystalline melting point as determined by differential scanning calorimetry (DSC) or equivalent technique.

The term "multi-block copolymer" or "segmented copolymer" refers to a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In a preferred embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The multi-block copolymers are characterized by unique distributions of both polydispersity index (PDI or Mw/Mn), block length distribution, and/or block number distribution due to the unique process making of the copolymers. More specifically, when produced in a continuous process, the polymers desirably possess PDI from 1.7 to 2.9, preferably from 1.8 to 2.5, more preferably from 1.8 to 2.2, and most preferably from 1.8 to 2.1. When produced in a batch or semi-batch process, the polymers possess PDI from 1.0 to 2.9, preferably from 1.3 to 2.5, more preferably from 1.4 to 2.0, and most preferably from 1.4 to 1.8.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$ and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, ..., 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed.

Embodiments of the invention provide polymer blends comprising at least one polyolefin and at least one new ethylene/α-olefin interpolymers. The polymer blends possess unique physical and mechanical properties that are suitable for making profiles or gaskets for a variety of applications. The blends have a good balance among tensile strength, melt strength, and compression set. In addtion, the profiles and gaskets should have an upper use or service temperature of at least 40° C., at least 50° C., at least 60° C., at least 80° C., or at least 90° C. The profiles and gaskets should have a 70° C. compression set of less than 80%, less than 70%, or less than 60%.

Ethylene/α-Olefin Interpolymers

The ethylene/α-olefin interpolymers used in embodiments of the invention (also referred to as "inventive interpolymer" or "inventive polymer") comprise ethylene and one or more copolymerizable α-olefin comonomers in polymerized form, characterized by multiple blocks or segments of two or more polymerized monomer units differing in chemical or physical properties (block interpolymer), preferably a multi-block copolymer. The ethylene/α-olefin interpolymers are characterized by one or more of the aspects described as follows.

In one aspect, the ethylene/α-olefin interpolymers used in embodiments of the invention have a $M_w/M_n$ from about 1.7 to about 3.5 and at least one melting point, $T_m$, in degrees Celsius and density, d, in grams/cubic centimeter, wherein the numerical values of the variables correspond to the relationship:

$$T_m > -2002.9 + 4538.5(d) - 2422.2(d)^2, \text{ and preferably}$$

$$T_m \geq -6288.1 + 13141(d) - 6720.3(d)^2, \text{ and more preferably}$$

$$T_m \geq 858.91 - 1825.3(d) + 1112.8(d)^2.$$

Figure 1:
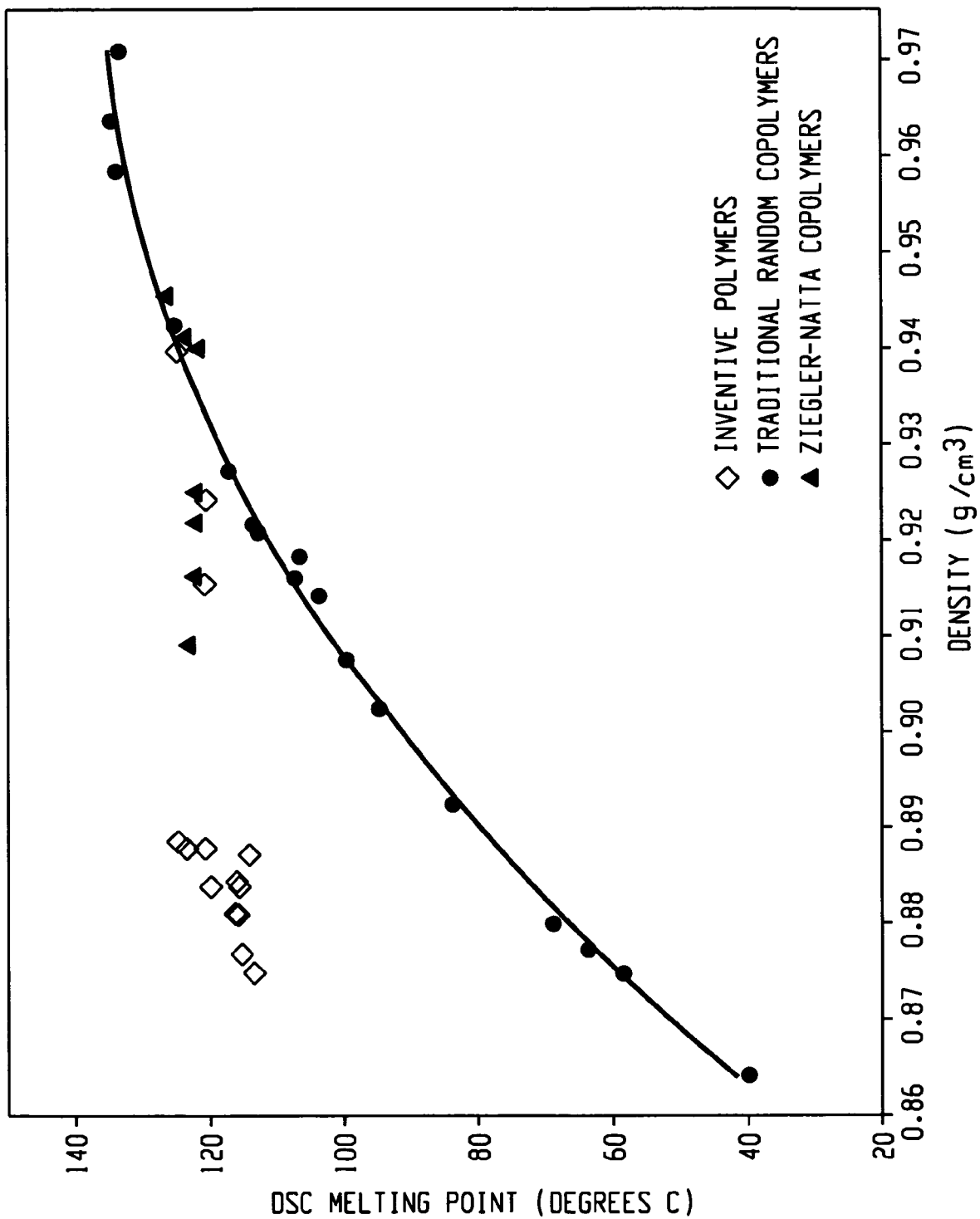
FIG. 1 shows the melting point/density relationship for the inventive polymers (represented by diamonds) as compared to traditional random copolymers (represented by circles) and Ziegler-Natta copolymers (represented by triangles).

Such melting point/density relationship is illustrated in FIG. 1. Unlike the traditional random copolymers of ethylene/α-olefins whose melting points decrease with decreasing densities, the inventive interpolymers (represented by diamonds) exhibit melting points substantially independent of the density, particularly when density is between about 0.87 g/cc to about 0.95 g/cc. For example, the melting point of such polymers are in the range of about 110° C. to about 130° C. when density ranges from 0.875 g/cc to about 0.945 g/cc. In some embodiments, the melting point of such polymers are in the range of about 115° C. to about 125° C. when density ranges from 0.875 g/cc to about 0.945 g/cc.

Figure 2:
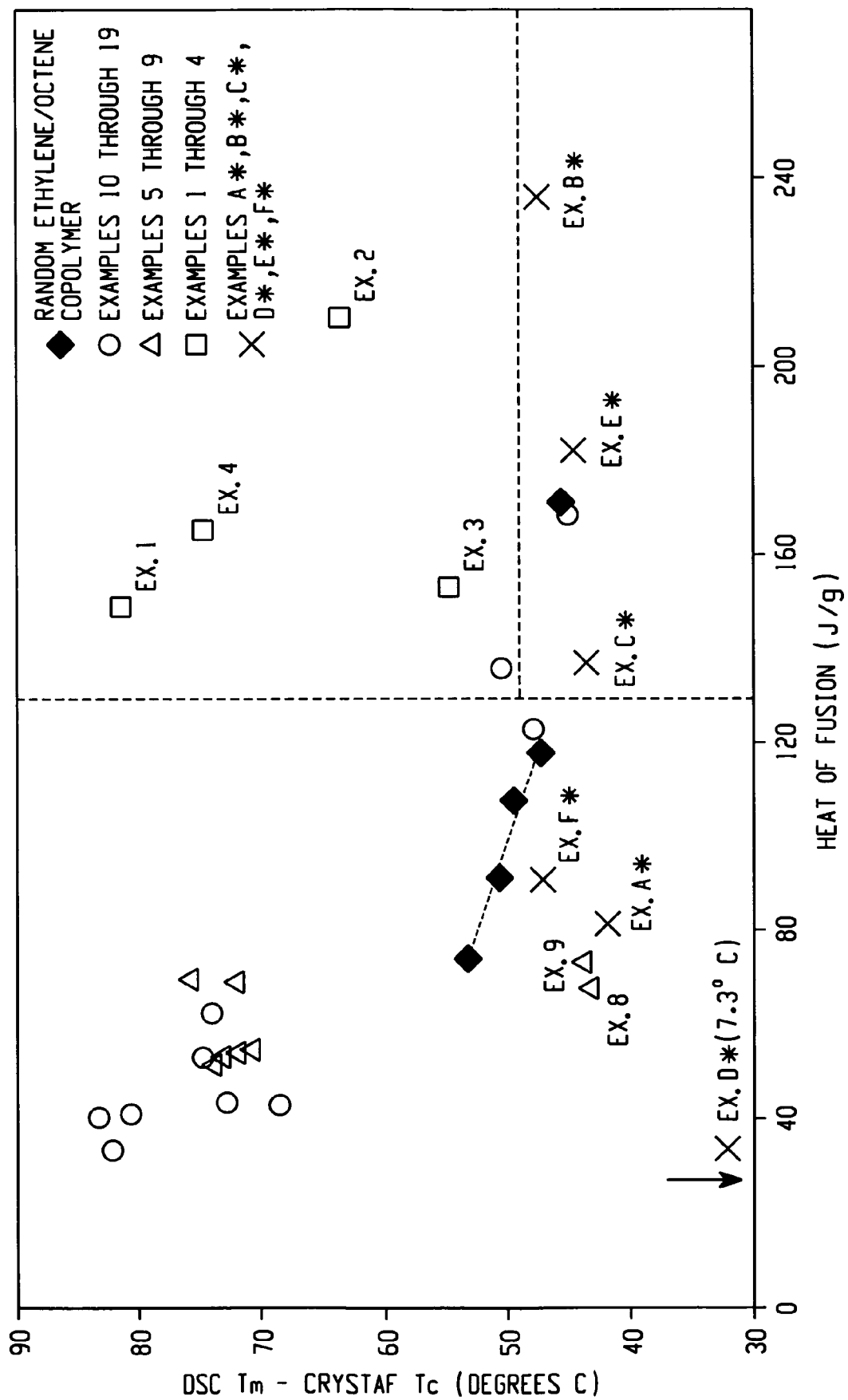
FIG. 2 shows plots of delta DSC-CRYSTAF as a function of DSC Melt Enthalpy for various polymers. The diamonds represent random ethylene/octene copolymers; the squares represent polymer examples 1-4; the triangles represent polymer examples 5-9; and the circles represent polymer examples 10-19. The "X" symbols represent polymer examples A*-F*.

In another aspect, the ethylene/α-olefin interpolymers comprise, in polymerized form, ethylene and one or more α-olefins and are characterized by a ΔT, in degree Celsius, defined as the temperature for the tallest Differential Scanning Calorimetry ("DSC") peak minus the temperature for the tallest Crystallization Analysis Fractionation ("CRYSTAF") peak and a heat of fusion in J/g, ΔH, and ΔT and ΔH satisfy the following relationships:

$$\Delta T > -0.1299(\Delta H) + 62.81, \text{ and preferably}$$

$$\Delta T \geq -0.1299(\Delta H) + 64.38, \text{ and more preferably}$$

$$\Delta T > -0.1299(\Delta H) + 65.95,$$

for ΔH up to 130 J/g. Moreover, ΔT is equal to or greater than 48° C. for ΔH greater than 130 J/g. The CRYSTAF peak is determined using at least 5 percent of the cumulative polymer (that is, the peak must represent at least 5 percent of the cumulative polymer), and if less than 5 percent of the polymer has an identifiable CRYSTAF peak, then the CRYSTAF temperature is 30° C., and ΔH is the numerical value of the heat of fusion in J/g. More preferably, the highest CRYSTAF peak contains at least 10 percent of the cumulative polymer. FIG. 2 shows plotted data for inventive polymers as well as comparative examples. Integrated peak areas and peak temperatures are calculated by the computerized drawing program supplied by the instrument maker. The diagonal line shown for the random ethylene octene comparative examples corresponds to the equation ΔT=−0.1299(ΔH)+62.81.

In yet another aspect, the ethylene/α-olefin interpolymers have a molecular fraction which elutes between 40° C. and 130° C. when fractionated using Temperature Rising Elution Fractionation ("TREF"), characterized in that said fraction has a molar comonomer content higher, preferably at least 5 percent higher, more preferably at least 10 percent higher, than that of a comparable random ethylene interpolymer fraction eluting between the same temperatures, wherein the comparable random ethylene interpolymer contains the same comonomer(s), and has a melt index, density, and molar comonomer content (based on the whole polymer) within 10 percent of that of the block interpolymer. Preferably, the Mw/Mn of the comparable interpolymer is also within 10 percent of that of the block interpolymer and/or the comparable interpolymer has a total comonomer content within 10 weight percent of that of the block interpolymer.

In still another aspect, the ethylene/α-olefin interpolymers are characterized by an elastic recovery, Re, in percent at 300 percent strain and 1 cycle measured on a compression-molded film of an ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$Re>1481-1629(d)$; and preferably $Re>1491-1629(d)$; and more preferably $Re>1501-1629(d)$; and even more preferably $Re>1511-1629(d)$.

Figure 3:
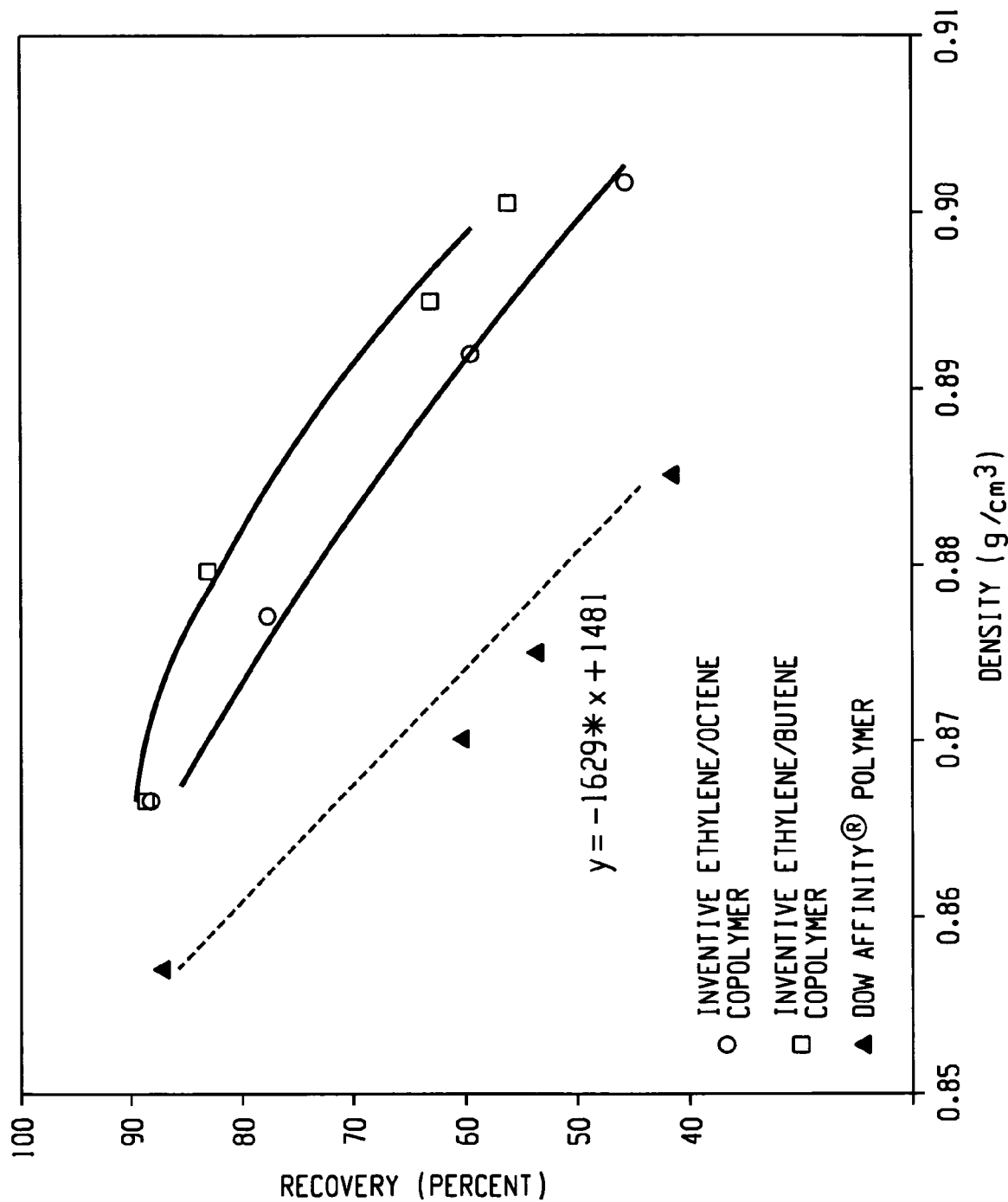
FIG. 3 shows the effect of density on elastic recovery for unoriented films made from inventive interpolymers (represented by the squares and circles) and traditional copolymers (represented by the triangles which are various Dow AFFINITY® polymers). The squares represent inventive ethylene/butene copolymers; and the circles represent inventive ethylene/octene copolymers.

FIG. 3 shows the effect of density on elastic recovery for unoriented films made from certain inventive interpolymers and traditional random copolymers. For the same density, the inventive interpolymers have substantially higher elastic recoveries.

In some embodiments, the ethylene/α-olefin interpolymers have a tensile strength above 10 MPa, preferably a tensile strength ≧11 MPa, more preferably a tensile strength ≧13 MPa and/or an elongation at break of at least 600 percent, more preferably at least 700 percent, highly preferably at least 800 percent, and most highly preferably at least 900 percent at a crosshead separation rate of 11 cm/minute.

In other embodiments, the ethylene/α-olefin interpolymers have (1) a storage modulus ratio, G'(25° C.)/G'(100° C.), of from 1 to 50, preferably from 1 to 20, more preferably from 1 to 10; and/or (2) a 70° C. compression set of less than 80 percent, preferably less than 70 percent, especially less than 60 percent, less than 50 percent, or less than 40 percent, down to a compression set of 0 percent.

In still other embodiments, the ethylene/α-olefin interpolymers have a 70° C. compression set of less than 80 percent, less than 70 percent, less than 60 percent, or less than 50 percent. Preferably, the 70° C. compression set of the interpolymers is less than 40 percent, less than 30 percent, less than 20 percent, and may go down to about 0 percent.

In some embodiments, the ethylene/α-olefin interpolymers have a heat of fusion of less than 85 J/g and/or a pellet blocking strength of equal to or less than 100 pounds/foot$^2$ (4800 Pa), preferably equal to or less than 50 lbs/ft$^2$ (2400 Pa), especially equal to or less than 5 lbs/ft$^2$ (240 Pa), and as low as 0 lbs/ft$^2$ (0 Pa).

In other embodiments, the ethylene/α-olefin interpolymers comprise, in polymerized form, at least 50 mole percent ethylene and have a 70° C. compression set of less than 80 percent, preferably less than 70 percent or less than 60 percent, most preferably less than 40 to 50 percent and down to close zero percent.

In some embodiments, the multi-block copolymers possess a PDI fitting a Schultz-Flory distribution rather than a Poisson distribution. The copolymers are further characterized as having both a polydisperse block distribution and a polydisperse distribution of block sizes and possessing a most probable distribution of block lengths. Preferred multi-block copolymers are those containing 4 or more blocks or segments including terminal blocks. More preferably, the copolymers include at least 5, 10 or 20 blocks or segments including terminal blocks.

Comonomer content may be measured using any suitable technique, with techniques based on nuclear magnetic resonance ("NMR") spectroscopy preferred. Moreover, for polymers or blends of polymers having relatively broad TREF curves, the polymer desirably is first fractionated using TREF into fractions each having an eluted temperature range of 10° C. or less. That is, each eluted fraction has a collection temperature window of 10° C. or less. Using this technique, said block interpolymers have at least one such fraction having a higher molar comonomer content than a corresponding fraction of the comparable interpolymer.

In another aspect, the inventive polymer is an olefin interpolymer, preferably comprising ethylene and one or more copolymerizable comonomers in polymerized form, characterized by multiple blocks (i.e., at least two blocks) or segments of two or more polymerized monomer units differing in chemical or physical properties (blocked interpolymer), most preferably a multi-block copolymer, said block interpolymer having a peak (but not just a molecular fraction) which elutes between 40° C. and 130° C. (but without collecting and/or isolating individual fractions), characterized in that said peak, has a comonomer content estimated by infra-red spectroscopy when expanded using a full width/half maximum (FWHM) area calculation, has an average molar comonomer content higher, preferably at least 5 percent higher, more preferably at least 10 percent higher, than that of a comparable random ethylene interpolymer peak at the same elution temperature and expanded using a full width/half maximum (FWHM) area calculation, wherein said comparable random ethylene interpolymer has the same comonomer(s) and has a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer. The full width/half maximum (FWHM) calculation is based on the ratio of methyl to methylene response area $[CH_3/CH_2]$ from the ATREF infra-red detector, wherein the tallest (highest) peak is identified from the base line, and then the FWHM area is determined. For a distribution measured using an ATREF peak, the FWHM area is defined as the area under the curve between $T_1$ and $T_2$, where $T_1$ and $T_2$ are points determined, to the left and right of the ATREF peak, by dividing the peak height by two, and then drawing a line horizontal to the base line, that intersects the left and right portions of the ATREF curve. A calibration curve for comonomer content is made using random ethylene/α-olefin copolymers, plotting comonomer content from NMR versus FWHM area ratio of the TREF peak. For this infra-red method, the calibration curve is generated for the same comonomer type of interest. The comonomer content of TREF peak of the inventive polymer can be determined by referencing this calibration curve using its FWHM methyl methylene area ratio [$CH_3/CH_2$] of the TREF peak.

Comonomer content may be measured using any suitable technique, with techniques based on nuclear magnetic resonance (NMR) spectroscopy preferred. Using this technique, said blocked interpolymers has higher molar comonomer content than a corresponding comparable interpolymer.

Preferably, for interpolymers of ethylene and 1-octene, the block interpolymer has a comonomer content of the TREF fraction eluting between 40 and 130° C. greater than or equal to the quantity (−0.2013) T+20.07, more preferably greater than or equal to the quantity (−0.2013) T+21.07, where T is the numerical value of the peak elution temperature of the TREF fraction being compared, measured in ° C.

Figure 4:
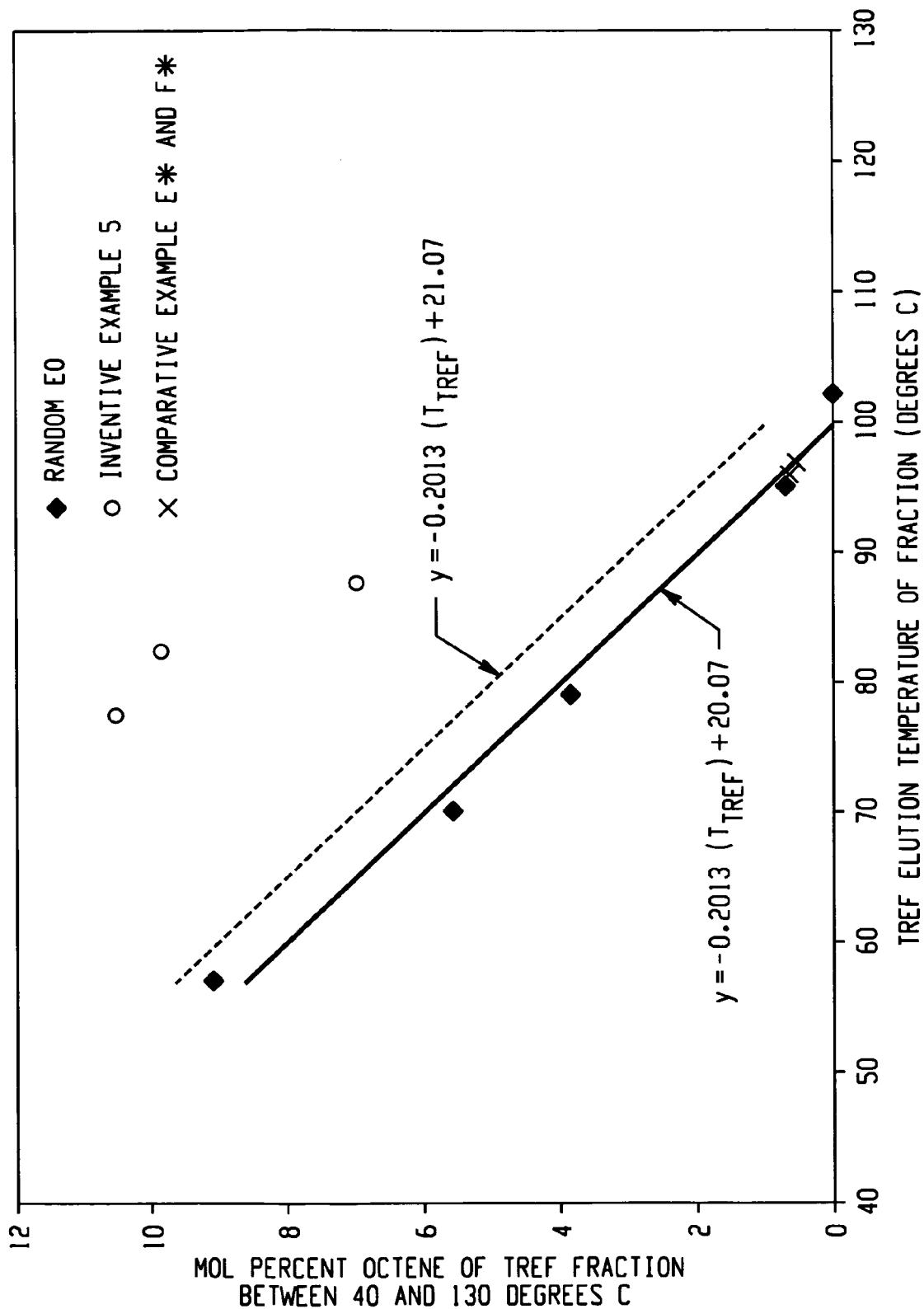
FIG. 4 is a plot of octene content of TREF fractionated ethylene/1-octene copolymer fractions versus TREF elution temperature of the fraction for the polymer of Example 5 (represented by the circles) and Comparative Examples E* and F* (represented by the "X" symbols). The diamonds represent traditional random ethylene/octene copolymers.

FIG. 4 graphically depicts an embodiment of the block interpolymers of ethylene and 1-octene where a plot of the comonomer content versus TREF elution temperature for several comparable ethylene/1-octene interpolymers (random copolymers) are fit to a line representing (−0.2013) T+20.07 (solid line). The line for the equation (−0.2013) T+21.07 is depicted by a dotted line. Also depicted are the comonomer contents for fractions of several block ethylene/1-octene interpolymers of the invention (multi-block copolymers). All of the block interpolymer fractions have significantly higher 1-octene content than either line at equivalent elution temperatures. This result is characteristic of the inventive interpolymer and is believed to be due to the presence of differentiated blocks within the polymer chains, having both crystalline and amorphous nature.

FIG. 5 graphically displays the TREF curve and comonomer contents of polymer fractions for Example 5 and Comparative Example F* to be discussed below. The peak eluting from 40 to 130° C., preferably from 60° C. to 95° C. for both polymers is fractionated into three parts, each part eluting over a temperature range of less than 110° C. Actual data for Example 5 is represented by triangles. The skilled artisan can appreciate that an appropriate calibration curve may be constructed for interpolymers containing different comonomers and a line used as a comparison fitted to the TREF values obtained from comparative interpolymers of the same monomers, preferably random copolymers made using a metallocene or other homogeneous catalyst composition. Inventive interpolymers are characterized by a molar comonomer content greater than the value determined from the calibration curve at the same TREF elution temperature, preferably at least 5 percent greater, more preferably at least 10 percent greater.

In addition to the above aspects and properties described herein, the inventive polymers can be characterized by one or more additional characteristics. In one aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that said fraction has a molar comonomer content higher, preferably at least 5 percent higher, more preferably at least 10, 15, 20 or 25 percent higher, than that of a comparable random ethylene interpolymer fraction eluting between the same temperatures, wherein said comparable random ethylene interpolymer comprises the same comonomer(s), preferably it is the same comonomer(s), and a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer.

Preferably, the above interpolymers are interpolymers of ethylene and at least one α-olefin, especially those interpolymers having a whole polymer density from about 0.855 to about 0.935 g/cm$^3$, and more especially for polymers having more than about 1 mole percent comonomer, the blocked interpolymer has a comonomer content of the TREF fraction eluting between 40 and 130° C. greater than or equal to the quantity (−0.1356) T+13.89, more preferably greater than or equal to the quantity (−0.1356) T+14.93, and most preferably greater than or equal to the quantity (−0.2013)T+21.07, where T is the numerical value of the peak ATREF elution temperature of the TREF fraction being compared, measured in ° C.

Preferably, for the above interpolymers of ethylene and at least one alpha-olefin especially those interpolymers having a whole polymer density from about 0.855 to about 0.935 g/cm$^3$, and more especially for polymers having more than about 1 mole percent comonomer, the blocked interpolymer has a comonomer content of the TREF fraction eluting between 40 and 130° C. greater than or equal to the quantity (−0.2013) T+20.07, more preferably greater than or equal to the quantity (−0.2013) T+21.07, where T is the numerical value of the peak elution temperature of the TREF fraction being compared, measured in ° C.

In still another aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction having a comonomer content of at least about 6 mole percent, has a melting point greater than about 100° C. For those fractions having a comonomer content from about 3 mole percent to about 6 mole percent, every fraction has a DSC melting point of about 110° C. or higher. More preferably, said polymer fractions, having at least 1 mol percent comonomer, has a DSC melting point that corresponds to the equation:

$$Tm \geq (-5.5926)(\text{mol percent comonomer in the fraction}) + 135.90.$$

In yet another aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction that has an ATREF elution temperature greater than or equal to about 76° C., has a melt enthalpy (heat of fusion) as measured by DSC, corresponding to the equation:

Heat of fusion (J/gm)≦(3.1718)(ATREF elution temperature in Celsius)−136.58,

The inventive block interpolymers have a molecular fraction which elutes between 40° C. and 130° C., when fractionated using TREF increments, characterized in that every fraction that has an ATREF elution temperature between 40° C. and less than about 76° C., has a melt enthalpy (heat of fusion) as measured by DSC, corresponding to the equation:

Heat of fusion (J/gm)≦(1.1312)(ATREF elution temperature in Celsius)+22.97.

ATREF Peak Comonomer Composition Measurement by Infra-Red Detector

The comonomer composition of the TREF peak can be measured using an IR4 infra-red detector available from Polymer Char, Valencia, Spain (http://www.polymerchar.com/).

The "composition mode" of the detector is equipped with a measurement sensor ($CH_2$) and composition sensor ($CH_3$) that are fixed narrow band infra-red filters in the region of 2800-3000 $cm^{-1}$. The measurement sensor detects the methylene ($CH_2$) carbons on the polymer (which directly relates to the polymer concentration in solution) while the composition sensor detects the methyl ($CH_3$) groups of the polymer. The mathematical ratio of the composition signal ($CH_3$) divided by the measurement signal ($CH_2$) is sensitive to the comonomer content of the measured polymer in solution and its response is calibrated with known ethylene alpha-olefin copolymer standards.

The detector when used with an ATREF instrument provides both a concentration ($CH_2$) and composition ($CH_3$) signal response of the eluted polymer during the TREF process. A polymer specific calibration can be created by measuring the area ratio of the $CH_3$ to $CH_2$ for polymers with known comonomer content (preferably measured by NMR). The comonomer content of an ATREF peak of a polymer can be estimated by applying a the reference calibration of the ratio of the areas for the individual $CH_3$ and $CH_2$ response (i.e. area ratio $CH_3/CH_2$ versus comonomer content).

The area of the peaks can be calculated using a full width/half maximum (FWHM) calculation after applying the appropriate baselines to integrate the individual signal responses from the TREF chromatogram. The full width/half maximum calculation is based on the ratio of methyl to methylene response area [$CH_3/CH_2$] from the ATREF infra-red detector, wherein the tallest (highest) peak is identified from the base line, and then the FWHM area is determined. For a distribution measured using an ATREF peak, the FWHM area is defined as the area under the curve between T1 and T2, where T1 and T2 are points determined, to the left and right of the ATREF peak, by dividing the peak height by two, and then drawing a line horizontal to the base line, that intersects the left and right portions of the ATREF curve.

The application of infra-red spectroscopy to measure the comonomer content of polymers in this ATREF-infra-red method is, in principle, similar to that of GPC/FTIR systems as described in the following references: Markovich, Ronald P.; Hazlitt, Lonnie G.; Smith, Linley; "Development of gel-permeation chromatography-Fourier transform infrared spectroscopy for characterization of ethylene-based polyolefin copolymers". Polymeric Materials Science and Engineering (1991), 65, 98-100.; and Deslauriers, P. J.; Rohlfing, D. C.; Shieh, E. T.; "Quantifying short chain branching microstructures in ethylene-1-olefin copolymers using size exclusion chromatography and Fourier transform infrared spectroscopy (SEC-FTIR)", Polymer (2002), 43, 59-170, both of which are incorporated by reference herein in their entirety.

In other embodiments, the inventive ethylene/α-olefin interpolymer is characterized by an average block index, ABI, which is greater than zero and up to about 1.0 and a molecular weight distribution, $M_w/M_n$, greater than about 1.3. The average block index, ABI, is the weight average of the block index ("BI") for each of the polymer fractions obtained in preparative TREF from 20° C. and 110° C., with an increment of 5° C.:

$$ABI = \Sigma(w_i BI_i)$$

where $BI_i$ is the block index for the ith fraction of the inventive ethylene/α-olefin interpolymer obtained in preparative TREF, and $w_i$ is the weight percentage of the ith fraction.

For each polymer fraction, BI is defined by one of the two following equations (both of which give the same BI value):

$$BI = \frac{1/T_X - 1/T_{XO}}{1/T_A - 1/T_{AB}} \text{ or } BI = -\frac{LnP_X - LnP_{XO}}{LnP_A - LnP_{AB}}$$

where $T_X$ is the preparative ATREF elution temperature for the ith fraction (preferably expressed in Kelvin), $P_X$ is the ethylene mole fraction for the ith fraction, which can be measured by NMR or IR as described above. $P_{AB}$ is the ethylene mole fraction of the whole ethylene/α-olefin interpolymer (before fractionation), which also can be measured by NMR or IR. $T_A$ and $P_A$ are the ATREF elution temperature and the ethylene mole fraction for pure "hard segments" (which refer to the crystalline segments of the interpolymer). As a first order approximation, the $T_A$ and $P_A$ values are set to those for high density polyethylene homopolymer, if the actual values for the "hard segments" are not available. For calculations performed herein, $T_A$ is 372° K., $P_A$ is 1.

$T_{AB}$ is the ATREF temperature for a random copolymer of the same composition and having an ethylene mole fraction of $P_{AB}$. $T_{AB}$ can be calculated from the following equation:

$$Ln\, P_{AB} = \alpha/T_{AB} + \beta$$

where α and β are two constants which can be determined by calibration using a number of known random ethylene copolymers. It should be noted that α and β may vary from instrument to instrument. Moreover, one would need to create their own calibration curve with the polymer composition of interest and also in a similar molecular weight range as the fractions. There is a slight molecular weight effect. If the calibration curve is obtained from similar molecular weight ranges, such effect would be essentially negligible. In some embodiments, random ethylene copolymers satisfy the following relationship:

$$Ln\, P = -237.83/T_{ATREF} + 0.639$$

$T_{XO}$ is the ATREF temperature for a random copolymer of the same composition and having an ethylene mole fraction of $P_X$. $T_{XO}$ can be calculated from $LnP_X = \alpha/T_{XO} + \beta$. Conversely, $P_{XO}$ is the ethylene mole fraction for a random copolymer of the same composition and having an ATREF temperature of $T_X$, which can be calculated from $Ln\, P_{XO} = \alpha/T_X + \beta$.

Once the block index (BI) for each preparative TREF fraction is obtained, the weight average block index, ABI, for the whole polymer can be calculated. In some embodiments, ABI is greater than zero but less than about 0.3 or from about 0.1 to about 0.3. In other embodiments, ABI is greater than about 0.3 and up to about 1.0. Preferably, ABI should be in the range of from about 0.4 to about 0.7, from about 0.5 to about 0.7, or from about 0.6 to about 0.9. In some embodiments, ABI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, ABI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

Another characteristic of the inventive ethylene/α-olefin interpolymer is that the inventive ethylene/α-olefin interpolymer comprises at least one polymer fraction which can be obtained by preparative TREF, wherein the fraction has a block index greater than about 0.1 and up to about 1.0 and a molecular weight distribution, $M_w/M_n$, greater than about 1.3. In some embodiments, the polymer fraction has a block index greater than about 0.6 and up to about 1.0, greater than about 0.7 and up to about 1.0, greater than about 0.8 and up to about 1.0, or greater than about 0.9 and up to about 1.0. In other embodiments, the polymer fraction has a block index greater than about 0.1 and up to about 1.0, greater than about 0.2 and up to about 1.0, greater than about 0.3 and up to about 1.0, greater than about 0.4 and up to about 1.0, or greater than about 0.4 and up to about 1.0. In still other embodiments, the polymer fraction has a block index greater than about 0.1 and up to about 0.5, greater than about 0.2 and up to about 0.5, greater than about 0.3 and up to about 0.5, or greater than about 0.4 and up to about 0.5. In yet other embodiments, the polymer fraction has a block index greater than about 0.2 and up to about 0.9, greater than about 0.3 and up to about 0.8, greater than about 0.4 and up to about 0.7, or greater than about 0.5 and up to about 0.6.

For copolymers of ethylene and an α-olefin, the inventive polymers preferably possess (1) a PDI of at least 1.3, more preferably at least 1.5, at least 1.7, or at least 2.0, and most preferably at least 2.6, up to a maximum value of 5.0, more preferably up to a maximum of 3.5, and especially up to a maximum of 2.7; (2) a heat of fusion of 80 J/g or less; (3) an ethylene content of at least 50 weight percent; (4) a glass transition temperature, $T_g$, of less than −25° C., more preferably less than −30° C., and/or (5) one and only one $T_m$.

Further, the inventive polymers can have, alone or in combination with any other properties disclosed herein, a storage modulus, G', such that log (G') is greater than or equal to 400 kPa, preferably greater than or equal to 1.0 MPa, at a temperature of 100° C. Moreover, the inventive polymers possess a relatively flat storage modulus as a function of temperature in the range from 0 to 100° C. (illustrated in FIG. 6) that is characteristic of block copolymers, and heretofore unknown for an olefin copolymer, especially a copolymer of ethylene and one or more $C_{3-8}$ aliphatic α-olefins. (By the term "relatively flat" in this context is meant that log G' (in Pascals) decreases by less than one order of magnitude between 50 and 100° C., preferably between 0 and 100° C.).

The inventive interpolymers may be further characterized by a thermomechanical analysis penetration depth of 1 mm at a temperature of at least 90° C. as well as a flexural modulus of from 3 kpsi (20 MPa) to 13 kpsi (90 MPa). Alternatively, the inventive interpolymers can have a thermomechanical analysis penetration depth of 1 mm at a temperature of at least 104° C. as well as a flexural modulus of at least 3 kpsi (20 MPa). They may be characterized as having an abrasion resistance (or volume loss) of less than 90 mm$^3$. FIG. 7 shows the TMA (1 mm) versus flex modulus for the inventive polymers, as compared to other known polymers. The inventive polymers have significantly better flexibility-heat resistance balance than the other polymers.

Additionally, the ethylene/α-olefin interpolymers can have a melt index, I2, from 0.01 to 2000 g/10 minutes, preferably from 0.01 to 1000 g/10 minutes, more preferably from 0.01 to 500 g/10 minutes, and especially from 0.01 to 100 g/10 minutes. In certain embodiments, the ethylene/α-olefin interpolymers have a melt index, $I_2$, from 0.01 to 10 g/10 minutes, from 0.5 to 50 g/10 minutes, from 1 to 30 g/10 minutes, from 1 to 6 g/10 minutes or from 0.3 to 10 g/10 minutes. In certain embodiments, the melt index for the ethylene/α-olefin polymers is 1 g/10 minutes, 3 g/10 minutes or 5 g/10 minutes.

The polymers can have molecular weights, $M_w$, from 1,000 g/mole to 5,000,000 g/mole, preferably from 1000 g/mole to 1,000,000, more preferably from 10,000 g/mole to 500,000 g/mole, and especially from 10,000 g/mole to 300,000 g/mole. The density of the inventive polymers can be from 0.80 to 0.99 g/cm$^3$ and preferably for ethylene containing polymers from 0.85 g/cm$^3$ to 0.97 g/cm$^3$. In certain embodiments, the density of the ethylene/α-olefin polymers ranges from 0.860 to 0.925 g/cm$^3$ or 0.867 to 0.910 g/cm$^3$.

The process of making the polymers has been disclosed in the following patent applications: U.S. Provisional Application No. 60/553,906, filed Mar. 17, 2004; U.S. Provisional Application No. 60/662,937, filed Mar. 17, 2005; U.S. Provisional Application No. 60/662,939, filed Mar. 17, 2005; U.S. Provisional Application No. 60/566,2938, filed Mar. 17, 2005; PCT Application No. PCT/US2005/008916, filed Mar. 17, 2005; PCT Application No. PCT/US2005/008915, filed Mar. 17, 2005; and PCT Application No. PCT/US2005/008917, filed Mar. 17, 2005, all of which are incorporated by reference herein in their entirety. For example, one such method comprises contacting ethylene and optionally one or more addition polymerizable monomers other than ethylene under addition polymerization conditions with a catalyst composition comprising:

the admixture or reaction product resulting from combining:

(A) a first olefin polymerization catalyst having a high comonomer incorporation index, (B) a second olefin polymerization catalyst having a comonomer incorporation index less than 90 percent, preferably less than 50 percent, most preferably less than 5 percent of the comonomer incorporation index of catalyst (A), and (C) a chain shuttling agent.

Representative catalysts and chain shuttling agent are as follows.

Catalyst (A1) is [N-(2,6-di(1-methylethyl)phenyl)amido) (2-isopropylphenyl)(α-naphthalen-2-diyl(6-pyridin-2-diyl) methane)]hafnium dimethyl, prepared according to the teachings of WO 03/40195, 2003US0204017, U.S. Ser. No. 10/429,024, filed May 2, 2003, and WO 04/24740.

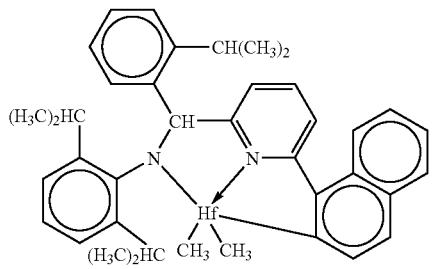

Catalyst (A2) is [N-(2,6-di(1-methylethyl)phenyl)amido) (2-methylphenyl)(1,2-phenylene-(6-pyridin-2-diyl)methane)]hafnium dimethyl, prepared according to the teachings of WO 03/40195, 2003US0204017, U.S. Ser. No. 10/429,024, filed May 2, 2003, and WO 04/24740.

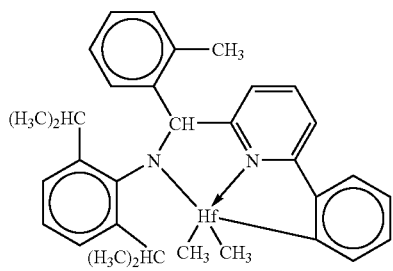

Catalyst (A3) is bis[N,N'''-(2,4,6-tri(methylphenyl)amido) ethylenediamine]hafnium dibenzyl.

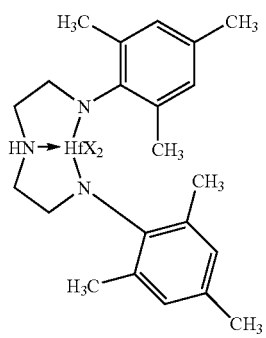

X = CH₂C₆H₅

Catalyst (A4) is bis((2-oxoyl-3-(dibenzo-1H-pyrrole-1-yl)-5-(methyl)phenyl)-2-phenoxymethyl)cyclohexane-1,2-diyl zirconium (IV) dibenzyl, prepared substantially according to the teachings of US-A-2004/0010103.

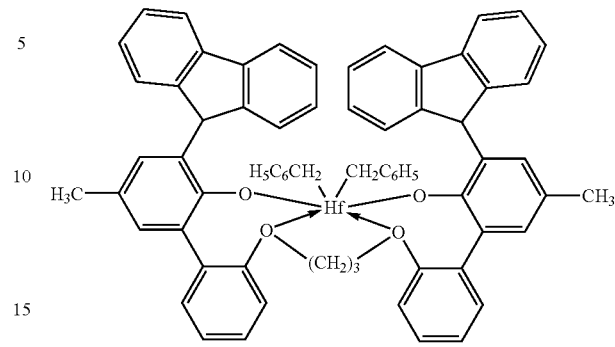

Catalyst (B1) is 1,2-bis-(3,5-di-t-butylphenylene)(1-(N-(1-methylethyl)immino)methyl)(2-oxoyl) zirconium dibenzyl

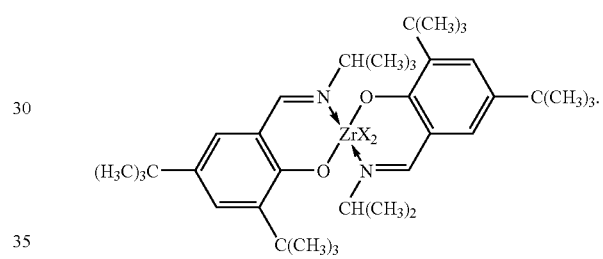

X = CH₂C₆H₅

Catalyst (B2) is 1,2-bis-(3,5-di-t-butylphenylene)(1-(N-(2-methylcyclohexyl)-immino)methyl)(2-oxoyl) zirconium dibenzyl

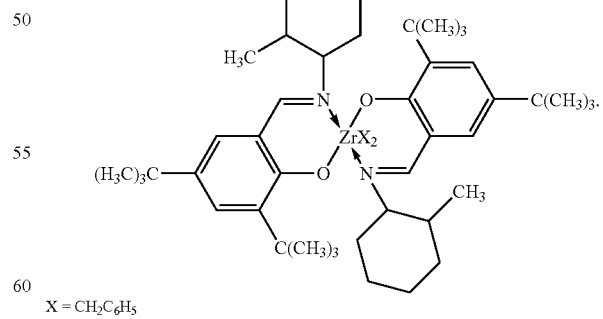

X = CH₂C₆H₅

Catalyst (C1) is (t-butylamido)dimethyl(3-N-pyrrolyl-1,2,3,3a,7a-η-inden-1-yl)silanetitanium dimethyl prepared substantially according to the techniques of U.S. Pat. No. 6,268,444:

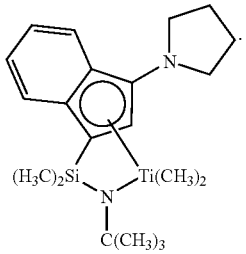

Catalyst (C2) is (t-butylamido)di(4-methylphenyl)(2-methyl-1,2,3,3a,7a-η-inden-1-yl)silanetitanium dimethyl prepared substantially according to the teachings of US-A-2003/004286:

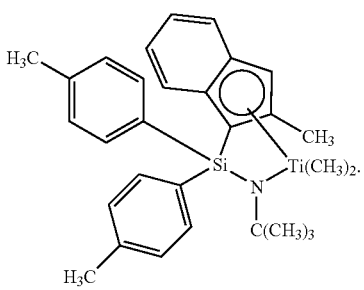

Catalyst (C3) is (t-butylamido)di(4-methylphenyl)(2-methyl-1,2,3,3a,8a-η-s-indacen-1-yl)silanetitanium dimethyl prepared substantially according to the teachings of US-A-2003/004286:

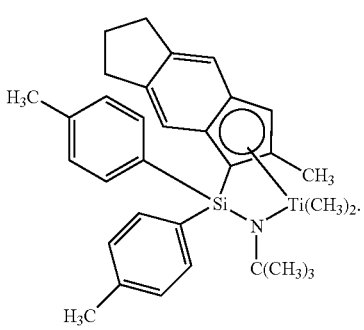

Catalyst (D1) is bis(dimethyldisiloxane)(indene-1-yl)zirconium dichloride available from Sigma-Aldrich:

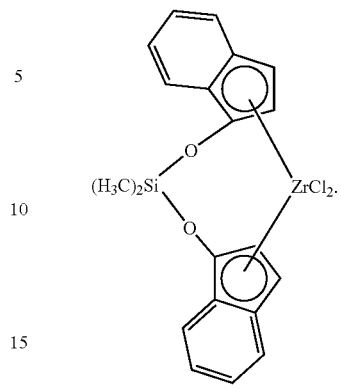

Shuttling Agents The shuttling agents employed include diethylzinc, di(i-butyl)zinc, di(n-hexyl)zinc, triethylaluminum, trioctylaluminum, triethylgallium, i-butylaluminum bis(dimethyl(t-butyl)siloxane), i-butylaluminum bis(di(trimethylsilyl)amide), n-octylaluminum di(pyridine-2-methoxide), bis(n-octadecyl)i-butylaluminum, i-butylaluminum bis(di(n-pentyl)amide), n-octylaluminum bis(2,6-di-t-butylphenoxide), n-octylaluminum di(ethyl(1-naphthyl)amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide, ethylzinc (2,6-diphenylphenoxide), and ethylzinc (t-butoxide).

Preferably, the foregoing process takes the form of a continuous solution process for forming block copolymers, especially multi-block copolymers, preferably linear multi-block copolymers of two or more monomers, more especially ethylene and a $C_{3-20}$ olefin or cycloolefin, and most especially ethylene and a $C_{4-20}$ α-olefin, using multiple catalysts that are incapable of interconversion. That is, the catalysts are chemically distinct. Under continuous solution polymerization conditions, the process is ideally suited for polymerization of mixtures of monomers at high monomer conversions. Under these polymerization conditions, shuttling from the chain shuttling agent to the catalyst becomes advantaged compared to chain growth, and multi-block copolymers, especially linear multi-block copolymers are formed in high efficiency.

The inventive interpolymers may be differentiated from conventional, random copolymers, physical blends of polymers, and block copolymers prepared via sequential monomer addition, fluxional catalysts, anionic or cationic living polymerization techniques. In particular, compared to a random copolymer of the same monomers and monomer content at equivalent crystallinity or modulus, the inventive interpolymers have better (higher) heat resistance as measured by melting point, higher TMA penetration temperature, higher high-temperature tensile strength, and/or higher high-temperature torsion storage modulus as determined by dynamic mechanical analysis. Compared to a random copolymer containing the same monomers and monomer content, the inventive interpolymers have lower compression set, particularly at elevated temperatures, lower stress relaxation, higher creep resistance, higher tear strength, higher blocking resistance, faster setup due to higher crystallization (solidification) temperature, higher recovery (particularly at elevated temperatures), better abrasion resistance, higher retractive force, and better oil and filler acceptance.

The inventive interpolymers also exhibit a unique crystallization and branching distribution relationship. That is, the inventive interpolymers have a relatively large difference between the tallest peak temperature measured using CRYSTAF and DSC as a function of heat of fusion, especially as compared to random copolymers containing the same monomers and monomer level or physical blends of polymers, such as a blend of a high density polymer and a lower density copolymer, at equivalent overall density. It is believed that this unique feature of the inventive interpolymers is due to the unique distribution of the comonomer in blocks within the polymer backbone. In particular, the inventive interpolymers may comprise alternating blocks of differing comonomer content (including homopolymer blocks). The inventive interpolymers may also comprise a distribution in number and/or block size of polymer blocks of differing density or comonomer content, which is a Schultz-Flory type of distribution. In addition, the inventive interpolymers also have a unique peak melting point and crystallization temperature profile that is substantially independent of polymer density, modulus, and morphology. In a preferred embodiment, the microcrystalline order of the polymers demonstrates characteristic spherulites and lamellae that are distinguishable from random or block copolymers, even at PDI values that are less than 1.7, or even less than 1.5, down to less than 1.3.

Moreover, the inventive interpolymers may be prepared using techniques to influence the degree or level of blockiness. That is the amount of comonomer and length of each polymer block or segment can be altered by controlling the ratio and type of catalysts and shuttling agent as well as the temperature of the polymerization, and other polymerization variables. A surprising benefit of this phenomenon is the discovery that as the degree of blockiness is increased, the optical properties, tear strength, and high temperature recovery properties of the resulting polymer are improved. In particular, haze decreases while clarity, tear strength, and high temperature recovery properties increase as the average number of blocks in the polymer increases. By selecting shuttling agents and catalyst combinations having the desired chain transferring ability (high rates of shuttling with low levels of chain termination) other forms of polymer termination are effectively suppressed. Accordingly, little if any β-hydride elimination is observed in the polymerization of ethylene/α-olefin comonomer mixtures according to embodiments of the invention, and the resulting crystalline blocks are highly, or substantially completely, linear, possessing little or no long chain branching.

Polymers with highly crystalline chain ends can be selectively prepared in accordance with embodiments of the invention. In elastomer applications, reducing the relative quantity of polymer that terminates with an amorphous block reduces the intermolecular dilutive effect on crystalline regions. This result can be obtained by choosing chain shuttling agents and catalysts having an appropriate response to hydrogen or other chain terminating agents. Specifically, if the catalyst which produces highly crystalline polymer is more susceptible to chain termination (such as by use of hydrogen) than the catalyst responsible for producing the less crystalline polymer segment (such as through higher comonomer incorporation, regio-error, or atactic polymer formation), then the highly crystalline polymer segments will preferentially populate the terminal portions of the polymer. Not only are the resulting terminated groups crystalline, but upon termination, the highly crystalline polymer forming catalyst site is once again available for reinitiation of polymer formation. The initially formed polymer is therefore another highly crystalline polymer segment. Accordingly, both ends of the resulting multi-block copolymer are preferentially highly crystalline.

The ethylene α-olefin interpolymers used in the embodiments of the invention are preferably interpolymers of ethylene with at least one $C_3$-$C_{20}$ α-olefin. Copolymers of ethylene and a $C_3$-$C_{20}$ α-olefin are especially preferred. The interpolymers may further comprise $C_4$-$C_{18}$ diolefin and/or alkenylbenzene. Suitable unsaturated comonomers useful for polymerizing with ethylene include, for example, ethylenically unsaturated monomers, conjugated or nonconjugated dienes, polyenes, alkenylbenzenes, etc. Examples of such comonomers include $C_3$-$C_{20}$ α-olefins such as propylene, isobutylene, 1-butene, 1-hexene, 1-pentene, 4-methyl-1-pentene, 1-heptene, 1-octene, 1-nonene, 1-decene, and the like. 1-Butene and 1-octene are especially preferred. Other suitable monomers include styrene, halo- or alkyl-substituted styrenes, vinylbenzocyclobutane, 1,4-hexadiene, 1,7-octadiene, and naphthenics (e.g., cyclopentene, cyclohexene and cyclooctene).

While ethylene/α-olefin interpolymers are preferred polymers, other ethylene/olefin polymers may also be used. Olefins as used herein refer to a family of unsaturated hydrocarbon-based compounds with at least one carbon-carbon double bond. Depending on the selection of catalysts, any olefin may be used in embodiments of the invention. Preferably, suitable olefins are $C_3$-$C_{20}$ aliphatic and aromatic compounds containing vinylic unsaturation, as well as cyclic compounds, such as cyclobutene, cyclopentene, dicyclopentadiene, and norbornene, including but not limited to, norbornene substituted in the 5 and 6 position with $C_1$-$C_{20}$ hydrocarbyl or cyclohydrocarbyl groups. Also included are mixtures of such olefins as well as mixtures of such olefins with $C_4$-$C_{40}$ diolefin compounds.

Examples of olefin monomers include, but are not limited to propylene, isobutylene, 1-butene, 1-pentene, 1-hexene, 1-heptene, 1-octene, 1-nonene, 1-decene, and 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, 4-vinylcyclohexene, vinylcyclohexane, norbornadiene, ethylidene norbornene, cyclopentene, cyclohexene, dicyclopentadiene, cyclooctene, $C_4$-$C_{40}$ dienes, including but not limited to 1,3-butadiene, 1,3-pentadiene, 1,4-hexadiene, 1,5-hexadiene, 1,7-octadiene, 1,9-decadiene, other $C_4$-$C_{40}$ α-olefins, and the like. In certain embodiments, the α-olefin is propylene, 1-butene, 1-pentene, 1-hexene, 1-octene or a combination thereof. Although any hydrocarbon containing a vinyl group potentially may be used in embodiments of the invention, practical issues such as monomer availability, cost, and the ability to conveniently remove unreacted monomer from the resulting polymer may become more problematic as the molecular weight of the monomer becomes too high.

The polymerization processes described herein are well suited for the production of olefin polymers comprising monovinylidene aromatic monomers including styrene, o-methyl styrene, p-methyl styrene, t-butylstyrene, and the like. In particular, interpolymers comprising ethylene and styrene can be prepared by following the teachings herein. Optionally, copolymers comprising ethylene, styrene and a $C_3$-$C_{20}$ alpha olefin, optionally comprising a $C_4$-$C_{20}$ diene, having improved properties can be prepared.

Suitable non-conjugated diene monomers can be a straight chain, branched chain or cyclic hydrocarbon diene having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD).

One class of desirable polymers that can be made in accordance with embodiments of the invention are elastomeric interpolymers of ethylene, a $C_3$-$C_{20}$ α-olefin, especially propylene, and optionally one or more diene monomers. Preferred α-olefins for use in this embodiment of the present invention are designated by the formula $CH_2=CHR^*$, where $R^*$ is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. A particularly preferred α-olefin is propylene. The propylene based polymers are generally referred to in the art as EP or EPDM polymers. Suitable dienes for use in preparing such polymers, especially multi-block EPDM type polymers include conjugated or non-conjugated, straight or branched chain-, cyclic- or polycyclic-dienes comprising from 4 to 20 carbons. Preferred dienes include 1,4-pentadiene, 1,4-hexadiene, 5-ethylidene-2-norbornene, dicyclopentadiene, cyclohexadiene, and 5-butylidene-2-norbornene. A particularly preferred diene is 5-ethylidene-2-norbornene.

Because the diene containing polymers comprise alternating segments or blocks containing greater or lesser quantities of the diene (including none) and α-olefin (including none), the total quantity of diene and α-olefin may be reduced without loss of subsequent polymer properties. That is, because the diene and α-olefin monomers are preferentially incorporated into one type of block of the polymer rather than uniformly or randomly throughout the polymer, they are more efficiently utilized and subsequently the crosslink density of the polymer can be better controlled. Such crosslinkable elastomers and the cured products have advantaged properties, including higher tensile strength and better elastic recovery.

In some embodiments, the inventive interpolymers made with two catalysts incorporating differing quantities of comonomer have a weight ratio of blocks formed thereby from 95:5 to 5:95. The elastomeric polymers desirably have an ethylene content of from 20 to 90 percent, a diene content of from 0.1 to 10 percent, and an α-olefin content of from 10 to 80 percent, based on the total weight of the polymer. Further preferably, the multi-block elastomeric polymers have an ethylene content of from 60 to 90 percent, a diene content of from 0.1 to 10 percent, and an α-olefin content of from 10 to 40 percent, based on the total weight of the polymer. Preferred polymers are high molecular weight polymers, having a weight average molecular weight (Mw) from 10,000 to about 2,500,000, preferably from 20,000 to 500,000, more preferably from 20,000 to 350,000, and a polydispersity less than 3.5, more preferably less than 3.0, and a Mooney viscosity (ML (1+4) 125° C.) from 1 to 250. More preferably, such polymers have an ethylene content from 65 to 75 percent, a diene content from 0 to 6 percent, and an α-olefin content from 20 to 35 percent.

The ethylene/α-olefin interpolymers can be functionalized by incorporating at least one functional group in its polymer structure. Exemplary functional groups may include, for example, ethylenically unsaturated mono- and di-functional carboxylic acids, ethylenically unsaturated mono- and di-functional carboxylic acid anhydrides, salts thereof and esters thereof. Such functional groups may be grafted to an ethylene/α-olefin interpolymer, or it may be copolymerized with ethylene and an optional additional comonomer to form an interpolymer of ethylene, the functional comonomer and optionally other comonomer(s). Means for grafting functional groups onto polyethylene are described for example in U.S. Pat. Nos. 4,762,890, 4,927,888, and 4,950,541, the disclosures of these patents are incorporated herein by reference in their entirety. One particularly useful functional group is malic anhydride.

The amount of the functional group present in the functional interpolymer can vary. The functional group can typically be present in a copolymer-type functionalized interpolymer in an amount of at least about 1.0 weight percent, preferably at least about 5 weight percent, and more preferably at least about 7 weight percent. The functional group will typically be present in a copolymer-type functionalized interpolymer in an amount less than about 40 weight percent, preferably less than about 30 weight percent, and more preferably less than about 25 weight percent.

The amount of the ethylene/α-olefin interpolymer in the polymer blend disclosed herein can be from about 5 to about 95 wt %, from about 10 to about 90 wt %, from about 20 to about 80 wt %, from about 30 to about 70 wt %, from about 10 to about 50 wt %, from about 50 to about 90 wt %, from about 60 to about 90 wt %, or from about 70 to about 90 wt % of the total weight of the polymer blend.

Polyolefins

As discussed above, the polymer blends comprise at least one polyolefin which may improve or modify the properties of the ethylene/α-olefin interpolymer. Preferably, the polyolefin should have a MS of at least about 6 cN. In some embodiments, the MS of the polyolefin is at least about 7 cN, at least about 8 cN, at least about 9 cN, at least about 10 cN, at least about 13 cN, at least about 15 cN, at least about 17 cN, or at least about 20 cN. Generally, the MS of the polyolefin is less than about 200 cN, preferably less than about 150 cN, less than about 100 cN, or less than about 50 cN. Typically, the compression set at 70° C. of such polyoelfins is greater than about 50 percent. In some embodiments, the compression set at 70° C. is greater than about 60 percent, greater than about 70 percent, greater than about 80 percent, or greater than about 90 percent.

Suitable polyolefins are polymers derived from one or more olefins. An olefin (i.e., alkene) is a hydrocarbon than contains at least one carbon-carbon double bond. Some non-limiting examples of olefins include linear or branched, cyclic or acyclic, alkenes having from 2 to about 20 carbon atoms. In some embodiments, the alkene has between 2 and about 10 carbon atoms. In other embodiments, the alkene contains at least two carbon-carbon double bonds, such as butadiene and 1,5-hexadiene. In further embodiments, at least one of the hydrogen atoms of the alkene is substituted with an alkyl or aryl. In particular embodiments, the alkene is ethylene, propylene, 1-butene, 1-hexene, 1-octene, 1-decene, 4-methyl-1- pentene, norbornene, 1-decene, butadiene, 1,5-hexadiene, styrene or a combination thereof.

Any polyolefin meeting the various criteria disclosed herein may be used to prepare the polymer blend disclosed herein. Non-limiting examples of polyolefins include polyethylenes (e.g., ultralow, low, linear low, medium, high and ultrahigh density polyethylene); polypropylenes (e.g., low and high density polypropylene); polybutylenes (e.g., polybutene-1); polypentene-1; polyhexene-1; polyoctene-1; polydecene-1; poly-3-methylbutene-1; poly-4-methylpentene-1; polyisoprene; polybutadiene; poly-1,5-hexadiene; interpolymers derived from olefins; interpolymers derived from olefins and other polymers such as polyvinyl chloride, polystyrene, polyurethane, and the like; and mixtures thereof. In some embodiments, the polyolefin is a homopolymer such as polyethylene, polypropylene, polybutylene, polypentene-1, poly-3-methylbutene-1, poly-4-methylpentene-1, polyisoprene, polybutadiene, poly-1,5-hexadiene, polyhexene-1, polyoctene-1 and polydecene-1. In other embodiments, the polyolefin is polypropylene or high density polyethylene (HDPE).

The amount of the polyolefin in the polymer blend can be from about 5 to about 95 wt %, from about 10 to about 90 wt %, from about 20 to about 80 wt %, from about 30 to about 70 wt %, from about 10 to about 50 wt %, from about 50 to about 80 wt %, from about 60 to about 90 wt %, or from about 10 to about 30 wt % of the total weight of the polymer blend.

A preferred class of polyolefins is high MS ethylene polymers. Any ethylene polymers with a MS of at least 6 cN can be used. An ethylene polymer is any polymer comprising greater than fifty mole percent of —$CH_2$—$CH_2$— repeating units as derived from an ethylene monomer or comonomer. Suitable ethylene polymers for use in embodiments of the invention include any ethylene-containing polymers, both homopolymers and copolymers. Examples of ethylene polymers include, but are not limited to, ethylene homopolymers and ethylene interpolymers, such as low density polyethylene (LDPE), heterogeneously branched ethylene/.alpha.-olefin interpolymer (i.e., linear low density polyethylene (LLDPE), ultra low density polyethylene (ULDPE)), substantially linear ethylene polymers (SLEP), and homogeneously branched ethylene polymer.

In some embodiments, the ethylene polymers are homogeneously branched ("homogeneous") ethylene polymers, such as homogeneously branched linear ethylene/α-olefin interpolymers as described by Elston in U.S. Pat. No. 3,645,992 or homogeneously branched substantially linear ethylene polymers as described by Lai et al. in U.S. Pat. Nos. 5,272,236, 5,278,272, 5,665,800 and 5,783,638, the disclosures of which are incorporated herein by reference. Homogeneously branched polymers are ethylene interpolymers in which the comonomer is randomly distributed within a given interpolymer molecule and substantially all of the interpolymer molecules have the same ethylene/comonomer ratio, whereas heterogeneous interpolymers are those in which the interpolymer molecules do not have the same ethylene/comonomer ratio.

Homogeneous interpolymers can also be characterized by their SCBDI (Short Chain Branch Distribution Index) or CDBI (Composition Distribution Branch Index). The SCBDI or CBDI is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, in Wild et al, Journal of Polymer Science, Poly. Phys. Ed., Vol. 20, p. 441 (1982), in U.S. Pat. No. 4,798,081 (Hazlitt et al.), or U.S. Pat. No. 5,089,321 (Chum et al.), all disclosures of which are incorporated herein by reference. Homogeneously branched linear ethylene interpolymers have a homogeneous (or narrow) short branching distribution (i.e., the polymer has a relatively high SCBDI or CDBI) but does not have long chain branching. That is, the ethylene interpolymer has an absence of long chain branching and a linear polymer backbone in the conventional sense of the term "linear." The SCBDI or CDBI for the homogeneous interpolymers and copolymers is preferably greater than about 50 percent, more preferably equal to or greater than about 70 percent. Homogeneous interpolymers and polymers generally have a degree of branching less than or equal to 2 methyls/1000 carbons in about 15 percent (by weight) or less, preferably less than about 10 percent (by weight), and especially less than about 5 percent (by weight).

In some embodiments, substantially linear ethylene polymers with long-chain branching are used. The term "substantially linear ethylene polymer" as used herein means that the bulk ethylene polymer is substituted, on average, with about 0.01 long chain branches/1000 total carbons to about 3 long chain branches/1000 total carbons (wherein "total carbons" includes both backbone and branch carbons). Some substantially linear ethylene polymers are substituted with about 0.01 long chain branches/1000 total carbons to about 1 long chain branches/1000 total carbons, preferably from about 0.05 long chain branches/1000 total carbons to about 1 long chain branched/1000 total carbons, and more preferably from about 0.3 long chain branches/1000 total carbons to about 1 long chain branches/1000 total carbons.

Long chain branching (LCB) may be defined herein as a chain length of at least about 6 carbons, above which the length cannot be distinguished by using $^{13}C$ nuclear magnetic resonance spectroscopy. Alternatively, LCB may be defined as a chain length of at least one (1) carbon less than the number of carbons in the comonomer. For example, an ethylene/1-octene polymer may have backbones with long chain branches of at least seven (7) carbons in length, but it also may have short chain branches of only six (6) carbons in length. Sometimes, a long chain branch can be as long as the polymer backbone.

Long chain branching can be distinguished from short chain branching by using $^{13}C$ nuclear magnetic resonance (NMR) spectroscopy and to a limited extent, e.g. for ethylene homopolymers, it can be quantified using the method of Randall, (Rev. Macromol. Chem. Phys., C29 (2 & 3), p. 285-297), the disclosure of which is incorporated herein by reference. However as a practical matter, current $^{13}C$ nuclear magnetic resonance spectroscopy cannot determine the length of a long chain branch in excess of about six (6) carbon atoms and as such, this analytical technique cannot distinguish between a seven (7) carbon branch and a seventy (70) carbon branch. As noted previously, long chain branches can be as long as a polymer backbone.

Although conventional $^{13}C$ nuclear magnetic resonance spectroscopy cannot determine the length of a long chain branch in excess of six carbon atoms, there are other known techniques useful for quantifying or determining the presence of long chain branches in ethylene polymers, including ethylene/1-octene interpolymers. For example, U.S. Pat. No. 4,500,648, incorporated herein by reference, teaches that long chain branching frequency (LCB) can be represented by the equation $LCB=b/M_W$ wherein b is the weight average number of long chain branches per molecule and $M_W$ is the weight average molecular weight. The molecular weight averages and the long chain branching characteristics are determined by gel permeation chromatography and intrinsic viscosity methods, respectively.

For substantially linear ethylene polymers, the long chain branch is longer than the short chain branch that results from the incorporation of the alpha.-olefin(s) into the polymer backbone. The empirical effect of the presence of long chain branching in the substantially linear ethylene polymers used in the invention is manifested as enhanced Theological properties which are quantified and expressed herein in terms of gas extrusion rheometry (GER) results and/or melt flow, $I_{10}/I_2$, increases.

The substantially linear ethylene polymers used in embodiments of the invention are disclosed in the following U.S. Pat. Nos. 5,272,236; 5,278,272; 5,783,638; and 6,060,567. The disclosure of all of the preceding patents are incorporated by reference herein in their entirety.

Metallocene single site polymerization catalysts (for example, the monocyclo-pentadienyl transition metal olefin polymerization catalysts described by Canich in U.S. Pat. No. 5,026,798 or by Canich in U.S. Pat. No. 5,055,438) or constrained geometry catalysts (for example, as described by Stevens et al. in U.S. Pat. No. 5,064,802) can be used to manufacture substantially linear ethylene polymers in a manner consistent with the methods described in U.S. Pat. No. 5,272,236 and in U.S. Pat. No. 5,278,272. Additional polymerization methods are also described in PCT/US 92/08812 (filed Oct. 15, 1992). Preferably, the substantially linear ethylene polymers are manufactured using suitable constrained geometry catalysts, especially constrained geometry catalysts as disclosed in U.S. application Ser. Nos. 545,403, filed Jul. 3, 1990; U.S. Pat. Nos. 5,132,380; 5,064,802; 5,153,157; 5,470,993; 5,453,410; 5,374,696; 5,532,394; 5,494,874; 5,189,192; the disclosures of all of which are incorporated herein by reference in their entirety. Both metallocene and constrained geometry catalysts may be referred to as single-site catalysts in the art.

The substantially linear ethylene polymers used in embodiments of the invention are interpolymers of ethylene with at least one $C_3$-$C_{20}$ α-olefin and/or $C_4$-$C_{18}$ diolefin. Copolymers of ethylene and an α-olefin of $C_3$-$C_{20}$ carbon atoms are especially preferred. The term "interpolymer" is used herein to indicate a copolymer, or a terpolymer, or the like, where at least one other comonomer is polymerized with ethylene to make the interpolymer.

Suitable unsaturated comonomers useful for polymerizing with ethylene include, for example, ethylenically unsaturated monomers, conjugated or non-conjugated dienes, polyenes, etc. Examples of such comonomers include $C_3$-$C_{20}$ α-olefins such as propylene, isobutylene, 1-butene, 1-hexene, 1-pentene, 4-methyl-1-pentene, 1-heptene, 1-octene, 1-nonene, 1-decene, and the like. Preferred comonomers include propylene, 1-butene, 1-pentene, 1-hexene, 4-methyl-1-pentene, 1-heptene, and 1-octene, and 1-heptene and 1-octene are especially preferred and 1-octene is most especially preferred.

Other suitable monomers include styrene, halo- or alkyl-substituted styrenes, tetrafluoroethylene, vinylbenzocyclobutane, 1,4-hexadiene, 1,7-octadiene, and cycloalkenes, e.g., cyclopentene, cyclohexene and cyclooctene.

The substantially linear ethylene polymers typically are characterized by a single melting peak as determined using differential scanning calorimetry (DSC). However, the single melt peak may show, depending on equipment sensitivity, a "shoulder" or a "hump" on the side lower of the melting peak (i.e. below the melting point) that constitutes less than 12 percent, typically less than 9 percent, more typically less than 6 percent, of the total heat of fusion of the polymer. This shoulder generally occurs within 34° C., typically within 27° C., and more typically within 20° C. of the melting point of the single melting peak.

The single melting peak is determined by using a differential scanning calorimeter standardized with indium and deionized water. The method involves about 5-7 mg sample sizes, a "first heat" to about 150° C. which is held for 4 minutes, a cool down at 10° C./min. to -30° C. which is held for 3 minutes, and heat up at 10° C./min. to 150° C. to provide a "second heat" heat flow vs. temperature curve. Total heat of fusion of the polymer is calculated from the area under the curve. The heat of fusion attributable to a shoulder or hump artifact, if present, can be determined using an analytical balance and weight-percent calculations.

The molecular weight distributions of ethylene polymers are determined by gel permeation chromatography (GPC) on a Waters 150° C. high temperature chromatographic unit equipped with a differential refractometer and three columns of mixed porosity. The columns are supplied by Polymer Laboratories and are commonly packed with pore sizes of $10^3$, $10^4$, $10^5$ and $10^6$.Å ... The solvent is 1,2,4-trichlorobenzene, from which about 0.3 percent by weight solutions of the samples are prepared for injection. The flow rate is about 1.0 milliliters/minute, unit operating temperature is about 140° C. and the injection size is about 100 microliters.

The molecular weight determination with respect to the polymer backbone is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in Journal of Polymer Science, Polymer Letters, Vol. 6, p. 621, 1968, the disclosure of which is incorporated herein by reference) to derive the following equation:

$$M_{polyethylene} = a^* (M_{polystyrene})$$

In this equation, a=0.4316 and b=1.0. Weight average molecular weight, $M_w$, is calculated in the usual manner according to the following formula: $M_j = (\Sigma w_i (M_i^j))^j$; where $w_i$ is the weight fraction of the molecules with molecular weight $M_i$ eluting from the GPC column in fraction i and j=1 when calculating $M$, and j=-1 when calculating $M_n$.

For the ethylene polymers used in embodiments of the invention, the Mw/Mn is preferably less than 3.5, more preferably less than 3.0, most preferably less than 2.5, and especially in the range of from about 1.5 to about 2.5 and most especially in the range from about 1.8 to about 2.3.

The density of the ethylene polymers suitable for use in embodiments of the invention is generally less than 0.93 grams/centimeter (g/cc), more preferably in the range from about 0.86 g/cc to about 0.92 g/cc, and most preferably in the range from about 0.88 g/cc to about 0.9 g/cc, as measured in accordance with ASTM D-792.

The molecular weight of the ethylene polymers can be conveniently determined using a melt index measurement according to ASTM D-1238, Condition 190° C./2.16 kg (formerly known as "Condition E" and also known as $I_2$). Melt index is inversely proportional to the molecular weight of the polymer. Thus, the higher the molecular weight, the lower the melt index, although the relationship is not linear.

Preferably, the $I_2$ melt index of the ethylene polymers are in the range of from about 0.01 to about 50 g/10 minutes, more preferably from about 0.1 to about 20 g/10 minutes, and most preferably from about 0.4 and about 12 g/10 minutes.

Other measurements useful in characterizing the molecular weight of ethylene polymer compositions involve melt index determinations with higher weights, such as, ASTM D-1238, Condition 190° C./10 kg (formerly known as "Condition N" and also known as $I_{10}$). The ratio of a higher weight melt index determination to a lower weight determination is known as a melt flow ratio, and for measured $I_{10}$ and the $I_2$ melt index values the melt flow ratio is designated as $I_{10}/I_2$. Preferably, the ethylene polymers have an $I_{10}/I_2$ melt flow ratio greater than or equal to 6.8, more preferably greater than or equal to 8, and most preferably in the range of from about 8.5 to about 20 and especially in the range of about 9 to about 15.

Additives

Optionally, the polymer blends disclosed herein can comprise at least one additive for the purposes of improving and/or controlling the processibility, appearance, physical, chemical, and/or mechanical properties of the polymer blends. In some embodiments, the polymer blends do not comprise an additive. Any plastics additive known to a person of ordinary skill in the art may be used in the polymer blends disclosed herein. Non-limiting examples of suitable additives include slip agents, anti-blocking agents, plasticizers, antioxidants, UV stabilizers, colorants or pigments, fillers, lubricants, antifogging agents, flow aids, coupling agents, cross-linking agents, nucleating agents, surfactants, solvents, flame retardants, antistatic agents, and combinations thereof. The total amount of the additives can range from about greater than 0 to about 80%, from about 0.001% to about 70%, from about 0.01% to about 60%, from about 0.1% to about 50%, from about 1% to about 40%, or from about 10% to about 50% of the total weight of the polymer blend. Some polymer additives have been described in Zweifel Hans et al., "*Plastics Additives Handbook*," Hanser Gardner Publications, Cincinnati, Ohio, 5th edition (2001), which is incorporated herein by reference in its entirety.

In some embodiments, the polymer blends disclosed herein comprise a slip agent. In other embodiments, the polymer blends disclosed herein do not comprise a slip agent. Slip is the sliding of film surfaces over each other or over some other substrates. The slip performance of films can be measured by ASTM D 1894, *Static and Kinetic Coefficients of Friction of Plastic Film and Sheeting*, which is incorporated herein by reference. In general, the slip agent can convey slip properties by modifying the surface properties of films; and reducing the friction between layers of the films and between the films and other surfaces with which they come into contact.

Any slip agent known to a person of ordinary skill in the art may be added to the polymer blends disclosed herein. Non-limiting examples of the slip agents include primary amides having about 12 to about 40 carbon atoms (e.g., erucamide, oleamide, stearamide and behenamide); secondary amides having about 18 to about 80 carbon atoms (e.g., stearyl erucamide, behenyl erucamide, methyl erucamide and ethyl erucamide); secondary-bis-amides having about 18 to about 80 carbon atoms (e.g., ethylene-bis-stearamide and ethylene-bis-oleamide); and combinations thereof. In a particular embodiment, the slip agent for the polymer blends disclosed herein is an amide represented by Formula (I) below:

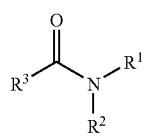

(I)

wherein each of $R^1$ and $R^2$ is independently H, alkyl, cycloalkyl, alkenyl, cycloalkenyl or aryl; and $R^3$ is alkyl or alkenyl, each having about 11 to about 39 carbon atoms, about 13 to about 37 carbon atoms, about 15 to about 35 carbon atoms, about 17 to about 33 carbon atoms or about 19 to about 33 carbon atoms. In some embodiments, $R^3$ is alkyl or alkenyl, each having at least 19 to about 39 carbon atoms. In other embodiments, $R^3$ is pentadecyl, heptadecyl, nonadecyl, heneicosanyl, tricosanyl, pentacosanyl, heptacosanyl, nonacosanyl, hentriacontanyl, tritriacontanyl, nonatriacontanyl or a combination thereof. In further embodiments, $R^3$ is pentadecenyl, heptadecenyl, nonadecenyl, heneicosanenyl, tricosanenyl, pentacosanenyl, heptacosanenyl, nonacosanenyl, hentriacontanenyl, tritriacontanenyl, nonatriacontanenyl or a combination thereof.

In a further embodiment, the slip agent for the polymer blends disclosed herein is an amide represented by Formula (II) below:

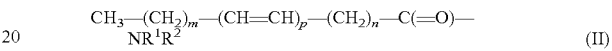

(II)

wherein each of m and n is independently an integer between about 1 and about 37; p is an integer between 0 and 3; each of $R^1$ and $R^2$ is independently H, alkyl, cycloalkyl, alkenyl, cycloalkenyl or aryl; and the sum of m, n and p is at least 8. In some embodiments, each of $R^1$ and $R^2$ of Formulae (I) and (II) is an alkyl group containing between 1 and about 40 carbon atoms or an alkenyl group containing between 2 and about 40 carbon atoms. In further embodiments, each of $R^1$ and $R^2$ of Formulae (I) and (II) is H. In certain embodiments, the sum of m, n and p is at least 18.

In some embodiments, the slip agent is a primary amide with a saturated aliphatic group having between 18 and about 40 carbon atoms (e.g., stearamide and behenamide). In other embodiments, the slip agent is a primary amide with an unsaturated aliphatic group containing at least one carbon-carbon double bond and between 18 and about 40 carbon atoms (e.g., erucamide and oleamide). In further embodiments, the slip agent is a primary amide having at least 20 carbon atoms. In further embodiments, the slip agent is erucamide, oleamide, stearamide, behenamide, ethylene-bis-stearamide, ethylene-bis-oleamide, stearyl erucamide, behenyl erucamide or a combination thereof. In a particular embodiment, the slip agent is erucamide. In further embodiments, the slip agent is commercially available having a trade name such as ATMER™ SA from Uniqema, Everberg, Belgium; ARMOSLIP® from Akzo Nobel Polymer Chemicals, Chicago, Ill.; KEMAMIDE® from Witco, Greenwich, Conn.; and CRODAMIDE® from Croda, Edison, N.J. Where used, the amount of the slip agent in the polymer blend can be from about greater than 0 to about 3 wt %, from about 0.0001 to about 2 wt %, from about 0.001 to about 1 wt %, from about 0.001 to about 0.5 wt % or from about 0.05 to about 0.25 wt % of the total weight of the polymer blend. Some slip agents have been described in Zweifel Hans et al., "*Plastics Additives Handbook*," Hanser Gardner Publications, Cincinnati, Ohio, 5th edition, Chapter 8, pages 601-608 (2001), which is incorporated herein by reference.

Optionally, the polymer blends disclosed herein can comprise an anti-blocking agent. In some embodiments, the polymer blends disclosed herein do not comprise an anti-blocking agent. The anti-blocking agent can be used to prevent the undesirable adhesion between touching layers of articles made from the polymer blends, particularly under moderate pressure and heat during storage, manufacture or use. Any anti-blocking agent known to a person of ordinary skill in the art may be added to the polymer blends disclosed herein.

Non-limiting examples of anti-blocking agents include minerals (e.g., clays, chalk, and calcium carbonate), synthetic silica gel (e.g., SYLOBLOC® from Grace Davison, Columbia, Md.), natural silica (e.g., SUPER FLOSS® from Celite Corporation, Santa Barbara, Calif.), talc (e.g., OPTIBLOC® from Luzenac, Centennial, Colo.), zeolites (e.g., SIPERNAT® from Degussa, Parsippany, N.J.), aluminosilicates (e.g., SILTON® from Mizusawa Industrial Chemicals, Tokyo, Japan), limestone (e.g., CARBOREX® from Omya, Atlanta, Ga.), spherical polymeric particles (e.g., EPOSTAR®, poly(methyl methacrylate) particles from Nippon Shokubai, Tokyo, Japan and TOSPEARL®, silicone particles from GE Silicones, Wilton, Conn.), waxes, amides (e.g. erucamide, oleamide, stearamide, behenamide, ethylene-bis-stearamide, ethylene-bis-oleamide, stearyl erucamide and other slip agents), molecular sieves, and combinations thereof. The mineral particles can lower blocking by creating a physical gap between articles, while the organic anti-blocking agents can migrate to the surface to limit surface adhesion. Where used, the amount of the anti-blocking agent in the polymer blend can be from about greater than 0 to about 3 wt %, from about 0.0001 to about 2 wt %, from about 0.001 to about 1 wt %, or from about 0.001 to about 0.5 wt % of the total weight of the polymer blend. Some anti-blocking agents have been described in Zweifel Hans et al., "*Plastics Additives Handbook*," Hanser Gardner Publications, Cincinnati, Ohio, 5th edition, Chapter 7, pages 585-600 (2001), which is incorporated herein by reference.

Optionally, the polymer blends disclosed herein can comprise a plasticizer. In general, a plasticizer is a chemical that can increase the flexibility and lower the glass transition temperature of polymers. Any plasticizer known to a person of ordinary skill in the art may be added to the polymer blends disclosed herein. Non-limiting examples of plasticizers include abietates, adipates, alkyl sulfonates, azelates, benzoates, chlorinated paraffins, citrates, epoxides, glycol ethers and their esters, glutarates, hydrocarbon oils, isobutyrates, oleates, pentaerythritol derivatives, phosphates, phthalates, esters, polybutenes, ricinoleates, sebacates, sulfonamides, tri- and pyromellitates, biphenyl derivatives, stearates, difuran diesters, fluorine-containing plasticizers, hydroxybenzoic acid esters, isocyanate adducts, multi-ring aromatic compounds, natural product derivatives, nitriles, siloxane-based plasticizers, tar-based products, thioeters and combinations thereof. Where used, the amount of the plasticizer in the polymer blend can be from greater than 0 to about 15 wt %, from about 0.5 to about 10 wt %, or from about 1 to about 5 wt % of the total weight of the polymer blend. Some plasticizers have been described in George Wypych, "*Handbook of Plasticizers*," ChemTec Publishing, Toronto-Scarborough, Ontario (2004), which is incorporated herein by reference.

In some embodiments, the polymer blends disclosed herein optionally comprise an antioxidant that can prevent the oxidation of polymer components and organic additives in the polymer blends. Any antioxidant known to a person of ordinary skill in the art may be added to the polymer blends disclosed herein. Non-limiting examples of suitable antioxidants include aromatic or hindered amines such as alkyl diphenylamines, phenyl-α-naphthylamine, alkyl or aralkyl substituted phenyl-α-naphthylamine, alkylated p-phenylene diamines, tetramethyl-diaminodiphenylamine and the like; phenols such as 2,6-di-t-butyl-4-methylphenol; 1,3,5-trimethyl-2,4,6-tris(3',5'-di-t-butyl-4'-hydroxybenzyl)benzene; tetrakis[(methylene(3,5-di-t-butyl-4-hydroxyhydrocinnamate)]methane (e.g., IRGANOX™ 1010, from Ciba Geigy, New York); acryloyl modified phenols; octadecyl-3,5-di-t-butyl-4-hydroxycinnamate (e.g., IRGANOX™ 1076, commercially available from Ciba Geigy); phosphites and phosphonites; hydroxylamines; benzofuranone derivatives; and combinations thereof. Where used, the amount of the antioxidant in the polymer blend can be from about greater than 0 to about 5 wt %, from about 0.0001 to about 2.5 wt %, from about 0.001 to about 1 wt %, or from about 0.001 to about 0.5 wt % of the total weight of the polymer blend. Some antioxidants have been described in Zweifel Hans et al., "*Plastics Additives Handbook*," Hanser Gardner Publications, Cincinnati, Ohio, 5th edition, Chapter 1, pages 1-140 (2001), which is incorporated herein by reference.

In other embodiments, the polymer blends disclosed herein optionally comprise an UV stabilizer that may prevent or reduce the degradation of the polymer blends by UV radiations. Any UV stabilizer known to a person of ordinary skill in the art may be added to the polymer blends disclosed herein. Non-limiting examples of suitable UV stabilizers include benzophenones, benzotriazoles, aryl esters, oxanilides, acrylic esters, formamidines, carbon black, hindered amines, nickel quenchers, hindered amines, phenolic antioxidants, metallic salts, zinc compounds and combinations thereof. Where used, the amount of the UV stabilizer in the polymer blend can be from about greater than 0 to about 5 wt %, from about 0.01 to about 3 wt %, from about 0.1 to about 2 wt %, or from about 0.1 to about 1 wt % of the total weight of the polymer blend. Some UV stabilizers have been described in Zweifel Hans et al., "*Plastics Additives Handbook*," Hanser Gardner Publications, Cincinnati, Ohio, 5th edition, Chapter 2, pages 141-426 (2001), which is incorporated herein by reference.

In further embodiments, the polymer blends disclosed herein optionally comprise a colorant or pigment that can change the look of the polymer blends to human eyes. Any colorant or pigment known to a person of ordinary skill in the art may be added to the polymer blends disclosed herein. Non-limiting examples of suitable colorants or pigments include inorganic pigments such as metal oxides such as iron oxide, zinc oxide, and titanium dioxide, mixed metal oxides, carbon black, organic pigments such as anthraquinones, anthanthrones, azo and monoazo compounds, arylamides, benzimidazolones, BONA lakes, diketopyrrolo-pyrroles, dioxazines, disazo compounds, diarylide compounds, flavanthrones, indanthrones, isoindolinones, isoindolines, metal complexes, monoazo salts, naphthols, b-naphthols, naphthol AS, naphthol lakes, perylenes, perinones, phthalocyanines, pyranthrones, quinacridones, and quinophthalones, and combinations thereof. Where used, the amount of the colorant or pigment in the polymer blend can be from about greater than 0 to about 10 wt %, from about 0.1 to about 5 wt %, or from about 0.25 to about 2 wt % of the total weight of the polymer blend. Some colorants have been described in Zweifel Hans et al., "*Plastics Additives Handbook*," Hanser Gardner Publications, Cincinnati, Ohio, 5th edition, Chapter 15, pages 813-882 (2001), which is incorporated herein by reference.

Optionally, the polymer blends disclosed herein can comprise a filler which can be used to adjust, inter alia, volume, weight, costs, and/or technical performance. Any filler known to a person of ordinary skill in the art may be added to the polymer blends disclosed herein. Non-limiting examples of suitable fillers include talc, calcium carbonate, chalk, calcium sulfate, clay, kaolin, silica, glass, fumed silica, mica, wollastonite, feldspar, aluminum silicate, calcium silicate, alumina, hydrated alumina such as alumina trihydrate, glass microsphere, ceramic microsphere, thermoplastic microsphere, barite, wood flour, glass fibers, carbon fibers, marble dust, cement dust, magnesium oxide, magnesium hydroxide, antimony oxide, zinc oxide, barium sulfate, titanium dioxide, titanates and combinations thereof. In some embodiments, the filler is barium sulfate, talc, calcium carbonate, silica, glass, glass fiber, alumina, titanium dioxide, or a mixture thereof. In other embodiments, the filler is talc, calcium carbonate, barium sulfate, glass fiber or a mixture thereof. Where used, the amount of the filler in the polymer blend can be from about greater than 0 to about 80 wt %, from about 0.1 to about 60 wt %, from about 0.5 to about 40 wt %, from about 1 to about 30 wt %, or from about 10 to about 40 wt % of the total weight of the polymer blend. Some fillers have been disclosed in U.S. Pat. No. 6,103,803 and Zweifel Hans et al., "*Plastics Additives Handbook*," Hanser Gardner Publications, Cincinnati, Ohio, 5th edition, Chapter 17, pages 901-948 (2001), both of which are incorporated herein by reference.

Optionally, the polymer blends disclosed herein can comprise a lubricant. In general, the lubricant can be used, inter alia, to modify the rheology of the molten polymer blends, to improve the surface finish of molded articles, and/or to facilitate the dispersion of fillers or pigments. Any lubricant known to a person of ordinary skill in the art may be added to the polymer blends disclosed herein. Non-limiting examples of suitable lubricants include fatty alcohols and their dicarboxylic acid esters, fatty acid esters of short-chain alcohols, fatty acids, fatty acid amides, metal soaps, oligomeric fatty acid esters, fatty acid esters of long-chain alcohols, montan waxes, polyethylene waxes, polypropylene waxes, natural and synthetic paraffin waxes, fluoropolymers and combinations thereof. Where used, the amount of the lubricant in the polymer blend can be from about greater than 0 to about 5 wt %, from about 0.1 to about 4 wt %, or from about 0.1 to about 3 wt % of the total weight of the polymer blend. Some suitable lubricants have been disclosed in Zweifel Hans et al., "*Plastics Additives Handbook*," Hanser Gardner Publications, Cincinnati, Ohio, 5th edition, Chapter 5, pages 511-552 (2001), both of which are incorporated herein by reference.

Optionally, the polymer blends disclosed herein can comprise an antistatic agent. Generally, the antistatic agent can increase the conductivity of the polymer blends and to prevent static charge accumulation. Any antistatic agent known to a person of ordinary skill in the art may be added to the polymer blends disclosed herein. Non-limiting examples of suitable antistatic agents include conductive fillers (e.g., carbon black, metal particles and other conductive particles), fatty acid esters (e.g., glycerol monostearate), ethoxylated alkylamines, diethanolamides, ethoxylated alcohols, alkylsulfonates, alkylphosphates, quaternary ammonium salts, alkylbetaines and combinations thereof. Where used, the amount of the antistatic agent in the polymer blend can be from about greater than 0 to about 5 wt %, from about 0.01 to about 3 wt %, or from about 0.1 to about 2 wt % of the total weight of the polymer blend. Some suitable antistatic agents have been disclosed in Zweifel Hans et al., "*Plastics Additives Handbook*," Hanser Gardner Publications, Cincinnati, Ohio, 5th edition, Chapter 10, pages 627-646 (2001), both of which are incorporated herein by reference.

In further embodiments, the polymer blends disclosed herein optionally comprise a cross-linking agent that can be used to increase the cross-linking density of the polymer blends. Any cross-linking agent known to a person of ordinary skill in the art may be added to the polymer blends disclosed herein. Non-limiting examples of suitable cross-linking agents include organic peroxides (e.g., alkyl peroxides, aryl peroxides, peroxyesters, peroxycarbonates, diacylperoxides, peroxyketals, and cyclic peroxides) and silanes (e.g., vinyltrimethoxysilane, vinyltriethoxysilane, vinyltris (2-methoxyethoxy)silane, vinyltriacetoxysilane, vinylmethyldimethoxysilane, and 3-methacryloyloxypropyltri-methoxysilane). Where used, the amount of the cross-linking agent in the polymer blend can be from about greater than 0 to about 20 wt %, from about 0.1 to about 15 wt %, or from about 1 to about 10 wt % of the total weight of the polymer blend. Some suitable cross-linking agents have been disclosed in Zweifel Hans et al., "*Plastics Additives Handbook*," Hanser Gardner Publications, Cincinnati, Ohio, 5th edition, Chapter 14, pages 725-812 (2001), both of which are incorporated herein by reference.

The cross-linking of the polymer blends can also be initiated by any radiation means known in the art, including, but not limited to, electron-beam irradiation, beta irradiation, gamma irradiation, corona irradiation, and UV radiation with or without cross-linking catalyst. U.S. patent application Ser. No. 10/086,057 (published as US2002/0132923 A1) and U.S. Pat. No. 6,803,014 disclose electron-beam irradiation methods that can be used in embodiments of the invention.

Irradiation may be accomplished by the use of high energy, ionizing electrons, ultra violet rays, X-rays, gamma rays, beta particles and the like and combination thereof. Preferably, electrons are employed up to 70 megarads dosages. The irradiation source can be any electron beam generator operating in a range of about 150 kilovolts to about 6 megavolts with a power output capable of supplying the desired dosage. The voltage can be adjusted to appropriate levels which may be, for example, 100,000, 300,000, 1,000,000 or 2,000,000 or 3,000,000 or 6,000,000 or higher or lower. Many other apparati for irradiating polymeric materials are known in the art. The irradiation is usually carried out at a dosage between about 3 megarads to about 35 megarads, preferably between about 8 to about 20 megarads. Further, the irradiation can be carried out conveniently at room temperature, although higher and lower temperatures, for example 0° C. to about 60° C., may also be employed. Preferably, the irradiation is carried out after shaping or fabrication of the article. Also, in a preferred embodiment, the ethylene interpolymer which has been incorporated with a pro-rad additive is irradiated with electron beam radiation at about 8 to about 20 megarads.

Crosslinking can be promoted with a crosslinking catalyst, and any catalyst that will provide this function can be used. Suitable catalysts generally include organic bases, carboxylic acids, and organometallic compounds including organic titanates and complexes or carboxylates of lead, cobalt, iron, nickel, zinc and tin. Dibutyltindilaurate, dioctyltinmaleate, dibutyltindiacetate, dibutyltindioctoate, stannous acetate, stannous octoate, lead naphthenate, zinc caprylate, cobalt naphthenate; and the like. Tin carboxylate, especially dibutyltindilaurate and dioctyltinmaleate, are particularly effective for this invention. The catalyst (or mixture of catalysts) is present in a catalytic amount, typically between about 0.015 and about 0.035 phr.

Representative pro-rad additives include, but are not limited to, azo compounds, organic peroxides and polyfunctional vinyl or allyl compounds such as, for example, triallyl cyanurate, triallyl isocyanurate, pentaerthrritol tetramethacrylate, glutaraldehyde, ethylene glycol dimethacrylate, diallyl maleate, dipropargyl maleate, dipropargyl monoallyl cyanurate, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy)hexane, lauryl peroxide, tert-butyl peracetate, azobisisobutyl nitrite and the like and combination thereof. Preferred pro-rad additives for use in the present invention are compounds which have poly-functional (i.e. at least two) moieties such as $C=C$, $C=N$ or $C=O$.

At least one pro-rad additive can be introduced to the ethylene interpolymer by any method known in the art. However, preferably the pro-rad additive(s) is introduced via a masterbatch concentrate comprising the same or different base resin as the ethylene interpolymer. Preferably, the pro-rad additive concentration for the masterbatch is relatively high e.g., about 25 weight percent (based on the total weight of the concentrate).

The at least one pro-rad additive is introduced to the ethylene polymer in any effective amount. Preferably, the at least one pro-rad additive introduction amount is from about 0.001 to about 5 weight percent, more preferably from about 0.005 to about 2.5 weight percent and most preferably from about 0.015 to about 1 weight percent (based on the total weight of the ethylene interpolymer.

In addition to electron-beam irradiation, crosslinking can also be effected by UV irradiation. U.S. Pat. No. 6,709,742 discloses a cross-linking method by UV irradiation which can be used in embodiments of the invention. The method comprises mixing a photoinitiator, with or without a photocrosslinker, with a polymer before, during, or after a fiber is formed and then exposing the fiber with the photoinitiator to sufficient UV radiation to crosslink the polymer to the desired level. The photoinitiators used in the practice of the invention are aromatic ketones, e.g., benzophenones or monoacetals of 1,2-diketones. The primary photoreaction of the monacetals is the homolytic cleavage of the $\alpha$-bond to give acyl and dialkoxyalkyl radicals. This type of $\alpha$-cleavage is known as a Norrish Type I reaction which is more fully described in W. Horspool and D. Armesto, Organic Photochemistry: *A Comprehensive Treatment*, Ellis Horwood Limited, Chichester, England, 1992; J. Kopecky, *Organic Photochemistry: A Visual Approach*, VCH Publishers, Inc., New York, N.Y. 1992; N. J. Turro, et al., *Acc. Chem. Res.*, 1972, 5, 92; and J. T. Banks, et al., *J. Am. Chem. Soc.*, 1993, 115, 2473. The synthesis of monoacetals of aromatic 1,2 diketones, Ar—CO—C(OR)$_2$—Ar' is described in U.S. Pat. No. 4,190,602 and Ger. Offen. U.S. Pat. No. 2,337,813. The preferred compound from this class is 2,2-dimethoxy-2-phenylacetophenone, $C_6H_5$—CO—$C(OCH_3)_2$—$C_6H_5$, which is commercially available from Ciba-Geigy as Irgacure 651. Examples of other aromatic ketones useful in the practice of this invention as photoinitiators are Irgacure 184, 369, 819, 907 and 2959, all available from Ciba-Geigy.

In one embodiment of the invention, the photoinitiator is used in combination with a photocrosslinker. Any photocrosslinker that will upon the generation of free radicals, link two or more polyolefin backbones together through the formation of covalent bonds with the backbones can be used in this invention. Preferably these photocrosslinkers are polyfunctional, i.e., they comprise two or more sites that upon activation will form a covalent bond with a site on the backbone of the copolymer. Representative photocrosslinkers include, but are not limited to polyfunctional vinyl or allyl compounds such as, for example, triallyl cyanurate, triallyl isocyanurate, pentaerthritol tetramethacrylate, ethylene glycol dimethacrylate, diallyl maleate, dipropargyl maleate, dipropargyl monoallyl cyanurate and the like. Preferred photocrosslinkers for use in the present invention are compounds which have polyfunctional (i.e. at least two) moieties. Particularly preferred photocrosslinkers are triallycyanurate (TAC) and triallylisocyanurate (TAIC).

Certain compounds act as both a photoinitiator and a photocrosslinker in the practice of this invention. These compounds are characterized by the ability to generate two or more reactive species (e.g., free radicals, carbenes, nitrenes, etc.) upon exposure to UV-light and to subsequently covalently bond with two polymer chains. Any compound that can preform these two functions can be used in the practice of this invention, and representative compounds include the sulfonyl azides described in U.S. Pat. Nos. 6,211,302 and 6,284,842.

In another embodiment of this invention, the copolymer is subjected to secondary crosslinking, i.e., crosslinking other than and in addition to photocrosslinking. In this embodiment, the photoinitiator is used either in combination with a nonphotocrosslinker, e.g., a silane, or the copolymer is subjected to a secondary crosslinking procedure, e.g, exposure to E-beam radiation. Representative examples of silane crosslinkers are described in U.S. Pat. No. 5,824,718, and crosslinking through exposure to E-beam radiation is described in U.S. Pat. Nos. 5,525,257 and 5,324,576. The use of a photocrosslinker in this embodiment is optional At least one photoadditive, i.e., photoinitiator and optional photocrosslinker, can be introduced to the copolymer by any method known in the art. However, preferably the photoadditive(s) is (are) introduced via a masterbatch concentrate comprising the same or different base resin as the copolymer. Preferably, the photoadditive concentration for the masterbatch is relatively high e.g., about 25 weight percent (based on the total weight of the concentrate).

The at least one photoadditive is introduced to the copolymer in any effective amount. Preferably, the at least one photoadditive introduction amount is from about 0.001 to about 5, more preferably from about 0.005 to about 2.5 and most preferably from about 0.015 to about 1, wt % (based on the total weight of the copolymer).

The photoinitiator(s) and optional photocrosslinker(s) can be added during different stages of the fiber or film manufacturing process. If photoadditives can withstand the extrusion temperature, a polyolefin resin can be mixed with additives before being fed into the extruder, e.g., via a masterbatch addition. Alternatively, additives can be introduced into the extruder just prior the slot die, but in this case the efficient mixing of components before extrusion is important. In another approach, polyolefin fibers can be drawn without photoadditives, and a photoinitiator and/or photocrosslinker can be applied to the extruded fiber via a kiss-roll, spray, dipping into a solution with additives, or by using other industrial methods for post-treatment. The resulting fiber with photoadditive(s) is then cured via electromagnetic radiation in a continuous or batch process. The photo additives can be blended with the polyolefin using conventional compounding equipment, including single and twin-screw extruders.

The power of the electromagnetic radiation and the irradiation time are chosen so as to allow efficient crosslinking without polymer degradation and/or dimensional defects. The preferred process is described in EP 0 490 854 B1. Photoadditive(s) with sufficient thermal stability is (are) premixed with a polyolefin resin, extruded into a fiber, and irradiated in a continuous process using one energy source or several units linked in a series. There are several advantages to using a continuous process compared with a batch process to cure a fiber or sheet of a knitted fabric which are collected onto a spool.

Irradiation may be accomplished by the use of UV-radiation. Preferably, UV-radiation is employed up to the intensity of 100 J/cm$^2$. The irradiation source can be any UV-light generator operating in a range of about 50 watts to about 25000 watts with a power output capable of supplying the desired dosage. The wattage can be adjusted to appropriate levels which may be, for example, 1000 watts or 4800 watts or 6000 watts or higher or lower. Many other apparati for UV-irradiating polymeric materials are known in the art. The irradiation is usually carried out at a dosage between about 3 J/cm$^2$ to about 500 J/scm$^2$, preferably between about 5 J/cm$^2$ to about 100 J/cm². Further, the irradiation can be carried out conveniently at room temperature, although higher and lower temperatures, for example 0° C. to about 60° C., may also be employed. The photocrosslinking process is faster at higher temperatures. Preferably, the irradiation is carried out after shaping or fabrication of the article. In a preferred embodiment, the copolymer which has been incorporated with a photoadditive is irradiated with UV-radiation at about 10 J/cm² to about 50 J/cm².

Preparation of the Polymer Blends

The components of the polymer blends, i.e., the ethylene/α-olefin interpolymer, the polyolefin and the optional additives, can be mixed or blended using methods known to a person of ordinary skill in the art, preferably methods that can provide a substantially homogeneous distribution of the polyolefin and/or the additives in the ethylene/α-olefin interpolymer. Non-limiting examples of suitable blending methods include melt blending, solvent blending, extruding, and the like.

In some embodiments, the ingredients of the polymer blends are melt blended by a method as described by Guerin et al. in U.S. Pat. No. 4,152,189. First, all solvents, if there are any, are removed from the ingredients by heating to an appropriate elevated temperature of about 100° C. to about 200° C. or about 150° C. to about 175° C. at a pressure of about 5 torr (667 Pa) to about 10 torr (1333 Pa). Next, the ingredients are weighed into a vessel in the desired proportions and the polymer blend is formed by heating the contents of the vessel to a molten state while stirring.

In other embodiments, the ingredients of the polymer blends are processed using solvent blending. First, the ingredients of the desired polymer blend are dissolved in a suitable solvent and the mixture is then mixed or blended. Next, the solvent is removed to provide the polymer blend.

In further embodiments, physical blending devices that provide dispersive mixing, distributive mixing, or a combination of dispersive and distributive mixing can be useful in preparing homogenous blends. Both batch and continuous methods of physical blending can be used. Non-limiting examples of batch methods include those methods using BRABENDER® mixing equipments (e.g., BRABENDER PREP CENTER®), available from C. W. Brabender Instruments, Inc., South Hackensack, N.J.) or BANBURY® internal mixing and roll milling (available from Farrel Company, Ansonia, Conn.) equipment. Non-limiting examples of continuous methods include single screw extruding, twin screw extruding, disk extruding, reciprocating single screw extruding, and pin barrel single screw extruding. In some embodiments, the additives can be added into an extruder through a feed hopper or feed throat during the extrusion of the ethylene/α-olefin interpolymer, the polyolefin or the polymer blend. The mixing or blending of polymers by extrusion has been described in C. Rauwendaal, "*Polymer Extrusion*", Hanser Publishers, New York, N.Y., pages 322-334 (1986), which is incorporated herein by reference.

When one or more additives are required in the polymer blends, the desired amounts of the additives can be added in one charge or multiple charges to the ethylene/α-olefin interpolymer, the polyolefin or the polymer blend. Furthermore, the addition can take place in any order. In some embodiments, the additives are first added and mixed or blended with the ethylene/α-olefin interpolymer and then the additive-containing interpolymer is blended with the polyolefin. In other embodiments, the additives are first added and mixed or blended with the polyolefin and then the additive-containing polyolefin is blended with the ethylene/α-olefin interpolymer. In further embodiments, the ethylene/α-olefin interpolymer is blended with the polyolefin first and then the additives are blended with the polymer blend.

Alternatively, master batches containing high concentrations of the additives can be used. In general, master batches can be prepared by blending either the ethylene/α-olefin interpolymer, the polyolefin or the polymer blend with high concentrations of additives. The master batches can have additive concentrations from about 1 to about 50 wt %, from about 1 to about 40 wt %, from about 1 to about 30 wt %, or from about 1 to about 20 wt % of the total weight of the polymer blend. The master batches can then be added to the polymer blends in an amount determined to provide the desired additive concentrations in the end products. In some embodiments, the master batch contains a slip agent, an anti-blocking agent, a plasticizer, an antioxidant, a UV stabilizer, a colorant or pigment, a filler, a lubricant, an antifogging agent, a flow aid, a coupling agent, a cross-linking agent, a nucleating agent, a surfactant, a solvent, a flame retardant, an antistatic agent, or a combination thereof. In other embodiment, the master batch contains a slip agent, an anti-blocking agent or a combination thereof. In other embodiment, the master batch contains a slip agent.

Applications of the Polymer Blends

The polymer blends disclosed herein can be used to manufacture durable articles for the automotive, construction, medical, food and beverage, electrical, appliance, business machine, and consumer markets. In some embodiments, the polymer blends are used to manufacture flexible durable parts or articles selected from toys, grips, soft touch handles, bumper rub strips, floorings, auto floor mats, wheels, casters, furniture and appliance feet, tags, seals, gaskets such as static and dynamic gaskets, automotive doors, bumper fascia, grill components, rocker panels, hoses, linings, office supplies, seals, liners, diaphragms, tubes, lids, stoppers, plunger tips, delivery systems, kitchen wares, shoes, shoe bladders and shoe soles. In other embodiments, the polymer blends can be used to manufacture durable parts or articles that require a high tensile strength and low compression set. In further embodiments, the polymer blends can be used to manufacture durable parts or articles that require a high upper service temperature and low modulus.

The polymer blends can be used to prepare these durable parts or articles with known polymer processes such as extrusion (e.g., sheet extrusion and profile extrusion), injection molding, molding, rotational molding, and blow molding. In general, extrusion is a process by which a polymer is propelled continuously along a screw through regions of high temperature and pressure where it is melted and compacted, and finally forced through a die. The extruder can be a single screw extruder, a multiple screw extruder, a disk extruder or a ram extruder. The die can be a film die, blown film die, sheet die, pipe die, tubing die or profile extrusion die. The extrusion of polymers has been described in C. Rauwendaal, "*Polymer Extrusion*", Hanser Publishers, New York, N.Y. (1986); and M. J. Stevens, "*Extruder Principals and Operation*," Ellsevier Applied Science Publishers, New York, N.Y. (1985), both of which are incorporated herein by reference in their entirety.

Profile extrusion molding is a popular method for producing continuous uniform thermoplastic items having often complex cross sections for use as, for example, automobile exterior trim. The profile assumes the shape of the extrusion die of choice, and is cut and end-capped to form such articles as body side moldings. A single profile may be designed to fit many models of cars, making profile extrusion a popular after market process. A wide processing range of thermoplastic materials permits high outputs in profile extrusion. Continuous operation of an extruder permits uniform production of plastic products. The temperature required along the extruder barrel, adapter and die depend upon the specific extrusion process being conducted and the nature of the plastic used.

In a typical extrusion process, resin pellets are either gravity fed or force fed from a hopper into single or twin screw extruders and are conveyed along the screw surface. Solid and liquid additives, such as reinforcing additives and fillers, are often incorporated into the mix, and must be homogenously combined via distributive or dispersive mixing by the screw. U.S. Pat. No. 6,682,811, No. 5,783,620, No. 5,951,930, No. 5,382,395, No. 4,256,685 and No. 5,468,530 teach various methods of profile extrusion which can be used in certain embodiments of the invention. The disclosures of the patents are incorporated by reference herein in their entirety.

Injection molding is also widely used for manufacturing a variety of plastic parts for various applications. In general, injection molding is a process by which a polymer is melted and injected at high pressure into a mold, which is the inverse of the desired shape, to form parts of the desired shape and size. The mold can be made from metal, such as steel and aluminum. The injection molding of polymers has been described in Beaumont et al., "*Successful Injection Molding: Process, Design, and Simulation*," Hanser Gardner Publications, Cincinnati, Ohio (2002), which is incorporated herein by reference in its entirety.

Molding is generally a process by which a polymer is melted and led into a mold, which is the inverse of the desired shape, to form parts of the desired shape and size. Molding can be pressureless or pressure-assisted. The molding of polymers is described in Hans-Georg Elias "*An Introduction to Plastics*," Wiley-VCH, Weinhei, Germany, pp. 161-165 (2003), which is incorporated herein by reference.

Rotational molding is a process generally used for producing hollow plastic products. By using additional post-molding operations, complex components can be produced as effectively as other molding and extrusion techniques. Rotational molding differs from other processing methods in that the heating, melting, shaping, and cooling stages all occur after the polymer is placed in the mold, therefore no external pressure is applied during forming. The rotational molding of polymers has been described in Glenn Beall, "*Rotational Molding: Design, Materials & Processing*," Hanser Gardner Publications, Cincinnati, Ohio (1998), which is incorporated herein by reference in its entirety.

Blow molding can be used for making hollow plastics containers. The process includes placing a softened polymer in the center of a mold, inflating the polymer against the mold walls with a blow pin, and solidifying the product by cooling. There are three general types of blow molding: extrusion blow molding, injection blow molding, and stretch blow molding. Injection blow molding can be used to process polymers that cannot be extruded. Stretch blow molding can be used for difficult to blow crystalline and crystallizable polymers such as polypropylene. The blow molding of polymers has been described in Norman C. Lee, "*Understanding Blow Molding*," Hanser Gardner Publications, Cincinnati, Ohio (2000), which is incorporated herein by reference in its entirety.

The following examples are presented to exemplify embodiments of the invention. All numerical values are approximate. When numerical ranges are given, it should be understood that embodiments outside the stated ranges may still fall within the scope of the invention. Specific details described in each example should not be construed as necessary features of the invention.

EXAMPLES

Testing Methods

In the examples that follow, the following analytical techniques are employed:

GPC Method for Samples 1-4 and A-C

An automated liquid-handling robot equipped with a heated needle set to 160° C. is used to add enough 1,2,4-trichlorobenzene stabilized with 300 ppm Ionol to each dried polymer sample to give a final concentration of 30 mg/mL. A small glass stir rod is placed into each tube and the samples are heated to 160° C. for 2 hours on a heated, orbital-shaker rotating at 250 rpm. The concentrated polymer solution is then diluted to 1 mg/ml using the automated liquid-handling robot and the heated needle set to 160° C.

A Symyx Rapid GPC system is used to determine the molecular weight data for each sample. A Gilson 350 pump set at 2.0 ml/min flow rate is used to pump helium-purged 1,2-dichlorobenzene stabilized with 300 ppm Ionol as the mobile phase through three Plgel 10 micrometer (μm) Mixed B 300 mm×7.5 mm columns placed in series and heated to 160° C. A Polymer Labs ELS 1000 Detector is used with the Evaporator set to 250° C., the Nebulizer set to 165° C., and the nitrogen flow rate set to 1.8 SLM at a pressure of 60-80 psi (400-600 kPa) $N_2$. The polymer samples are heated to 160° C. and each sample injected into a 250 μl loop using the liquid-handling robot and a heated needle. Serial analysis of the polymer samples using two switched loops and overlapping injections are used. The sample data is collected and analyzed using Symyx Epoch™ software. Peaks are manually integrated and the molecular weight information reported uncorrected against a polystyrene standard calibration curve.

Standard CRYSTAF Method

Branching distributions are determined by crystallization analysis fractionation (CRYSTAF) using a CRYSTAF 200 unit commercially available from PolymerChar, Valencia, Spain. The samples are dissolved in 1,2,4 trichlorobenzene at 160° C. (0.66 mg/mL) for 1 hr and stabilized at 95° C. for 45 minutes. The sampling temperatures range from 95 to 30° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the short chain branching distribution of the polymer.

The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT curve and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

DSC Standard Method (Excluding Samples 1-4 and A-C)

Differential Scanning Calorimetry results are determined using a TAI model Q1000 DSC equipped with an RCS cooling accessory and an autosampler. A nitrogen purge gas flow of 50 ml/min is used. The sample is pressed into a thin film and melted in the press at about 175° C. and then air-cooled to room temperature (25° C.). 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −40° C. at 10° C./min cooling rate and held at −40° C. for 3 minutes. The sample is then heated to 150° C. at 110° C./min. heating rate. The cooling and second heating curves are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

GPC Method (Excluding Samples 1-4 and A-C)

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, *J. Polym. Sci., Polym. Let.*, 6, 621 (1968)): $M_{polyethylene}=0.431(M_{polystyrene})$.

Polyethylene equivalent molecular weight calculations are performed using Viscotek TriSEC software Version 3.0.

Compression Set

Compression set is measured according to ASTM D 395. The sample is prepared by stacking 25.4 mm diameter round discs of 3.2 mm, 2.0 mm, and 0.25 mm thickness until a total thickness of 12.7 mm is reached. The discs are cut from 12.7 cm×12.7 cm compression molded plaques molded with a hot press under the following conditions: zero pressure for 3 min at 190° C., followed by 86 MPa for 2 min at 190° C., followed by cooling inside the press with cold running water at 86 MPa.

Density

Samples for density measurement are prepared according to ASTM D 1928. Measurements are made within one hour of sample pressing using ASTM D792, Method B.

Flexural/Secant Modulus/Storage Modulus

Samples are compression molded using ASTM D 1928. Flexural and 2 percent secant moduli are measured according to ASTM D-790. Storage modulus is measured according to ASTM D 5026-01 or equivalent technique.

Optical Properties

Films of 0.4 mm thickness are compression molded using a hot press (Carver Model #4095-4PR1001R). The pellets are placed between polytetrafluoroethylene sheets, heated at 190° C. at 55 psi (380 kPa) for 3 min, followed by 1.3 MPa for 3 min, and then 2.6 MPa for 3 min. The film is then cooled in the press with running cold water at 1.3 MPa for 1 min. The compression molded films are used for optical measurements, tensile behavior, recovery, and stress relaxation.

Clarity is measured using BYK Gardner Haze-gard as specified in ASTM D 1746.

45° gloss is measured using BYK Gardner Glossmeter Microgloss 45° as specified in ASTM D-2457

Internal haze is measured using BYK Gardner Haze-gard based on ASTM D 1003 Procedure A. Mineral oil is applied to the film surface to remove surface scratches.

Mechanical Properties—Tensile, Hysteresis, and Tear

Stress-strain behavior in uniaxial tension is measured using ASTM D 1708 microtensile specimens. Samples are stretched with an Instron at 500% min$^{-1}$ at 21° C. Tensile strength and elongation at break are reported from an average of 5 specimens.

100% and 300% Hysteresis is determined from cyclic loading to 100% and 300% strains using ASTM D 1708 microtensile specimens with an Instron™ instrument. The sample is loaded and unloaded at 267% min$^{-1}$ for 3 cycles at 21° C. Cyclic experiments at 300% and 80° C. are conducted using an environmental chamber. In the 80° C. experiment, the sample is allowed to equilibrate for 45 minutes at the test temperature before testing. In the 21° C., 300% strain cyclic experiment, the retractive stress at 150% strain from the first unloading cycle is recorded. Percent recovery for all experiments are calculated from the first unloading cycle using the strain at which the load returned to the base line. The percent recovery is defined as:

$$\% \text{ Recovery} = \frac{\varepsilon_f - \varepsilon_s}{\varepsilon_f} \times 100$$

where $\epsilon_f$ is the strain taken for cyclic loading and $\epsilon_s$ is the strain where the load returns to the baseline during the 1$^{st}$ unloading cycle.

Stress relaxation is measured at 50 percent strain and 37° C. for 12 hours using an Instron™ instrument equipped with an environmental chamber. The gauge geometry was 76 mm×25 mm×0.4 mm. After equilibrating at 37° C. for 45 min in the environmental chamber, the sample was stretched to 50% strain at 333% min$^{-1}$. Stress was recorded as a function of time for 12 hours. The percent stress relaxation after 12 hours was calculated using the formula:

$$\% \text{ Stress Relaxation} = \frac{L_0 - L_{12}}{L_0} \times 100$$

where $L_0$ is the load at 50% strain at 0 time and $L_{12}$ is the load at 50 percent strain after 12 hours.

Tensile notched tear experiments are carried out on samples having a density of 0.88 g/cc or less using an Instron™ instrument. The geometry consists of a gauge section of 76 mm×13 mm×0.4 mm with a 2 mm notch cut into the sample at half the specimen length. The sample is stretched at 508 mm min$^{-1}$ at 21° C. until it breaks. The tear energy is calculated as the area under the stress-elongation curve up to strain at maximum load. An average of at least 3 specimens are reported.

TMA

Thermal Mechanical Analysis (Penetration Temperature) is conducted on 30 mm diameter×3.3 mm thick, compression molded discs, formed at 180° C. and 10 MPa molding pressure for 5 minutes and then air quenched. The instrument used is a TMA 7, brand available from Perkin-Elmer. In the test, a probe with 1.5 mm radius tip (P/N N519-0416) is applied to the surface of the sample disc with 1N force. The temperature is raised at 5° C./min from 25° C. The probe penetration distance is measured as a function of temperature. The experiment ends when the probe has penetrated 1 mm into the sample.

DMA

Dynamic Mechanical Analysis (DMA) is measured on compression molded disks formed in a hot press at 180° C. at 10 MPa pressure for 5 minutes and then water cooled in the press at 90° C./min. Testing is conducted using an ARES controlled strain rheometer (TA instruments) equipped with dual cantilever fixtures for torsion testing.

A 1.5 mm plaque is pressed and cut in a bar of dimensions 32×12 mm. The sample is clamped at both ends between fixtures separated by 10 mm (grip separation $\Delta L$) and subjected to successive temperature steps from $-100°$ C. to 200° C. (5° C. per step). At each temperature the torsion modulus G' is measured at an angular frequency of 10 rad/s, the strain amplitude being maintained between 0.1 percent and 4 percent to ensure that the torque is sufficient and that the measurement remains in the linear regime.

An initial static force of 10 g is maintained (auto-tension mode) to prevent slack in the sample when thermal expansion occurs. As a consequence, the grip separation $\Delta L$ increases with the temperature, particularly above the melting or softening point of the polymer sample. The test stops at the maximum temperature or when the gap between the fixtures reaches 65 mm.

Melt Index

Melt index, or I2, is measured in accordance with ASTM D 1238, Condition 190° C./2.16 kg. Melt index, or $I_{10}$ is also measured in accordance with ASTM D 1238, Condition 190° C./10 kg.

ATREF

Analytical temperature rising elution fractionation (ATREF) analysis is conducted according to the method described in U.S. Pat. No. 4,798,081 and Wilde, L.; Ryle, T. R.; Knobeloch, D. C.; Peat, I. R.; *Determination of Branching Distributions in Polyethylene and Ethylene Copolymers, J. Polym. Sci.*, 20, 441-455 (1982), which are incorporated by reference herein in their entirety. The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min.

$^{13}$C NMR Analysis

The samples are prepared by adding approximately 3 g of a 50/50 mixture of tetrachloroethane-d 2/orthodichlorobenzene to 0.4 g sample in a 10 mm NMR tube. The samples are dissolved and homogenized by heating the tube and its contents to 150° C. The data are collected using a JEOL ECLIPSE™ 400 MHz spectrometer or a Varian Unity PLUS™ 400 MHz spectrometer, corresponding to a $^{13}$C resonance frequency of 100.5 MHz. The data are acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem Polymer Fractionation by TREF Large-scale TREF fractionation is carried by dissolving 15-20 g of polymer in 2 liters of 1,2,4-trichlorobenzene (TCB) by stirring for 4 hours at 160° C. The polymer solution is forced by 15 psig (100 kPa) nitrogen onto a 3 inch by 4 foot (7.6 cm×12 cm) steel column packed with a 60:40 (v:v) mix of 30-40 mesh (600-425 μm) spherical, technical quality glass beads (available from Potters Industries, HC 30 Box 20, Brownwood, Tex., 76801) and stainless steel, 0.028" (0.7 mm) diameter cut wire shot (available from Pellets, Inc. 63 Industrial Drive, North Tonawanda, N.Y., 14120). The column is immersed in a thermally controlled oil jacket, set initially to 160° C. The column is first cooled ballistically to 125° C., then slow cooled to 20° C. at 0.04° C. per minute and held for one hour. Fresh TCB is introduced at about 65 ml/min while the temperature is increased at 0.167° C. per minute.

Approximately 2000 ml portions of eluant from the preparative TREF column are collected in a 16 station, heated fraction collector. The polymer is concentrated in each fraction using a rotary evaporator until about 50 to 100 ml of the polymer solution remains. The concentrated solutions are allowed to stand overnight before adding excess methanol, filtering, and rinsing (approx. 300-500 ml of methanol including the final rinse). The filtration step is performed on a 3 position vacuum assisted filtering station using 5.0 μm polytetrafluoroethylene coated filter paper (available from Osmonics Inc., Cat# Z50WP04750). The filtrated fractions are dried overnight in a vacuum oven at 60° C. and weighed on an analytical balance before further testing.

Melt Strength

Melt Strength (MS) is measured by using a capillary rheometer fitted with a 2.1 mm diameter, 20:1 die with an entrance angle of approximately 45 degrees. After equilibrating the samples at 190° C. for 10 minutes, the piston is run at a speed of 1 inch/minute (2.54 cm/minute). The standard test temperature is 190° C. The sample is drawn uniaxially to a set of accelerating nips located 100 mm below the die with an acceleration of 2.4 mm/sec². The required tensile force is recorded as a function of the take-up speed of the nip rolls. The maximum tensile force attained during the test is defined as the melt strength. In the case of polymer melt exhibiting draw resonance, the tensile force before the onset of draw resonance was taken as melt strength. The melt strength is recorded in centiNewtons ("cN").

Catalysts

The term "overnight", if used, refers to a time of approximately 16-18 hours, the term "room temperature", refers to a temperature of 20-25° C., and the term "mixed alkanes" refers to a commercially obtained mixture of $C_{6-9}$ aliphatic hydrocarbons available under the trade designation Isopar E®, from ExxonMobil Chemical Company. In the event the name of a compound herein does not conform to the structural representation thereof, the structural representation shall control. The synthesis of all metal complexes and the preparation of all screening experiments were carried out in a dry nitrogen atmosphere using dry box techniques. All solvents used were HPLC grade and were dried before their use.

MMAO refers to modified methylalumoxane, a triisobutylaluminum modified methylalumoxane available commercially from Akzo-Noble Corporation. The preparation of catalyst (B 1) is conducted as follows.

a) Preparation of (1-methylethyl)(2-hydroxy-3,5-di (t-butyl)phenyl)methylimine 3,5-Di-t-butylsalicylaldehyde (3.00 g) is added to 10 mL of isopropylamine. The solution rapidly turns bright yellow. After stirring at ambient temperature for 3 hours, volatiles are removed under vacuum to yield a bright yellow, crystalline solid (97 percent yield).

b) Preparation of 1,2-bis-(3,5-di-t-butylphenylene) (1-(N-(1-methylethyl)immino)methyl)(2-oxoyl) zirconium dibenzyl A solution of (1-methylethyl)(2-hydroxy-3,5-di(t-butyl) phenyl)imine (605 mg, 2.2 mmol) in 5 mL toluene is slowly added to a solution of $Zr(CH_2Ph)_4$ (500 mg, 1.1 mmol) in 50 mL toluene. The resulting dark yellow solution is stirred for 30 min. Solvent is removed under reduced pressure to yield the desired product as a reddish-brown solid. The preparation of catalyst (B2) is conducted as follows.

a) Preparation of (1-(2-methylcyclohexyl)ethyl)(2-oxoyl-3,5-di(t-butyl)phenyl)imine 2-Methylcyclohexylamine (8.44 mL, 64.0 mmol) is dissolved in methanol (90 mL), and di-t-butylsalicaldehyde (10.00 g, 42.67 mmol) is added. The reaction mixture is stirred for three hours and then cooled to −25° C. for 12 hrs. The resulting yellow solid precipitate is collected by filtration and washed with cold methanol (2×15 mL), and then dried under reduced pressure. The yield is 11.17 g of a yellow solid. $^1H$ NMR is consistent with the desired product as a mixture of isomers.

b) Preparation of bis-(1-(2-methylcyclohexyl)ethyl) (2-oxoyl-3,5-di(t-butyl)phenyl)immino)zirconium dibenzyl A solution of (1-(2-methylcyclohexyl)ethyl)(2-oxoyl-3,5-di(t-butyl)phenyl)imine (7.63 g, 23.2 mmol) in 200 mL toluene is slowly added to a solution of $Zr(CH_2Ph)_4$ (5.28 g, 11.6 mmol) in 600 mL toluene. The resulting dark yellow solution is stirred for 1 hour at 25° C. The solution is diluted further with 680 mL toluene to give a solution having a concentration of 0.00783 M.

Cocatalyst 1 A mixture of methyldi($C_{14-18}$ alkyl)ammonium salts of tetrakis(pentafluorophenyl)borate (here-in-after armeenium borate), prepared by reaction of a long chain trialkylamine (Armeen™ M2HT, available from Akzo-Nobel, Inc.), HCl and $Li[B(C_6F_5)_4]$, substantially as disclosed in U.S. Pat. No. 5,919,9883, Ex. 2.

Cocatalyst 2 Mixed C14-18 alkyldimethylammonium salt of bis(tris(pentafluorophenyl)-alumane)-2-undecylimidazolide, prepared according to U.S. Pat. No. 6,395,671, Ex. 16.

Shuttling Agents The shuttling agents employed include diethylzinc (DEZ, SA1), di(i-butyl)zinc (SA2), di(n-hexyl) zinc (SA3), triethylaluminum (TEA, SA4), trioctylaluminum (SA5), triethylgallium (SA6), i-butylaluminum bis(dimethyl (t-butyl)siloxane) (SA7), i-butylaluminum bis(di(trimethyl-silyl)amide) (SA8), n-octylaluminum di(pyridine-2-methoxide) (SA9), bis(n-octadecyl)i-butylaluminum (SA10), i-butylaluminum bis(di(n-pentyl)amide) (SA11), n-octylaluminum bis(2,6-di-t-butylphenoxide) (SA12), n-octylaluminum di(ethyl(1-naphthyl)amide) (SA13), ethylaluminum bis (t-butyldimethylsiloxide) (SA14), ethylaluminum di(bis (trimethylsilyl)amide) (SA15), ethylaluminum bis(2,3,6,7-dibenzo-1-azacycloheptaneamide) (SA16), n-octylaluminum bis(2,3,6,7-dibenzo-1-azacycloheptaneamide) (SA17), n-octylaluminum bis(dimethyl(t-butyl)siloxide(SA18), ethylzinc (2,6-diphenylphenoxide) (SA19), and ethylzinc (t-butoxide) (SA20).

Examples 1-4, Comparative Examples A*-C*

General High Throughput Parallel Polymerization Conditions

Polymerizations are conducted using a high throughput, parallel polymerization reactor (PPR) available from Symyx technologies, Inc. and operated substantially according to U.S. Pat. Nos. 6,248,540, 6,030,917, 6,362,309, 6,306,658, and 6,316,663. Ethylene copolymerizations are conducted at 130° C. and 200 psi (1.4 MPa) with ethylene on demand using 1.2 equivalents of cocatalyst 1 based on total catalyst used (1.1 equivalents when MMAO is present). A series of polymerizations are conducted in a parallel pressure reactor (PPR) contained of 48 individual reactor cells in a 6×8 array that are fitted with a pre-weighed glass tube. The working volume in each reactor cell is 6000 μL. Each cell is temperature and pressure controlled with stirring provided by individual stirring paddles. The monomer gas and quench gas are plumbed directly into the PPR unit and controlled by automatic valves. Liquid reagents are robotically added to each reactor cell by syringes and the reservoir solvent is mixed alkanes. The order of addition is mixed alkanes solvent (4 ml), ethylene, 1-octene comonomer (1 ml), cocatalyst 1 or cocatalyst 1/MMAO mixture, shuttling agent, and catalyst or catalyst mixture. When a mixture of cocatalyst 1 and MMAO or a mixture of two catalysts is used, the reagents are premixed in a small vial immediately prior to addition to the reactor. When a reagent is omitted in an experiment, the above order of addition is otherwise maintained. Polymerizations are conducted for approximately 1-2 minutes, until predetermined ethylene consumptions are reached. After quenching with CO, the reactors are cooled and the glass tubes are unloaded. The tubes are transferred to a centrifuge/vacuum drying unit, and dried for 12 hours at 60° C. The tubes containing dried polymer are weighed and the difference between this weight and the tare weight gives the net yield of polymer. Results are contained in Table 1. In Table 1 and elsewhere in the application, comparative compounds are indicated by an asterisk (*).

Examples 1-4 demonstrate the synthesis of linear block copolymers by the present invention as evidenced by the formation of a very narrow MWD, essentially monomodal copolymer when DEZ is present and a bimodal, broad molecular weight distribution product (a mixture of separately produced polymers) in the absence of DEZ. Due to the fact that Catalyst (A1) is known to incorporate more octene than Catalyst (B1), the different blocks or segments of the resulting copolymers of the invention are distinguishable based on branching or density.

TABLE 1

| Ex. | Cat. (A1) (μmol) | Cat (B1) (μmol) | Cocat (μmol) | MMAO (μmol) | shuttling agent (μmol) | Yield (g) | Mn | Mw/Mn | hexyls[1] |
|---|---|---|---|---|---|---|---|---|---|
| A* | 0.06 | — | 0.066 | 0.3 | — | 0.1363 | 300502 | 3.32 | — |
| B* | — | 0.1 | 0.110 | 0.5 | — | 0.1581 | 36957 | 1.22 | 2.5 |
| C* | 0.06 | 0.1 | 0.176 | 0.8 | — | 0.2038 | 45526 | 5.30[2] | 5.5 |
| 1 | 0.06 | 0.1 | 0.192 | — | DEZ (8.0) | 0.1974 | 28715 | 1.19 | 4.8 |
| 2 | 0.06 | 0.1 | 0.192 | — | DEZ (80.0) | 0.1468 | 2161 | 1.12 | 14.4 |
| 3 | 0.06 | 0.1 | 0.192 | — | TEA (8.0) | 0.208 | 22675 | 1.71 | 4.6 |
| 4 | 0.06 | 0.1 | 0.192 | — | TEA (80.0) | 0.1879 | 3338 | 1.54 | 9.4 |

[1] $C_6$ or higher chain content per 1000 carbons
[2] Bimodal molecular weight distribution It may be seen the polymers produced according to the invention have a relatively narrow polydispersity (Mw/Mn) and larger block-copolymer content (trimer, tetramer, or larger) than polymers prepared in the absence of the shuttling agent.

Further characterizing data for the polymers of Table 1 are determined by reference to the figures. More specifically DSC and ATREF results show the following:

The DSC curve for the polymer of example 1 shows a 115.7° C. melting point (Tm) with a heat of fusion of 158.1 J/g. The corresponding CRYSTAF curve shows the tallest peak at 34.5° C. with a peak area of 52.9 percent. The difference between the DSC Tm and the Tcrystaf is 81.2° C.

The DSC curve for the polymer of example 2 shows a peak with a 109.7° C. melting point (Tm) with a heat of fusion of 214.0 J/g. The corresponding CRYSTAF curve shows the tallest peak at 46.2° C. with a peak area of 57.0 percent. The difference between the DSC Tm and the Tcrystaf is 63.5° C.

The DSC curve for the polymer of example 3 shows a peak with a 120.7° C. melting point (Tm) with a heat of fusion of 160.1 J/g. The corresponding CRYSTAF curve shows the tallest peak at 66.1° C. with a peak area of 71.8 percent. The difference between the DSC Tm and the Tcrystaf is 54.6° C.

The DSC curve for the polymer of example 4 shows a peak with a 104.5° C. melting point (Tm) with a heat of fusion of 170.7 J/g. The corresponding CRYSTAF curve shows the tallest peak at 30° C. with a peak area of 18.2 percent. The difference between the DSC Tm and the Tcrystaf is 74.5° C.

The DSC curve for Comparative Example A* shows a 90.0° C. melting point (Tm) with a heat of fusion of 86.7 J/g. The corresponding CRYSTAF curve shows the tallest peak at 48.5° C. with a peak area of 29.4 percent. Both of these values are consistent with a resin that is low in density. The difference between the DSC Tm and the Tcrystaf is 41.8° C.

The DSC curve for Comparative Example B* shows a 129.8° C. melting point (Tm) with a heat of fusion of 237.0 J/g. The corresponding CRYSTAF curve shows the tallest peak at 82.4° C. with a peak area of 83.7 percent. Both of these values are consistent with a resin that is high in density. The difference between the DSC Tm and the Tcrystaf is 47.4° C.

The DSC curve for Comparative Example C* shows a 125.3° C. melting point (Tm) with a heat of fusion of 143.0 J/g. The corresponding CRYSTAF curve shows the tallest peak at 81.8° C. with a peak area of 34.7 percent as well as a lower crystalline peak at 52.4° C. The separation between the two peaks is consistent with the presence of a high crystalline and a low crystalline polymer. The difference between the DSC Tm and the Tcrystaf is 43.5° C.

Examples 5-19, Comparative Examples D*-F*, Continuous Solution Polymerization, Catalyst A1/B2+DEZ Continuous solution polymerizations are carried out in a computer controlled autoclave reactor equipped with an internal stirrer. Purified mixed alkanes solvent (Isopar™ E available from ExxonMobil Chemical Company), ethylene at 2.70 lbs/hour (1.22 kg/hour), 1-octene, and hydrogen (where used) are supplied to a 3.8 L reactor equipped with a jacket for temperature control and an internal thermocouple. The solvent feed to the reactor is measured by a mass-flow controller. A variable speed diaphragm pump controls the solvent flow rate and pressure to the reactor. At the discharge of the pump, a side stream is taken to provide flush flows for the catalyst and cocatalyst 1 injection lines and the reactor agitator. These flows are measured by Micro-Motion mass flow meters and controlled by control valves or by the manual adjustment of needle valves. The remaining solvent is combined with 1-octene, ethylene, and hydrogen (where used) and fed to the reactor. A mass flow controller is used to deliver hydrogen to the reactor as needed. The temperature of the solvent/monomer solution is controlled by use of a heat exchanger before entering the reactor. This stream enters the bottom of the reactor. The catalyst component solutions are metered using pumps and mass flow meters and are combined with the catalyst flush solvent and introduced into the bottom of the reactor. The reactor is run liquid-full at 500 psig (3.45 MPa) with vigorous stirring. Product is removed through exit lines at the top of the reactor. All exit lines from the reactor are steam traced and insulated. Polymerization is stopped by the addition of a small amount of water into the exit line along with any stabilizers or other additives and passing the mixture through a static mixer. The product stream is then heated by passing through a heat exchanger before devolatilization. The polymer product is recovered by extrusion using a devolatilizing extruder and water cooled pelletizer. Process details and results are contained in Table 2. Selected polymer properties are provided in Table 3.

TABLE 2

Process details for preparation of exemplary polymers

| Ex. | C8H16 kg/hr | Solv. kg/hr | H2 sccm[1] | T °C. | Cat Al[2] ppm | Cat A1 Flow kg/hr | Cat B2[3] ppm | B2 Flow kg/hr | DEZ Conc % | DEZ Flow kg/hr | Cocat Conc. ppm | Cocat Flow kg/hr | [C2H4]/[DEZ][4] | Poly Rate[5] kg/hr | Conv %[6] | Solids % | Eff.[7] |
|---|---|---|---|---|---|---|---|---|---|---|---|---|---|---|---|---|---|
| D* | 1.63 | 12.7 | 29.90 | 120 | 142.2 | 0.14 | — | — | 0.19 | 0.32 | 820 | 0.17 | 536 | 1.81 | 88.8 | 11.2 | 95.2 |
| E* | " | 9.5 | 5.00 | " | — | — | 109 | 0.10 | 0.19 | " | 1743 | 0.40 | 485 | 1.47 | 89.9 | 11.3 | 126.8 |
| F* | " | 11.3 | 251.6 | " | 71.7 | 0.06 | 30.8 | 0.06 | — | — | " | 0.11 | — | 1.55 | 88.5 | 10.3 | 257.7 |
| 5 | " | " | — | " | " | 0.14 | 30.8 | 0.13 | 0.17 | 0.43 | " | 0.26 | 419 | 1.64 | 89.6 | 11.1 | 118.3 |
| 6 | " | " | 4.92 | " | " | 0.10 | 30.4 | 0.08 | 0.17 | 0.32 | " | 0.18 | 570 | 1.65 | 89.3 | 11.1 | 172.7 |
| 7 | " | " | 21.70 | " | " | 0.07 | 30.8 | 0.06 | 0.17 | 0.25 | " | 0.13 | 718 | 1.60 | 89.2 | 10.6 | 244.1 |
| 8 | " | " | 36.90 | " | " | 0.06 | " | " | " | 0.10 | " | 0.12 | 1778 | 1.62 | 90.0 | 10.8 | 261.1 |
| 9 | " | " | 78.43 | " | " | " | " | " | " | 0.04 | " | " | 4596 | 1.63 | 90.2 | 10.8 | 267.9 |
| 10 | " | " | 0.00 | 123 | 71.1 | 0.12 | 30.3 | 0.14 | 0.34 | 0.19 | 1743 | 0.08 | 415 | 1.67 | 90.31 | 11.1 | 131.1 |
| 11 | " | " | " | 120 | 71.1 | 0.16 | " | 0.17 | 0.80 | 0.15 | 1743 | 0.10 | 249 | 1.68 | 89.56 | 11.1 | 100.6 |
| 12 | " | " | " | 121 | 71.1 | 0.15 | " | 0.07 | " | 0.09 | 1743 | 0.07 | 396 | 1.70 | 90.02 | 11.3 | 137.0 |
| 13 | " | " | " | 122 | 71.1 | 0.12 | " | 0.06 | " | 0.05 | 1743 | 0.05 | 653 | 1.69 | 89.64 | 11.2 | 161.9 |
| 14 | " | " | " | 120 | 71.1 | 0.05 | " | 0.29 | " | 0.10 | 1743 | 0.10 | 395 | 1.41 | 89.42 | 9.3 | 114.1 |
| 15 | 2.45 | " | " | " | 71.1 | 0.14 | " | 0.17 | " | 0.14 | 1743 | 0.09 | 282 | 1.80 | 89.33 | 11.3 | 121.3 |
| 16 | " | " | " | 122 | 71.1 | 0.10 | " | 0.13 | " | 0.07 | 1743 | 0.07 | 485 | 1.78 | 90.11 | 11.2 | 159.7 |
| 17 | " | " | " | 121 | 71.1 | 0.10 | " | 0.14 | " | 0.08 | 1743 | " | 506 | 1.75 | 89.08 | 11.0 | 155.6 |
| 18 | 0.69 | " | " | 121 | 71.1 | " | " | 0.22 | " | 0.11 | 1743 | 0.10 | 331 | 1.25 | 89.93 | 8.8 | 90.2 |
| 19 | 0.32 | " | " | 122 | 71.1 | 0.06 | " | " | " | 0.09 | 1743 | 0.08 | 367 | 1.16 | 90.74 | 8.4 | 106.0 |

*Comparative example, not an example of the invention
[1]standard cm³/min
[2][N-(2,6-di(1-methylethyl)phenyl)amido)(2-isopropylphenyl)(α-naphthalen-2-diyl(6-pyridin-2-diyl)methane)]hafnium dimethyl
[3]bis-(1-(2-methylcyclohexyl)ethyl)(2-oxoyl-3,5-di(t-butyl)phenyl)immino) zirconium dibenzyl
[4]molar ratio in reactor
[5]polymer production rate
[6]percent ethylene conversion in reactor
[7]efficiency, kg polymer/g M where g M = g Hf + g Zr

TABLE 3

Properties of exemplary polymers

| Ex. | Density (g/cm³) | $I_2$ | $I_{10}$ | $I_{10}/I_2$ | Mw (g/mol) | Mn (g/mol) | Mw/Mn | Heat of Fusion (J/g) | $T_m$ (°C.) | $T_c$ (°C.) | $T_{CRYSTAF}$ (°C.) | Tm − $T_{CRYSTAF}$ (°C.) | CRYSTAF Peak Area (percent) |
|---|---|---|---|---|---|---|---|---|---|---|---|---|---|
| D* | 0.8627 | 1.5 | 10.0 | 6.5 | 110,000 | 55,800 | 2.0 | 32 | 37 | 45 | 30 | 7 | 99 |
| E* | 0.9378 | 7.0 | 39.0 | 5.6 | 65,000 | 33,300 | 2.0 | 183 | 124 | 113 | 79 | 45 | 95 |
| F* | 0.8895 | 0.9 | 12.5 | 13.4 | 137,300 | 9,980 | 13.8 | 90 | 125 | 111 | 78 | 47 | 20 |
| 5 | 0.8786 | 1.5 | 9.8 | 6.7 | 104,600 | 53,200 | 2.0 | 55 | 120 | 101 | 48 | 72 | 60 |
| 6 | 0.8785 | 1.1 | 7.5 | 6.5 | 109600 | 53300 | 2.1 | 55 | 115 | 94 | 44 | 71 | 63 |
| 7 | 0.8825 | 1.0 | 7.2 | 7.1 | 118,500 | 53,100 | 2.2 | 69 | 121 | 103 | 49 | 72 | 29 |
| 8 | 0.8828 | 0.9 | 6.8 | 7.7 | 129,000 | 40,100 | 3.2 | 68 | 124 | 106 | 80 | 43 | 13 |
| 9 | 0.8836 | 1.1 | 9.7 | 9.1 | 129600 | 28700 | 4.5 | 74 | 125 | 109 | 81 | 44 | 16 |
| 10 | 0.8784 | 1.2 | 7.5 | 6.5 | 113,100 | 58,200 | 1.9 | 54 | 116 | 92 | 41 | 75 | 52 |
| 11 | 0.8818 | 9.1 | 59.2 | 6.5 | 66,200 | 36,500 | 1.8 | 63 | 114 | 93 | 40 | 74 | 25 |
| 12 | 0.8700 | 2.1 | 13.2 | 6.4 | 101,500 | 55,100 | 1.8 | 40 | 113 | 80 | 30 | 83 | 91 |
| 13 | 0.8718 | 0.7 | 4.4 | 6.5 | 132,100 | 63,600 | 2.1 | 42 | 114 | 80 | 30 | 81 | 8 |
| 14 | 0.9116 | 2.6 | 15.6 | 6.0 | 81,900 | 43,600 | 1.9 | 123 | 121 | 106 | 73 | 48 | 92 |
| 15 | 0.8719 | 6.0 | 41.6 | 6.9 | 79,900 | 40,100 | 2.0 | 33 | 114 | 91 | 32 | 82 | 10 |
| 16 | 0.8758 | 0.5 | 3.4 | 7.1 | 148,500 | 74,900 | 2.0 | 43 | 117 | 96 | 48 | 69 | 65 |
| 17 | 0.8757 | 1.7 | 11.3 | 6.8 | 107,500 | 54,000 | 2.0 | 43 | 116 | 96 | 43 | 73 | 57 |
| 18 | 0.9192 | 4.1 | 24.9 | 6.1 | 72,000 | 37,900 | 1.9 | 136 | 120 | 106 | 70 | 50 | 94 |
| 19 | 0.9344 | 3.4 | 20.3 | 6.0 | 76,800 | 39,400 | 1.9 | 169 | 125 | 112 | 80 | 45 | 88 |

The resulting polymers are tested by DSC and ATREF as with previous examples. Results are as follows:

The DSC curve for the polymer of example 5 shows a peak with a 119.6° C. melting point (Tm) with a heat of fusion of 60.0 J/g. The corresponding CRYSTAF curve shows the tallest peak at 47.6° C. with a peak area of 59.5 percent. The delta between the DSC Tm and the Tcrystaf is 72.0° C.

The DSC curve for the polymer of example 6 shows a peak with a 115.2° C. melting point (Tm) with a heat of fusion of 60.4 J/g. The corresponding CRYSTAF curve shows the tallest peak at 44.2° C. with a peak area of 62.7 percent. The delta between the DSC Tm and the Tcrystaf is 71.0° C.

The DSC curve for the polymer of example 7 shows a peak with a 121.3° C. melting point with a heat of fusion of 69.1 J/g. The corresponding CRYSTAF curve shows the tallest peak at 49.2° C. with a peak area of 29.4 percent. The delta between the DSC Tm and the Tcrystaf is 72.1° C.

The DSC curve for the polymer of example 8 shows a peak with a 123.5° C. melting point (Tm) with a heat of fusion of 67.9 J/g. The corresponding CRYSTAF curve shows the tallest peak at 80.1° C. with a peak area of 12.7 percent. The delta between the DSC Tm and the Tcrystaf is 43.4° C.

The DSC curve for the polymer of example 9 shows a peak with a 124.6° C. melting point (Tm) with a heat of fusion of 73.5 J/g. The corresponding CRYSTAF curve shows the tallest peak at 80.8° C. with a peak area of 16.0 percent. The delta between the DSC Tm and the Tcrystaf is 43.8° C.

The DSC curve for the polymer of example 10 shows a peak with a 115.6° C. melting point (Tm) with a heat of fusion of 60.7 J/g. The corresponding CRYSTAF curve shows the tallest peak at 40.9° C. with a peak area of 52.4 percent. The delta between the DSC Tm and the Tcrystaf is 74.7° C.

The DSC curve for the polymer of example 11 shows a peak with a 113.6° C. melting point (Tm) with a heat of fusion of 70.4 J/g. The corresponding CRYSTAF curve shows the tallest peak at 39.6° C. with a peak area of 25.2 percent. The delta between the DSC Tm and the Tcrystaf is 74.1° C.

The DSC curve for the polymer of example 12 shows a peak with a 113.2° C. melting point (Tm) with a heat of fusion of 48.9 J/g. The corresponding CRYSTAF curve shows no peak equal to or above 30° C. (Tcrystaf for purposes of further calculation is therefore set at 30° C.). The delta between the DSC Tm and the Tcrystaf is 83.2° C.

The DSC curve for the polymer of example 13 shows a peak with a 114.4° C. melting point (Tm) with a heat of fusion of 49.4 J/g. The corresponding CRYSTAF curve shows the tallest peak at 33.8° C. with a peak area of 7.7 percent. The delta between the DSC Tm and the Tcrystaf is 84.4° C.

The DSC for the polymer of example 14 shows a peak with a 120.8° C. melting point (Tm) with a heat of fusion of 127.9 J/g. The corresponding CRYSTAF curve shows the tallest peak at 72.9° C. with a peak area of 92.2 percent. The delta between the DSC Tm and the Tcrystaf is 47.9° C.

The DSC curve for the polymer of example 15 shows a peak with a 114.3° C. melting point (Tm) with a heat of fusion of 36.2 J/g. The corresponding CRYSTAF curve shows the tallest peak at 32.3° C. with a peak area of 9.8 percent. The delta between the DSC Tm and the Tcrystaf is 82.0° C.

The DSC curve for the polymer of example 16 shows a peak with a 116.6° C. melting point (Tm) with a heat of fusion of 44.9 J/g. The corresponding CRYSTAF curve shows the tallest peak at 48.0° C. with a peak area of 65.0 percent. The delta between the DSC Tm and the Tcrystaf is 68.6° C.

The DSC curve for the polymer of example 17 shows a peak with a 116.0° C. melting point (Tm) with a heat of fusion of 47.0 J/g. The corresponding CRYSTAF curve shows the tallest peak at 43.1° C. with a peak area of 56.8 percent. The delta between the DSC Tm and the Tcrystaf is 72.9° C.

The DSC curve for the polymer of example 18 shows a peak with a 120.5° C. melting point (Tm) with a heat of fusion of 141.8 J/g. The corresponding CRYSTAF curve shows the tallest peak at 70.0° C. with a peak area of 94.0 percent. The delta between the DSC Tm and the Tcrystaf is 50.5° C.

The DSC curve for the polymer of example 19 shows a peak with a 124.8° C. melting point (Tm) with a heat of fusion of 174.8 J/g. The corresponding CRYSTAF curve shows the tallest peak at 79.9° C. with a peak area of 87.9 percent. The delta between the DSC Tm and the Tcrystaf is 45.0° C.

The DSC curve for the polymer of Comparative Example D* shows a peak with a 37.3° C. melting point (Tm) with a heat of fusion of 31.6 J/g. The corresponding CRYSTAF curve shows no peak equal to and above 30° C. Both of these values are consistent with a resin that is low in density. The delta between the DSC Tm and the Tcrystaf is 7.3° C.

The DSC curve for the polymer of Comparative Example E* shows a peak with a 124.0° C. melting point (Tm) with a heat of fusion of 179.3 J/g. The corresponding CRYSTAF curve shows the tallest peak at 79.3° C. with a peak area of 94.6 percent. Both of these values are consistent with a resin that is high in density. The delta between the DSC Tm and the Tcrystaf is 44.6° C.

The DSC curve for the polymer of Comparative Example F* shows a peak with a 124.8° C. melting point (Tm) with a heat of fusion of 90.4 J/g. The corresponding CRYSTAF curve shows the tallest peak at 77.6° C. with a peak area of 19.5 percent. The separation between the two peaks is consistent with the presence of both a high crystalline and a low crystalline polymer. The delta between the DSC Tm and the Tcrystaf is 47.2° C.

Physical Property Testing

Polymer samples are evaluated for physical properties such as high temperature resistance properties, as evidenced by TMA temperature testing, pellet blocking strength, high temperature recovery, high temperature compression set and storage modulus ratio, G'(25° C.)/G'(100° C.). Several commercially available polymers are included in the tests: Comparative example G* is a substantially linear ethylene/1-octene copolymer (AFFINITY®, available from The Dow Chemical Company), Comparative example H* is an elastomeric, substantially linear ethylene/1-octene copolymer (AFFINITY®EG8100, available from The Dow Chemical Company), Comparative example I* is a substantially linear ethylene/1-octene copolymer (AFFINITY®PL1840, available from The Dow Chemical Company), Comparative example J* is a hydrogenated styrene/butadiene/styrene triblock copolymer (KRATON™ G1652, available from KRATON Polymers), Comparative example K* is a thermoplastic vulcanizate (TPV, a polyolefin blend containing dispersed therein a crosslinked elastomer). Results are presented in Table 4.

TABLE 4

High Temperature Mechanical Properties

| Ex. | TMA-1 mm penetration (° C.) | Pellet Blocking Strength lb/ft² (kPa) | G'(25° C.)/ G'(100° C.) | 300% Strain Recovery (80° C.) (percent) | Compression Set (70° C.) (percent) |
|---|---|---|---|---|---|
| D* | 51 | — | 9 | Failed | — |
| E* | 130 | — | 18 | — | — |
| F* | 70 | 141 (6.8) | 9 | Failed | 100 |
| 5 | 104 | 0 (0) | 6 | 81 | 49 |
| 6 | 110 | — | 5 | — | 52 |
| 7 | 113 | — | 4 | 84 | 43 |
| 8 | 111 | — | 4 | Failed | 41 |
| 9 | 97 | — | 4 | — | 66 |
| 10 | 108 | — | 5 | 81 | 55 |
| 11 | 100 | — | 8 | — | 68 |
| 12 | 88 | — | 8 | — | 79 |
| 13 | 95 | — | 6 | 84 | 71 |
| 14 | 125 | — | 7 | — | — |
| 15 | 96 | — | 5 | — | 58 |
| 16 | 113 | — | 4 | — | 42 |
| 17 | 108 | 0 (0) | 4 | 82 | 47 |
| 18 | 125 | — | 10 | — | — |
| 19 | 133 | — | 9 | — | — |
| G* | 75 | 463 (22.2) | 89 | Failed | 100 |
| H* | 70 | 213 (10.2) | 29 | Failed | 100 |
| I* | 111 | — | 11 | — | — |
| J* | 107 | — | 5 | Failed | 100 |
| K* | 152 | — | 3 | — | 40 |

In Table 4, Comparative example F* (which is a physical blend of the two polymers resulting from simultaneous polymerizations using catalyst A1 and B1) has a 1 mm penetration temperature of about 70° C., while Examples 5-9 have a 1 mm penetration temperature of 100° C. or greater. Further, examples 10-19 all have a 1 mm penetration temperature of greater than 85° C., with most having 1 mm TMA temperature of greater than 90° C. or even greater than 100° C. This shows that the novel polymers have better dimensional stability at higher temperatures compared to a physical blend. Comparative example J* (a commercial SEBS) has a good 1 mm TMA temperature of about 107° C., but it has very poor (high temperature 70° C.) compression set of about 100 percent and it also failed to recover (sample broke) during a high temperature (80° C.) 300 percent strain recovery. Thus the exemplified polymers have a unique combination of properties unavailable even in some commercially available, high performance thermoplastic elastomers.

Similarly, Table 4 shows a low (good) storage modulus ratio, G'(25° C.)/G'(100° C.), for the inventive polymers of 6 or less, whereas a physical blend (Comparative example F*) has a storage modulus ratio of 9 and a random ethylene/octene copolymer (Comparative example G*) of similar density has a storage modulus ratio an order of magnitude greater (89). It is desirable that the storage modulus ratio of a polymer be as close to 1 as possible. Such polymers will be relatively unaffected by temperature, and fabricated articles made from such polymers can be usefully employed over a broad temperature range. This feature of low storage modulus ratio and temperature independence is particularly useful in elastomer applications such as in pressure sensitive adhesive formulations.

The data in Table 4 also demonstrate that the polymers of the invention possess improved pellet blocking strength. In particular, Example 5 has a pellet blocking strength of 0 MPa, meaning it is free flowing under the conditions tested, compared to Comparative examples F* and G* which show considerable blocking. Blocking strength is important since bulk shipment of polymers having large blocking strengths can result in product clumping or sticking together upon storage or shipping, resulting in poor handling properties.

High temperature (70° C.) compression set for the inventive polymers is generally good, meaning generally less than about 80 percent, preferably less than about 70 percent and especially less than about 60 percent. In contrast, Comparative examples F*, G*, H* and J* all have a 70° C. compression set of 100 percent (the maximum possible value, indicating no recovery). Good high temperature compression set (low numerical values) is especially needed for applications such as gaskets, window profiles, o-rings, and the like.

TABLE 5

Ambient Temperature Mechanical Properties

| Ex. | Flex Modulus (MPa) | Tensile Modulus (MPa) | Tensile Strength (MPa)[1] | Elongation at Break[1] (%) | Tensile Strength (MPa) | Elongation at Break (%) | Abrasion: Volume Loss (mm³) | Tensile Notched Tear Strength (mJ) | 100% Strain Recovery 21° C. (percent) | 300% Strain Recovery 21° C. (percent) | Retractive Stress at 150% Strain (kPa) | Compression Set 21° C. (Percent) | Stress Relaxation at 50% Strain[2] |
|---|---|---|---|---|---|---|---|---|---|---|---|---|---|
| D* | 12 | 5 | — | — | 10 | 1074 | — | — | 91 | 83 | 760 | — | — |
| E* | 895 | 589 | — | — | 31 | 1029 | — | — | — | — | — | — | — |
| F* | 57 | 46 | — | — | 12 | 824 | 93 | 339 | 78 | 65 | 400 | 42 | — |
| 5 | 30 | 24 | 14 | 951 | 16 | 1116 | 48 | — | 87 | 74 | 790 | 14 | 33 |
| 6 | 33 | 29 | — | — | 14 | 938 | — | — | — | 75 | 861 | 13 | — |
| 7 | 44 | 37 | 15 | 846 | 14 | 854 | 39 | — | 82 | 73 | 810 | 20 | — |
| 8 | 41 | 35 | 13 | 785 | 14 | 810 | 45 | 461 | 82 | 74 | 760 | 22 | — |
| 9 | 43 | 38 | — | — | 12 | 823 | — | — | — | — | — | 25 | — |
| 10 | 23 | 23 | — | — | 14 | 902 | — | — | 86 | 75 | 860 | 12 | — |
| 11 | 30 | 26 | — | — | 16 | 1090 | — | 976 | 89 | 66 | 510 | 14 | 30 |
| 12 | 20 | 17 | 12 | 961 | 13 | 931 | — | 1247 | 91 | 75 | 700 | 17 | — |
| 13 | 16 | 14 | — | — | 13 | 814 | — | 691 | 91 | — | — | 21 | — |
| 14 | 212 | 160 | — | — | 29 | 857 | — | — | — | — | — | — | — |
| 15 | 18 | 14 | 12 | 1127 | 10 | 1573 | — | 2074 | 89 | 83 | 770 | 14 | — |
| 16 | 23 | 20 | — | — | 12 | 968 | — | — | 88 | 83 | 1040 | 13 | — |
| 17 | 20 | 18 | — | — | 13 | 1252 | — | 1274 | 13 | 83 | 920 | 4 | — |
| 18 | 323 | 239 | — | — | 30 | 808 | — | — | — | — | — | — | — |
| 19 | 706 | 483 | — | — | 36 | 871 | — | — | — | — | — | — | — |
| G* | 15 | 15 | — | — | 17 | 1000 | — | 746 | 86 | 53 | 110 | 27 | 50 |
| H* | 16 | 15 | — | — | 15 | 829 | — | 569 | 87 | 60 | 380 | 23 | — |
| I* | 210 | 147 | — | — | 29 | 697 | — | — | — | — | — | — | — |
| J* | — | — | — | — | 32 | 609 | — | — | 93 | 96 | 1900 | 25 | — |
| K* | — | — | — | — | — | — | — | — | — | — | — | 30 | — |

[1]Tested at 51 cm/minute
[2]measured at 38° C. for 12 hours

Table 5 shows results for mechanical properties for the new polymers as well as for various comparison polymers at ambient temperatures. It may be seen that the inventive polymers have very good abrasion resistance when tested according to ISO 4649, generally showing a volume loss of less than about 90 mm³, preferably less than about 80 mm³, and especially less than about 50 mm³. In this test, higher numbers indicate higher volume loss and consequently lower abrasion resistance.

Tear strength as measured by tensile notched tear strength of the inventive polymers is generally 1000 mJ or higher, as shown in Table 5. Tear strength for the inventive polymers can be as high as 3000 mJ, or even as high as 5000 mJ. Comparative polymers generally have tear strengths no higher than 750 mJ.

Table 5 also shows that the polymers of the invention have better retractive stress at 150 percent strain (demonstrated by higher retractive stress values) than some of the comparative samples. Comparative Examples F*, G* and H* have retractive stress value at 150 percent strain of 400 kPa or less, while the inventive polymers have retractive stress values at 150 percent strain of 500 kPa (Ex. 11) to as high as about 1100 kPa (Ex. 17). Polymers having higher than 150 percent retractive stress values would be quite useful for elastic applications, such as elastic fibers and fabrics, especially nonwoven fabrics. Other applications include diaper, hygiene, and medical garment waistband applications, such as tabs and elastic bands.

Table 5 also shows that stress relaxation (at 50 percent strain) is also improved (less) for the inventive polymers as compared to, for example, Comparative Example G*. Lower stress relaxation means that the polymer retains its force better in applications such as diapers and other garments where retention of elastic properties over long time periods at body temperatures is desired.

Optical Testing

TABLE 6

Polymer Optical Properties

| Ex. | Internal Haze (percent) | Clarity (percent) | 45° Gloss (percent) |
|---|---|---|---|
| F* | 84 | 22 | 49 |
| G* | 5 | 73 | 56 |
| 5 | 13 | 72 | 60 |
| 6 | 33 | 69 | 53 |
| 7 | 28 | 57 | 59 |
| 8 | 20 | 65 | 62 |
| 9 | 61 | 38 | 49 |
| 10 | 15 | 73 | 67 |
| 11 | 13 | 69 | 67 |
| 12 | 8 | 75 | 72 |
| 13 | 7 | 74 | 69 |
| 14 | 59 | 15 | 62 |
| 15 | 11 | 74 | 66 |
| 16 | 39 | 70 | 65 |
| 17 | 29 | 73 | 66 |
| 18 | 61 | 22 | 60 |
| 19 | 74 | 11 | 52 |
| G* | 5 | 73 | 56 |
| H* | 12 | 76 | 59 |
| I* | 20 | 75 | 59 |

The optical properties reported in Table 6 are based on compression molded films substantially lacking in orientation. Optical properties of the polymers may be varied over wide ranges, due to variation in crystallite size, resulting from variation in the quantity of chain shuttling agent employed in the polymerization.

Extractions of Multi-Block Copolymers

Extraction studies of the polymers of examples 5, 7 and Comparative Example E* are conducted. In the experiments, the polymer sample is weighed into a glass fritted extraction thimble and fitted into a Kumagawa type extractor. The extractor with sample is purged with nitrogen, and a 500 mL round bottom flask is charged with 350 mL of diethyl ether. The flask is then fitted to the extractor. The ether is heated while being stirred. Time is noted when the ether begins to condense into the thimble, and the extraction is allowed to proceed under nitrogen for 24 hours. At this time, heating is stopped and the solution is allowed to cool. Any ether remaining in the extractor is returned to the flask. The ether in the flask is evaporated under vacuum at ambient temperature, and the resulting solids are purged dry with nitrogen. Any residue is transferred to a weighed bottle using successive washes of hexane. The combined hexane washes are then evaporated with another nitrogen purge, and the residue dried under vacuum overnight at 40° C. Any remaining ether in the extractor is purged dry with nitrogen.

A second clean round bottom flask charged with 350 mL of hexane is then connected to the extractor. The hexane is heated to reflux with stirring and maintained at reflux for 24 hours after hexane is first noticed condensing into the thimble. Heating is then stopped and the flask is allowed to cool. Any hexane remaining in the extractor is transferred back to the flask. The hexane is removed by evaporation under vacuum at ambient temperature, and any residue remaining in the flask is transferred to a weighed bottle using successive hexane washes. The hexane in the flask is evaporated by a nitrogen purge, and the residue is vacuum dried overnight at 40° C.

The polymer sample remaining in the thimble after the extractions is transferred from the thimble to a weighed bottle and vacuum dried overnight at 40° C. Results are contained in Table 7.

TABLE 7

| Sample | wt. (g) | ether soluble (g) | ether soluble (percent) | $C_8$ mole percent[1] | hexane soluble (g) | hexane soluble (percent) | $C_8$ mole percent[1] | residue $C_8$ mole percent[1] |
|---|---|---|---|---|---|---|---|---|
| Comp. F* | 1.097 | 0.063 | 5.69 | 12.2 | 0.245 | 22.35 | 13.6 | 6.5 |
| Ex. 5 | 1.006 | 0.041 | 4.08 | — | 0.040 | 3.98 | 14.2 | 11.6 |
| Ex. 7 | 1.092 | 0.017 | 1.59 | 13.3 | 0.012 | 1.10 | 11.7 | 9.9 |

[1]Determined by $^{13}$C NMR

Additional Polymer Examples 19A-F, Continuous Solution Polymerization, Catalyst A1/B2+DEZ Continuous solution polymerizations are carried out in a computer controlled well-mixed reactor. Purified mixed alkanes solvent (Isopar™ E available from ExxonMobil, Chemical Company), ethylene, 1-octene, and hydrogen (where used) are combined and fed to a 27 gallon reactor. The feeds to the reactor are measured by mass-flow controllers. The temperature of the feed stream is controlled by use of a glycol cooled heat exchanger before entering the reactor. The catalyst component solutions are metered using pumps and mass flow meters. The reactor is run liquid-full at approximately 550 psig pressure. Upon exiting the reactor, water and additive are injected in the polymer solution. The water hydrolyzes the catalysts, and terminates the polymerization reactions. The post reactor solution is then heated in preparation for a two-stage devolatization. The solvent and unreacted monomers are removed during the devolatization pro-cess. The polymer melt is pumped to a die for underwater pellet cutting.

Process details and results are contained in Table 8A. Selected polymer properties are provided in Table 8B and Table 8C.

TABLE 8A

Polymerization Conditions for Polymers 19a–j.

| Ex. | $C_2H_4$ lb/hr | $C_8H_{16}$ lb/hr | Solv. lb/hr | $H_2$ sccm[1] | T °C. | Cat A1[2] Conc. ppm | Cat A1 Flow lb/hr | Cat B2[3] Conc. ppm | Cat B2 Flow lb/hr | DEZ Conc. wt % | DEZ Flow lb/hr | Cocat 1 Conc. ppm |
|---|---|---|---|---|---|---|---|---|---|---|---|---|
| 19a | 55.29 | 32.03 | 323.03 | 101 | 120 | 600 | 0.25 | 200 | 0.42 | 3.0 | 0.70 | 4500 |
| 19b | 53.95 | 28.96 | 325.3 | 577 | 120 | 600 | 0.25 | 200 | 0.55 | 3.0 | 0.24 | 4500 |
| 19c | 55.53 | 30.97 | 324.37 | 550 | 120 | 600 | 0.216 | 200 | 0.609 | 3.0 | 0.69 | 4500 |
| 19d | 54.83 | 30.58 | 326.33 | 60 | 120 | 600 | 0.22 | 200 | 0.63 | 3.0 | 1.39 | 4500 |
| 19e | 54.95 | 31.73 | 326.75 | 251 | 120 | 600 | 0.21 | 200 | 0.61 | 3.0 | 1.04 | 4500 |
| 19f | 50.43 | 34.80 | 330.33 | 124 | 120 | 600 | 0.20 | 200 | 0.60 | 3.0 | 0.74 | 4500 |
| 19g | 50.25 | 33.08 | 325.61 | 188 | 120 | 600 | 0.19 | 200 | 0.59 | 3.0 | 0.54 | 4500 |
| 19h | 50.15 | 34.87 | 318.17 | 58 | 120 | 600 | 0.21 | 200 | 0.66 | 3.0 | 0.70 | 4500 |
| 19i | 55.02 | 34.02 | 323.59 | 53 | 120 | 600 | 0.44 | 200 | 0.74 | 3.0 | 1.72 | 4500 |
| 19j | 7.46 | 9.04 | 50.6 | 47 | 120 | 150 | 0.22 | 76.7 | 0.36 | 0.5 | 0.19 | — |

| Ex. | Cocat 1 Flow lb/hr | Cocat 2 Conc. ppm | Cocat 2 Flow lb/hr | [Zn][4] in polymer ppm | Poly. Rate[5] lb/hr | Conv[6] wt % | Polymer wt % | Eff.[7] |
|---|---|---|---|---|---|---|---|---|
| 19a | 0.65 | 525 | 0.33 | 248 | 83.94 | 88.0 | 17.28 | 297 |
| 19b | 0.63 | 525 | 0.11 | 90 | 80.72 | 88.1 | 17.2 | 295 |
| 19c | 0.61 | 525 | 0.33 | 246 | 84.13 | 88.9 | 17.16 | 293 |
| 19d | 0.66 | 525 | 0.66 | 491 | 82.56 | 88.1 | 17.07 | 280 |
| 19e | 0.64 | 525 | 0.49 | 368 | 84.11 | 88.4 | 17.43 | 288 |
| 19f | 0.52 | 525 | 0.35 | 257 | 85.31 | 87.5 | 17.09 | 319 |
| 19g | 0.51 | 525 | 0.16 | 194 | 83.72 | 87.5 | 17.34 | 333 |
| 19h | 0.52 | 525 | 0.70 | 259 | 83.21 | 88.0 | 17.46 | 312 |
| 19i | 0.70 | 525 | 1.65 | 600 | 86.63 | 88.0 | 17.6 | 275 |
| 19j | — | — | — | — | — | — | — | — |

[1]standard cm$^3$/min
[2][N-(2,6-di(1-methylethyl)phenyl)amido)(2-isopropylphenyl)(α-naphthalen-2-diyl(6-pyridin-2-diyl)methane)]hafnium dimethyl
[3]bis-(1-(2-methylcyclohexyl)ethyl)(2-oxoyl-3,5-di(t-butyl)phenyl)immino) zirconium dimethy
[4]ppm in final product calculated by mass balance
[5]polymer production rate
[6]weight percent ethylene conversion in reactor
[7]efficiency, kg polymer/g M where g M = g Hf + g Z

TABLE 8B

Polymer Physical properties

| Polymer Ex. No. | Density (g/cc) | $I_2$ | $I_{10}$ | $I_{10}/I_2$ | Mw (g/mol) | Mn (g/mol) | $M_w/M_n$ | Heat of Fusion (J/g) | $T_m$ (°C.) | $T_c$ (°C.) | TCRYSTAF (°C.) | Tm − TCRYSTAF (°C.) | CRYSTAF Peak Area (wt %) |
|---|---|---|---|---|---|---|---|---|---|---|---|---|---|
| 19g | 0.8649 | 0.9 | 6.4 | 7.1 | 135000 | 64800 | 2.1 | 26 | 120 | 92 | 30 | 90 | 90 |
| 19h | 0.8654 | 1.0 | 7.0 | 7.1 | 131600 | 66900 | 2.0 | 26 | 118 | 88 | — | — | — |

TABLE 8C

Average Block Index For exemplary polymers[1]

| Example | Zn/C2[2] | Average BI |
|---|---|---|
| Polymer F | 0 | 0 |
| Polymer 8 | 0.56 | 0.59 |
| Polymer 19a | 1.3 | 0.62 |
| Polymer 5 | 2.4 | 0.52 |
| Polymer 19b | 0.56 | 0.54 |
| Polymer 19h | 3.15 | 0.59 |

[1]Additional information regarding the measurement and calculation of the block indices for various polymers is disclosed in U.S. Patent Application Serial No. ____ (insert when known), entitled "Ethylene/α-Olefin Block Interpolymers", filed on Mar. 15, 2006, in the name of Colin L. P. Shan, Lonnie Hazlitt, et. al. and assigned to Dow Global Technologies Inc., the disclose of which is incorporated by reference herein in its entirety.
[2]Zn/C2 * 1000 = (Zn feed flow * Zn concentration/1000000/Mw of Zn)/ (Total Ethylene feed flow * (1 – fractional ethylene conversion rate)/Mw of Ethylene) * 1000. Please note that "Zn" in "Zn/C2 * 1000" refers to the amount of zinc in diethyl zinc ("DEZ") used in the polymerization process, and "C2" refers to the amount of ethylene used in the polymerization process.

Blend and Extrusion Examples

Blend compositions of various high melt strength ethylene/α-olefin copolymers and an inventive block copolymer were prepared, evaluated and tested for properties. The blend composition were blended on a 0.75 inch, 30 to 1 L/D single screw extruder. The extruder was equipped with three temperature and die zones. The extruder was equipped with a Garvey Die. The blend compositions were extruded at a melt temperature of 180° C. The die pressure and torque data were monitored at three different screw speeds, 10 rpm, 20 rpm and 30 rpm. The extruded article was examined for melt fracture, surface smoothness, and shape retention at all three extruder screw speeds. The extrudate was also tested for physical properties including melt strength, mechanical, thermal properties, and rheological properties. The blend compositions ranged from about 15 weight percent to 85 weight percent of the inventive block copolymer. The remaining balance was a high melt strength thylene/α-olefin copolymer or HDPE. Table 9 gives information about the polymers used in the examples.

Melt Strength (MS, Measured in cN) and Melt Extensibility (ME, Measured in mm/s)

These measurements were conducted by pulling strands of molten polymers or blends at constant acceleration until breakage occurred. The experimental set-up consisted of a capillary rheometer and a Rheotens apparatus as the take-up device. The force required to uniaxially extend the strands was recorded as a function of the take-up velocity. The maximum force attained before either draw resonance or breakage occurred, was defined as the Melt Strength. The corresponding velocity at which draw resonance or breakage occurred was defined as the Melt Extensibility Draw resonance, which terminated in breakage, was indicated by the onset of a periodic oscillation of increasing amplitude in the measured force profile. In the absence of any observable draw resonance, the melt strength was defined as the force at break. These tests were run under the following conditions:
Temperature 1: 190 C for LDPE based blends
Temperature 2: 200 C for HMS PP based blends
Capillary length: 30.0 mm
Capillary diameter: 2.0 mm
Piston diameter: 12.0 mm
Piston velocity: 0.265 mm/s
Shear rate: 38.2 s$^{-1}$
Draw down distance (die exit to take-up wheels: 100 mm
Cooling conditions: ambient air Acceleration: 2.4 mm/s2

TABLE 9

Resin Information

| Polymer Designation | Grade/Type | Conomoner Type | Density (g/cc) | Melt Index (190° C., I$_2$) |
|---|---|---|---|---|
| Polymer L*[1] | SLEP[6] | Butene | 0.910 | 0.12 |
| Polymer K*[2] | SLEP | Buten | 0.870 | 0.18 |
| Polymer J*[3] | SLEP | Buten | 0.875 | 0.11 |
| Polymer M*[4] | HDPE | none | 0.949 | 0.08 |
| Polymer 7a[5] | Block Copolymer | Octene | 0.878 | 0.88 |

[1]"Polymer L*" is a polymer available from The Dow Chemical Company under "Engage ® 7086".
[2]"Polymer K*" is a polymer available from The Dow Chemical Company under "Engage ® 7380".
[3]"Polymer J*" is a polymer available from The Dow Chemical Company under "Engage ® 6386".
[4]"Polymer M*" is a high density polyethylene homopolymer obtained from Chevron Phillips Chemical Company, L.P., The Woodlands, Texas.
[5]The synthesis of this polymer is described below.
[6]"SLEP" stands for substantially linear ethylene polymer.

Example 7a

Polymer 7a was prepared by continuous solution polymerization, using Catalyst A1/B2+DEZ as follows.

Continuous solution polymerizations are carried out in a computer controlled loop reactor consisting of a circulating screw pump and two heat exchangers. Purified mixed alkanes solvent (Isopar™ E available from ExxonMobil Chemical Company), ethylene, 1-octene, and hydrogen (where used) are supplied to a 27 gallon loop reactor equipped with a tempered water system for temperature control. The feeds to the reactor are measured by mass-flow controllers. The solvent is combined with 1-octene, ethylene, and hydrogen (where used) and fed to the reactor. The feed temperature of the solvent/monomer solution is controlled by use of a glycol cooled heat exchanger before entering the reactor. This stream enters into two injection points of the loop reactor. The catalyst component solutions are metered using pumps and mass flow meters and are introduced into the line near the suction of the loop reactor pump. The reactor is run liquid-full at approximately 500 psig with fast internal recirculation. Upon exiting the reactor, water and additive are injected in the polymer solution. The water hydrolyzes the catalysts, terminating the polymerization reactions. Some of the additives are antioxidants that remain with the polymer and act as stabilizers to prevent polymer degradation while in storage and during fabrication. The post reactor solution is superheated from reactor temperature (>110 Deg C.) to 210-250 Deg C. in preparation for a two-stage devolatization. The solvent and unreacted monomers are removed during the devolatization process. The polymer melt is pumped to a die for underwater pellet cutting.

Process details and results are contained in Table 9a.

TABLE 9a

| Ex. | $C_2H_4$ kg/hr | $C_8H_{16}$ kg/hr | Solv. kg/hr | $H_2$ sccm[1] | T °C. | Cat A1[2] Ppm | Cat A1 Flow Kg/hr | Cat B2[3] ppm | B2 Flow kg/hr | DEZ Conc % | DEZ Flow kg/hr | Cocat 1 Conc. ppm | Cocat 1 Flow kg/hr |
|---|---|---|---|---|---|---|---|---|---|---|---|---|---|
| 7a | 25.08 | 14.53 | 146.52 | 101 | 120 | 600 | 0.11 | 200 | 0.19 | 3.0 | 0.32 | 4500 | 0.29 |

| Ex. | Cocat 2 Conc. ppm | Cocat 2 Flow kg/hr | Zn in polymer ppm | Poly Rate[5] kg/hr | Conv[6] % | Solids % | Eff[7] |
|---|---|---|---|---|---|---|---|
| 7a | 525 | 0.15 | 248 | 38.07 | 88.0 | 17.28 | 297 |

[1] standard cm³/min
[2] [N-(2,6-di(1-methylethyl)phenyl)amido)(2-isopropylphenyl)(α-naphthalen-2-diyl(6-pyridin-2-diyl)methane)]hafnium dimethyl
[3] bis-(1-(2-methylcyclohexyl)ethyl)(2-oxoyl-3,5-di(t-butyl)phenyl)immino) zirconium dimethyl
[4] ppm in final product
[5] polymer production rate
[6] percent ethylene conversion in reactor
[7] efficiency, kg polymer/g M where g M = g Hf + g Zr Polymer Blends and Comparatives The following data in Table 10 were obtained on blend compositions containing a high melt strength ethylene/α-olefin polymer P* polymer, ENGAGES 6386 available from The Dow Chemical Company and the polymer 7a.

TABLE 10

Extrusion Data

| Composition (wt %) | | | | |
|---|---|---|---|---|
| Polymer 7a | Polymer J* | 10 RPM | 20 RPM | 30 RPM |
| Die Pressure (PSI) | | | | |
| 100% | 0% | 68 | 76 | 85 |
| 85% | 15% | 23 | 47 | 72 |
| 70% | 30% | 19 | 38 | 51 |
| 50% | 50% | 23 | 38 | 50 |
| 30% | 70% | 25 | 47 | 59 |
| 15% | 85% | 31 | 49 | 59 |
| 0% | 100% | 66 | 83 | 96 |
| Extruder Torque (m - g) | | | | |
| 100% | 0% | 3000 | 4300 | 5100 |
| 85% | 15% | 3100 | 4000 | 4800 |
| 70% | 30% | 3000 | 4000 | 4800 |

TABLE 10-continued

Extrusion Data

| Composition (wt %) | | | | |
|---|---|---|---|---|
| Polymer 7a | Polymer J* | 10 RPM | 20 RPM | 30 RPM |
| 50% | 50% | 2800 | 3800 | 4400 |
| 30% | 70% | 2500 | 3600 | 4200 |
| 15% | 85% | 2600 | 3400 | 4000 |
| 0% | 100% | 2300 | 3100 | 3700 |
| Extrudate Surface (observations) | | | | |
| 100% | 0% | melt fracture | melt fracture | melt fracture |
| 85% | 15% | | no melt fracture- | — |
| 70% | 30% | | no melt fracture- | — |
| 50% | 50% | | no melt fracture- | — |
| 30% | 70% | | no melt fracture- | — |
| 15% | 85% | | no melt fracture- | — |
| 0% | 100% | no melt fracture | Slight melt fracture | melt fracture |

The following physical property data in Tables 11 and 12 were obtained on blend compositions containing a high melt strength ethylene/α-olefin (EAO) polymer and the inventive interpolymer (polymer 7a).

TABLE 11

Resin Data

| sample | Grade Type | density g/cc | $I_2$ dg/min | $I_{10}/I_2$ dg/min | % component A (Vesuvius) | % component B |
|---|---|---|---|---|---|---|
| Polymer L* | EB | 0.901 | 0.12 | 22.2 | 0 | 100 |
| Polymer K* | EB | 0.87 | 0.18 | 10.5 | 0 | 100 |
| Polymer J* | EP | 0.875 | 0.11 | 27.6 | 0 | 100 |
| Polymer M* | HDPE | 0.949 | 0.08 | 25 | 0 | 100 |
| Polymer 7a | EO | 0.878 | 0.88 | 7.1 | 100 | 0 |
| Blends | | | | | | |
| Polymer 7A | EO | 0.878 | 0.88 | 7.1 | 100 | 0 |
| Polymer L* | | 0.884 | 0.73 | 7.8 | 85 | 15 |
| Polymer L*-Polymer 7a | | 0.886 | 0.6 | 8.5 | 70 | 30 |
| Polymer L*-Polymer 7a | | 0.891 | 0.35 | 12.5 | 50 | 50 |
| Polymer L*-Polymer 7a | | 0.893 | 0.35 | 11.2 | 30 | 70 |
| Polymer L*-Polymer 7a | | 0.895 | 0.24 | 14.9 | 15 | 85 |

TABLE 11-continued

Resin Data

| sample | Grade Type | density g/cc | I₂ dg/min | I₁₀/I₂ dg/min | % component A (Vesuvius) | % component B |
|---|---|---|---|---|---|---|
| Polymer L* | EB | 0.901 | 0.12 | 22.2 | 0 | 100 |
| Polymer 7a | EO | 0.878 | 0.88 | 7.1 | 100 | 0 |
| Polymer K*-Polymer 7a | | 0.875 | 0.76 | 6.7 | 85 | 15 |
| Polymer K*-Polymer 7a | | 0.874 | 0.59 | 7.6 | 70 | 30 |
| Polymer K*-Polymer 7a | | 0.874 | 0.3 | 11.9 | 50 | 50 |
| Polymer K*-Polymer 7a | | 0.872 | 0.3 | 9 | 30 | 70 |
| Polymer K*-Polymer 7a | | 0.871 | 0.17 | 13 | 15 | 85 |
| Polymer K* | EB | 0.87 | 0.18 | 10.5 | 0 | 100 |
| | | | | | | 100 |
| | EO | 0.878 | 0.88 | 7.1 | 100 | 0 |
| Polymer J*-Polymer 7a | | 0.876 | 0.73 | 8.3 | 85 | 15 |
| Polymer J*-Polymer 7a | | 0.876 | 0.52 | 11.3 | 70 | 30 |
| Polymer J*-Polymer 7a | | 0.876 | 0.51 | 10.6 | 50 | 50 |
| Polymer J*-Polymer 7a | | 0.878 | 0.31 | 16.1 | 30 | 70 |
| Polymer J*-Polymer 7a | | 0.876 | 0.26 | 18.2 | 15 | 85 |
| Polymer J* | EP | 0.875 | 0.11 | 27.6 | 0 | 100 |
| Polymer 7a | EO | 0.878 | 0.88 | 7.1 | 100 | 0 |
| Polymer M*-Polymer 7a | | 0.892 | 0.75 | 8.1 | 85 | 15 |
| Polymer M*-Polymer 7a | | 0.898 | 0.59 | 8.5 | 70 | 30 |
| Polymer M*-Polymer 7a | | 0.912 | 0.37 | 12.5 | 50 | 50 |
| Polymer M*-Polymer 7a | | 0.914 | 0.28 | 13.8 | 30 | 70 |
| Polymer M*-Polymer 7a | | 0.922 | 0.2 | 19.3 | 15 | 85 |
| Polymer M* | HDPE | 0.949 | 0.08 | 25 | 0 | 100 |

"EB" refers to an ethylene/Butene copolymer,
"EO" refers to an ethylene/octane copolymer,
"EP" refers to an ethylene/propylene copolymer,
"HDPE" refers to high density polyethylene,
"Polymer L*" is a polymer available from The Dow Chemical Company under "Engage ® 7086".
"Polymer K*" is a polymer available from The Dow Chemical Company under "Engage ® 7380".
"Polymer J*" is a polymer available from The Dow Chemical Company under "Engage ® 6386".
"Polymer M*" is a high density polyethylene homopolymer obtained from Chevron Phillips Chemical Company, L.P., The Woodlands, Texas.

TABLE 12

Various Physical Properties of Blends

| sample | Tensile Strength (MPa) | SD (MPa) | Strain at Break (%) | SD Strain at Break (%) | Compression set at 21 C. | Compression set at 70 C. | Melt strength (cN) | drawability mm/s | T_c (° C.) | T_m (° C.) | Heat of Fusion (J/g) | Cryst (wt %) | Crystaf peak temp, C. | Rheology Ratio (0.1/100) |
|---|---|---|---|---|---|---|---|---|---|---|---|---|---|---|
| Polymer L* | 33 | 2.0 | 839 | 86 | 33.0 | 86.6 | 9.2 | 130 | 83 | 93 | 90 | 31 | | 28.9 |
| Polymer K* | 15 | 1.3 | 799 | 29 | 22.8 | 100.0 | 13 | 100 | 42 | 50 | 46 | 16 | | 13 |
| Polymer J* | 8 | 0.3 | 977 | 13 | 38.1 | 100.0 | 9.2 | 107 | 51 | 53 | 55 | 19 | | 52.1 |
| Polymer M* | 36 | 0.7 | 785 | 14 | 27.0 | 66.8 | 20 | 65 | 128 | 131 | 190 | 65 | | 36.2 |
| Polymer 7a Blends | 18 | 0.2 | 1086 | 6 | 22.4 | 44.7 | 3.5 | 175 | 98 | 120 | 57 | 20 | 47.3 | 4.6 |
| Polymer 7a | 18 | 0.2 | 1086 | 6 | 22.4 | 44.7 | 3.5 | 175 | 98 | 120 | 57 | 20 | 47.3 | 4.6 |
| Polymer L*-Polymer 7a | | | | | | | | | 90 | 89 | 85 | 29 | | 6.3 |
| Polymer L*-Polymer 7a | 25 | 1 | 992 | 12 | 18.7 | 63.5 | 5.2 | 150 | 103 | 88 | 82 | 28 | | 8.6 |
| Polymer L*-Polymer 7a | | | | | | | | | 104 | 119 | 86 | 30 | | 9.6 |
| Polymer L*-Polymer 7a | 34 | 1 | 887 | 3 | 26.1 | 76.3 | 6.7 | 94 | 104 | 119 | 84 | 29 | | 16.6 |
| Polymer L*-Polymer 7a | | | | | | | | | 104 | 120 | 45 | 16 | | 19.9 |
| Polymer L* | 33 | 2.0 | 839 | 86 | 33.0 | 86.6 | 9.2 | 130 | 83 | 93 | 90 | 31 | | 28.9 |
| Polymer 7a | 18 | 0.2 | 1086 | 6 | 22.4 | 44.7 | 3.5 | 175 | 98 | 120 | 57 | 20 | 47.3 | 4.6 |
| Polymer K*-Polymer 7a | | | | | | | | | 78 | 119 | 49 | 17 | | 5.5 |
| Polymer K*-Polymer 7a | 16 | 1 | 955 | 17 | 16.4 | 53.8 | 5.5 | 160 | 101 | 119 | 63 | 21 | | 6.3 |
| Polymer K*-Polymer 7a | | | | | | | | | 103 | 120 | 53 | 18 | | 6.5 |

TABLE 12-continued

Various Physical Properties of Blends

| sample | Tensile Strength (MPa) | SD (MPa) | Strain at Break (%) | SD Strain at Break (%) | Compression set at 21 C. | Compression set at 70 C. | Melt strength (cN) | drawability mm/s | $T_c$ (° C.) | $T_m$ (° C.) | Heat of Fusion (J/g) | Cryst (wt %) | Crystaf peak temp, C. | Rheology Ratio (0.1/100) |
|---|---|---|---|---|---|---|---|---|---|---|---|---|---|---|
| Polymer K*-Polymer 7a | 17 | 1 | 875 | 22 | 29.3 | 93.2 | 8.6 | 106 | 102 | 120 | 53 | 18 | | 9.5 |
| Polymer K*-Polymer 7a | | | | | | | | | 103 | 119 | 55 | 19 | | 10.7 |
| Polymer K* | 15 | 1.3 | 799 | 29 | 22.8 | 100.0 | 13 | 100 | 42 | 50 | 46 | 16 | | 13 |
| Polymer 7a | 18 | 0.2 | 1086 | 6 | 22.4 | 44.7 | 3.5 | 175 | 98 | 120 | 57 | 20 | 47.3 | 4.6 |
| Polymer J*-Polymer 7a | | | | | | | | | 95 | 119 | 51 | 18 | | 7 |
| Polymer J*-Polymer 7a | 15 | 1 | 1178 | 34 | 23.2 | 54.2 | 6.2 | 175 | 98 | 119 | 53 | 18 | | 8.8 |
| Polymer J*-Polymer 7a | | | | | | | | | 102 | 119 | 67 | 23 | | 12.7 |
| Polymer J*-Polymer 7a | 14 | 1 | 1234 | 42 | 35.9 | 81.9 | 7.5 | 140 | 104 | 119 | 66 | 23 | | 25.3 |
| Polymer J*-Polymer 7a | | | | | | | | | 105 | 119 | 45 | 16 | | 31.9 |
| Polymer J* | 8 | 0.3 | 977 | 13 | 38.1 | 100.0 | 9.2 | 107 | 51 | 53 | 55 | 19 | | 52.1 |
| Polymer 7a | 18 | 0.2 | 1086 | 6 | 22.4 | 44.7 | 3.5 | 175 | 98 | 120 | 57 | 20 | 47.3 | 4.6 |
| Polymer M*-Polymer 7a | | | | | | | | | 118 | 130 | 170 | 58 | | 5.5 |
| Polymer M*-Polymer 7a | 24 | 1 | 985 | 17 | 22.4 | 39.9 | 7.3 | 125 | 118 | 130 | 119 | 41 | | 7.2 |
| Polymer M*-Polymer 7a | | | | | | | | | | | | | | 12.7 |
| Polymer M*-Polymer 7a | 35 | 0 | 913 | 13 | 29.9 | 50.5 | 13 | 86 | 115 | 126 | 95 | 33 | | 18.2 |
| Polymer M*-Polymer 7a | | | | | | | | | 118 | 124 | 77 | 26 | | 26.9 |
| Polymer M* | 36 | 0.7 | 785 | 14 | 27.0 | 66.8 | 20 | 65 | 128 | 131 | 190 | 65 | | 36.2 |

Various plots are constructed based on the above data. FIG. 8 shows plots obtained from melt strength measurements for various polymers and blends thereof. FIG. 9 shows plots of tensile strength as a function of the weight percent of a polyolefin added (labeled as "Percent Modifier"). The figure shows that blending of the inventive interpolymer with ENGAGE® 7086 and Marlex HDPE significantly enhances the tensile strength of the blends in comparison to pure inventive interpolymer. FIG. 10 shows plots of melt strength as a function of the weight percent of a polyolefin added. The figure shows that blending of the inventive interpolymer with HDPE and ENGAGE® enhances the melt strength. HDPE enhances the melt strength relatively more than that achieved by blending with ENGAGE® polymers FIG. 11 shows plots of compression set at 21° C. as a function of the weight percent of a polyolefin added. FIG. 12 shows plots of compression set at 70° C. as a function of the weight percent of a polyolefin added. The figures suggest that there appears to be some synergy between the inventive interpolymer and HDPE.

As demonstrated above, embodiments of the invention provide various polymer blends suitable for profile extrusions to make profiles and gaskets. The profiles and gaskets have good compression set and increase service temperatures. The blends provide improved line speeds, smooth surfaces and reduce melt fracture. Therefore, scrap rates due to surface defects are reduced. Improved melt strength provides greater shape retention for extruded profiles and gaskets and enable higher production rate. Additional advantages and characteristics are apparent to those skilled in the art.

While the invention has been described with respect to a limited number of embodiments, the specific features of one embodiment should not be attributed to other embodiments of the invention. No single embodiment is representative of all aspects of the invention. In some embodiments, the compositions or methods may include numerous compounds or steps not mentioned herein. In other embodiments, the compositions or methods do not include, or are substantially free of, any compounds or steps not enumerated herein. Variations and modifications from the described embodiments exist. Finally, any number disclosed herein should be construed to mean approximate, regardless of whether the word "about" or "approximately" is used in describing the number. The appended claims intend to cover all those modifications and variations as falling within the scope of the invention.

What is claimed is:

1. A polymer blend comprising:
   (i) at least one ethylene/α-olefin multi-block interpolymer, wherein the ethylene/α-olefin multi-block interpolymer:
      (a) has a Mw/Mn from about 1.7 to about 3.5, at least one melting point, Tm, in degrees Celsius, and a density, d, in grams/cubic centimeter, wherein the numerical values of Tm and d correspond to the relationship:

$T_m > -2002.9 + 4538.5(d) - 2422.2(d)^2$; or (b) has a Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$\Delta T > -0.1299(\Delta H) + 62.81$ for $\Delta H$ greater than zero and up to 130 J/g, $\Delta T \geq 48°$ C. for $\Delta H$ greater than 130 J/g, wherein the CRYSTAF peak is determined using at least 5 percent of the cumulative polymer, and if less than 5 percent of the polymer has an identifiable CRYSTAF peak, then the CRYSTAF temperature is 30° C.; or (c) is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when the ethylene/α-olefin interpolymer is substantially free of a cross-linked phase:

$Re > 1481 - 1629(d)$; or (d) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or (e) is characterized by a storage modulus at 25° C., G'(25° C.), and a storage modulus at 100° C., G'(100° C.), wherein the ratio of G'(25° C.) to G'(100° C.) is from about 1:1 to about 10:1; and (ii) at least one polyolefin with a melt strength of at least about 6 centiNewton (cN).

2. The polymer blend of claim 1, wherein the ethylene/α-olefin interpolymer has a Mw/Mn from about 1.7 to about 3.5, at least one melting point, Tm, in degrees Celsius, and a density, d, in grams/cubic centimeter, wherein the numerical values of Tm and d correspond to the relationship: $T_m > -858.91 - 1825.3(d) + 1112.8(d)^2$.

3. The polymer blend of claim 1, wherein the ethylene/α-olefin interpolymer has a Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$\Delta T - 0.1299(\Delta H) + 62.81$ for $\Delta H$ greater than zero and up to 130 J/g, $\Delta T \geq 48°$ C. for $\Delta H$ greater than 130 J/g, wherein the CRYSTAF peak is determined using at least 5 percent of the cumulative polymer, and if less than 5 percent of the polymer has an identifiable CRYSTAF peak, then the CRYSTAF temperature is 30° C.

4. The polymer blend of claim 1, wherein the ethylene/α-olefin interpolymer is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when the ethylene/α-olefin interpolymer is substantially free of a cross-linked phase: $Re > 1481 - 1629(d)$.

5. The polymer blend of claim 4, wherein the numerical values of Re and d satisfy the following relationship: $Re > 1491 - 1629(d)$.

6. The polymer blend of claim 4, wherein the numerical values of Re and d satisfy the following relationship: $Re > 1501 - 1629(d)$.

7. The polymer blend of claim 4, wherein the numerical values of Re and d satisfy the following relationship: $Re > 1511 - 1629(d)$.

8. The polymer blend of claim 1, wherein the ethylene/α-olefin interpolymer has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer.

9. The polymer blend of claim 1, wherein the ethylene/α-olefin interpolymer is characterized by a storage modulus at 25° C., G'(25° C.), and a storage modulus at 100° C., G'(100° C.), wherein the ratio of G'(25° C.) to G'(100° C.) is from about 1:1 to about 10:1.

10. The polymer blend of claim 1, wherein the α-olefin is styrene, propylene, 1-butene, 1-hexene, 1-octene, 4-methyl-1-pentene, norbornene, 1-decene, 1,5-hexadiene, or a combination thereof.

11. The polymer blend of claim 1, wherein the ethylene/α-olefin interpolymer is present in the range from about 5% to about 95% by weight of the total composition.

12. The polymer blend of claim 1, wherein the polyolefin is a homopolymer.

13. The polymer blend of claim 1, wherein the polyolefin is a polypropylene.

14. The polymer blend of claim 1, wherein the polyolefin is a polyethylene.

15. The polymer blend of claim 1, wherein the polyolefin is a high density polyethylene.

16. The polymer blend of claim 15, wherein the polyethylene is present in the range from about 5% to about 95% by weight of the total composition.

17. The polymer blend of claim 15, wherein the polyethylene is present in the range from about 10% to about 50% by weight of the total composition.

18. The polymer blend of claim 15, wherein the polyethylene is present in the range from about 10% to about 30% by weight of the total composition.

19. The polymer blend of claim 15, wherein the polyethylene is a substantially linear homogeneous ethylene/α-olefin interpolymer.

20. The polymer blend of claim 15, wherein the polyethylene is a linear homogeneous ethylene/α-olefin interpolymer.

21. The polymer blend of claim 14, wherein the polyolefin is selected from low density polyethylene (LDPE), heterogeneously branched ethylene/α-olefin interpolymer, ultra low density polyethylene (ULDPE), substantially linear ethylene polymers (SLEP), and homogeneously branched ethylene polymer.

22. The polymer blend of claim 14, wherein the polyolefin is selected from low density polypropylene and high density polypropylene.

23. A profile made from the polymer blend of claim 1.

24. A gasket made from the polymer blend of claim 1.

25. The gasket of claim 24, wherein the gasket is prepared by profile extrusion.

26. The gasket of claim 24, wherein the gasket is prepared by injection molding.

\* \* \* \* \*